United States Patent [19]

Vrba et al.

[11] 3,814,859

[45] June 4, 1974

[54] COMMUNICATION SWITCHING SYSTEM TRANSCEIVER ARRANGEMENT FOR SERIAL TRANSMISSION

[75] Inventors: James J. Vrba, Berwyn; Charles K. Buedel, Wood Dale, both of Ill.

[73] Assignee: GTE Automatic Electric Laboratories Incorporated, Northlake, Ill.

[22] Filed: Jan. 2, 1973

[21] Appl. No.: 320,412

[52] U.S. Cl. .......................................... 179/15 AL
[51] Int. Cl. .......................................... H04j 3/08
[58] Field of Search ........ 179/15 AL, 15 AE, 15 BF

[56] References Cited

UNITED STATES PATENTS

| | | | |
|---|---|---|---|
| 3,564,145 | 2/1971 | Knepper | 179/15 AL |
| 3,600,518 | 8/1971 | McNeilly | 179/15 AL |
| 3,643,030 | 2/1972 | Sparrendahl | 179/15 AL |
| 3,731,002 | 5/1973 | Pierce | 179/15 AL |
| 3,732,543 | 5/1973 | Rocher | 179/15 AL |

*Primary Examiner*—Ralph D. Blakeslee
*Attorney, Agent, or Firm*—Bernard E. Franz

[57] ABSTRACT

A serial transceiver arrangement for a communication switching system having a plurality of sub-system units, such as markers, and a common data processor unit includes a first serial communication transceiver register associated with the processor unit and a plurality of transceiver registers individually associated with each one of the sub-system units connected via two-way serial transmission links to the processor register by means of time division multiplexing circuits. A parallel communication link interconnects the common data processor unit with its communication register. Shift checking detectors are provided to determine the proper functioning of shift registers in the communication registers and to analyze a header bit pattern contained in each message. The serial register links each includes a serial data lead and a clock signal lead for supplying clock signals in synchronism with the serial data signals for operating a shift register of the receiving communication register. A scanner in the communication register associated with the data processor unit is sequentially incremented to access the links to the sub-system communication registers, and the data processor includes circuitry to interrupt the scanning operation to load the shift register of its communication register with a message to be sent to a particular sub-system communication register, while freezing the status of the processor communication register and advancing the scanner to the next link automatically. A parity detector and generator circuit is provided to supply a parity bit for each word of a message sent to the processor communication register from the sub-system register and the processor communication register checks the parity bit of each word of a message loaded in parallel into its shift register by the processor and sent in serial form to sub-system transceiver. The processor communication register can re-attempt to receive a sub-system communication register transmission in the event of a parity error or a shift checking error, and for maintenance purposes the processor communication register can send a special message to the sub-system register with an instruction to return it unchanged for diagnostic purposes.

21 Claims, 60 Drawing Figures

SEC=OFFICE OR SELECTOR SECTION
SBS=OFFICE OR SELECTOR SUBSECTION
MID = MARKER IDENTITY (A OR B)
MTN= MAINTENANCE CALL
TCL = TEST CALL
IN(O/T)=INSTRUCTION (OM OR TM)
DG(O/T)=DATA GROUP (OM OR TM)
MD(O/T)=MAINTENANCE DATA(OM OR TM)
M.P = MEMORY PROTECT(ALWAYS O)
PAR=PARITY

REGISTER SELECT AND LOAD CONTROL 1800

SERIAL PARITY DETECTOR GENERATOR 2300

PART OF MESSAGE ERROR
LATCES 2500

PART OF MARKER INTERFACE 4600

COMMUNICATION SWITCHING SYSTEM TRANSCEIVER ARRANGEMENT FOR SERIAL TRANSMISSION

BACKGROUND OF THE INVENTION

This invention relates to a communication switching system serial-transmission transceiver arrangement, and it more particularly relates to a control arrangement for the serial transmission of information between a data processor unit and a plurality of sub-system units, such as markers.

DESCRIPTION OF THE PRIOR ART

Communication switching systems, such as telephone switching systems, have employed data processor units for various call processing and maintenance funtions and for supplying information concerning such functions to other sub-systems, such as markers controlling the switching networks. The common data processor communicates with the markers to exchange information messages for both call processing and maintenance purposes. Such message sending and receiving operations must necessarily be accomplished at high speeds to facilitate the operation of the system. Such a transceiver arrangement is disclosed in U.S. Pat. No. 3,349,330 to W. R. Wedmore. In the Wedmore patent, there is disclosed a transceiver having a shift register for transmitting two switching digits of four bits each from a common translator apparatus to a transceiver in a marker for the switching network. The information is transmitted serially via a diphase data transmission using a modulation technique in which each sinusoidal signal cycle represents binary data and is either in phase or out of phase with the preceding cycle. However, while such an arrangement has been successfully employed, it would be highly desirable to have an extremely efficient high-speed serial DC transmission, thereby eliminating the necessity for modulators and demodulators. Also, it would be highly desirable to have shift checking and parity checking circuits for a high-speed DC serial transmission between the transceivers of a data processor unit and a plurality of sub-system units, such as markers. Also, maintenance and error checking techniques should be provided for such an arrangement.

SUMMARY OF THE INVENTION

The object of this invention is to provide a new and improved communication switching system transceiver arrangement for serial transmission between a common register and a plurality of sub-system registers.

According to the invention, there is provided a serial communication arrangement for a communication switching system having a plurality of sub-system units and a common data processor unit. A serial DC communication register is associated with the processor unit, and a plurality of transceiver registers are individually associated with each one of the sub-system units. The sub-system transceiver registers communicate over two-way links via time division multiplex circuits in the processor communication register to store a message in the shift register of the processor communication register. The processor register communicates over the serial links with the sub-system transceiver registers via a time division distribution circuit. The common data processor unit communicates with the shift register of the communication register by a two-way parallel communication link. The operation of the processor communication register and the shift registers provided within the transceiver registers are checked during the serial transfer of a message by detection circuits, which analyze a certain predetermined pattern of header bits transferred with each message. The DC serial message is transferred via a data lead over the link, and the link also includes a clock lead so that the processor communication register supplies a clock signal along with and in synchronism with its associated data to the sub-unit transceiver register for controlling its shift register. The same clock signal is returned from the sub-system transceiver register along with serial data information for controlling the communication register's shift register in synchronism with the data being shifted therewithin. Each bit is transferred during the leading edge of the clock signal in a sending operation, and the bit is received at the trailing edge of the same clock signal. The processor communication register includes a scanner for sequentially incrementing the sub-unit links, and a detection circuit within the processor communication register is enabled to scan the links for a call-for-service indication. When the processor accesses the communication register, the scanner is stopped automatically to insure that the status of the communication register remains constant so that the processor can determine its current status including the sub-unit link to which it is currently addressing. After disconnecting from the communication register, the scanner is advanced to the next link before a call-for-service test is made.

Other features of the present invention relate to circuitry in the sub-system transceiver registers for automatically resending a message therefrom to the processor communication register in the event of an error, and in this regard if a parity error or shift checking error occurs, the sub-system transceiver register is arranged to send the same message again. For maintenance purposes, the communication register under the control of the processor can request the transceiver register to send a certain maintenance message unchanged back to the communication register.

CROSS-REFERENCES TO RELATED APPLICATIONS

The preferred embodiment of the invention is incorporated in a system disclosed in a U.S. Pat. application Ser. No. 130,133, filed Apr. 1, 1971 by K. E. Prescher et al., now replaced by a continuation-in-part application Ser. No. 342,323 filed Mar. 19, 1973, this application being hereinafter referred to as the SYSTEM application. The marker for the system is disclosed in the U.S. Pat. application Ser. No. 130,418, filed Apr. 1, 1971 by J. W. Eddy et al., now U.S. Pat. No. 3,681,537 issued Aug. 1, 1972. The message-sending register of the present invention is incorporated in a switching interlock arrangement disclosed in U.S. Pat. applications Ser. No. 281,586, filed Aug. 17, 1972 by J. W. Eddy; Ser. No. 303,157, filed Nov. 2, 1972 by J. W. Eddy et al.; and Ser. No. 311,606, filed Dec. 4, 1972 by J. W. Eddy et al.

OUTLINE OF DESCRIPTION OF THE PREFERRED EMBODIMENT

A. General System Description
A1. Typical Call
B. Symbolism for Grates and Bi-stable Devices
C. Communication Registers CCR and MCR General Description
C1. Modes of Operation
C2. Clock, Data, and Status Leads
C3. Data Transfer Between Communication Registers
C4. Configuration
C5. Marker Communication Transceivers
C6. Computer Communication Register CCR
C7. CCR Sub-circuits
C8. CPD Instruction Code Format
C9. Select Instructions
C10. Standard Status and Scanner Address Word
C11. Error Status Words
C12. Marker Communication Register MCR
C13. Originating Marker Communication Frame
C14. Marker Communication Register Sub-circuits
C15. Terminating Marker Communication Frame
C16. Marker Maintenance Frames
C17. Typical Operation of Communication Registers During Call Processing
C18. Good Message Received (GMR)
C19. Bad Message Received (BMR)
C20. Sending Sequence (to the Marker)
D. Communication Registers CCR and MCR Detail Description
D1. Driver Distributor and Receiver Multiplex
D2. Shift Checking of Serial Information
D3. Serial Bits Transfer and Clock Control Therefor
D4. Computer Processor Scan Control
D5. Marker Link Addressing Test
D6. Register Status Display
D7. On Line Active, On Line Standby and Off Line Operational Modes
D8. Message Length Determination
D9. Error Messages
D10. Serial Message Parity Detection and Generation
D11. Directive Error Detector
D12. Select Strobe, Data Strobe and Parity Detector Maintenance Operations
D13. Marker Transceiver Message Resending
D14. Maintenance Message

DESCRIPTION OF THE PREFERRED EMBODIMENT

Figure 1:
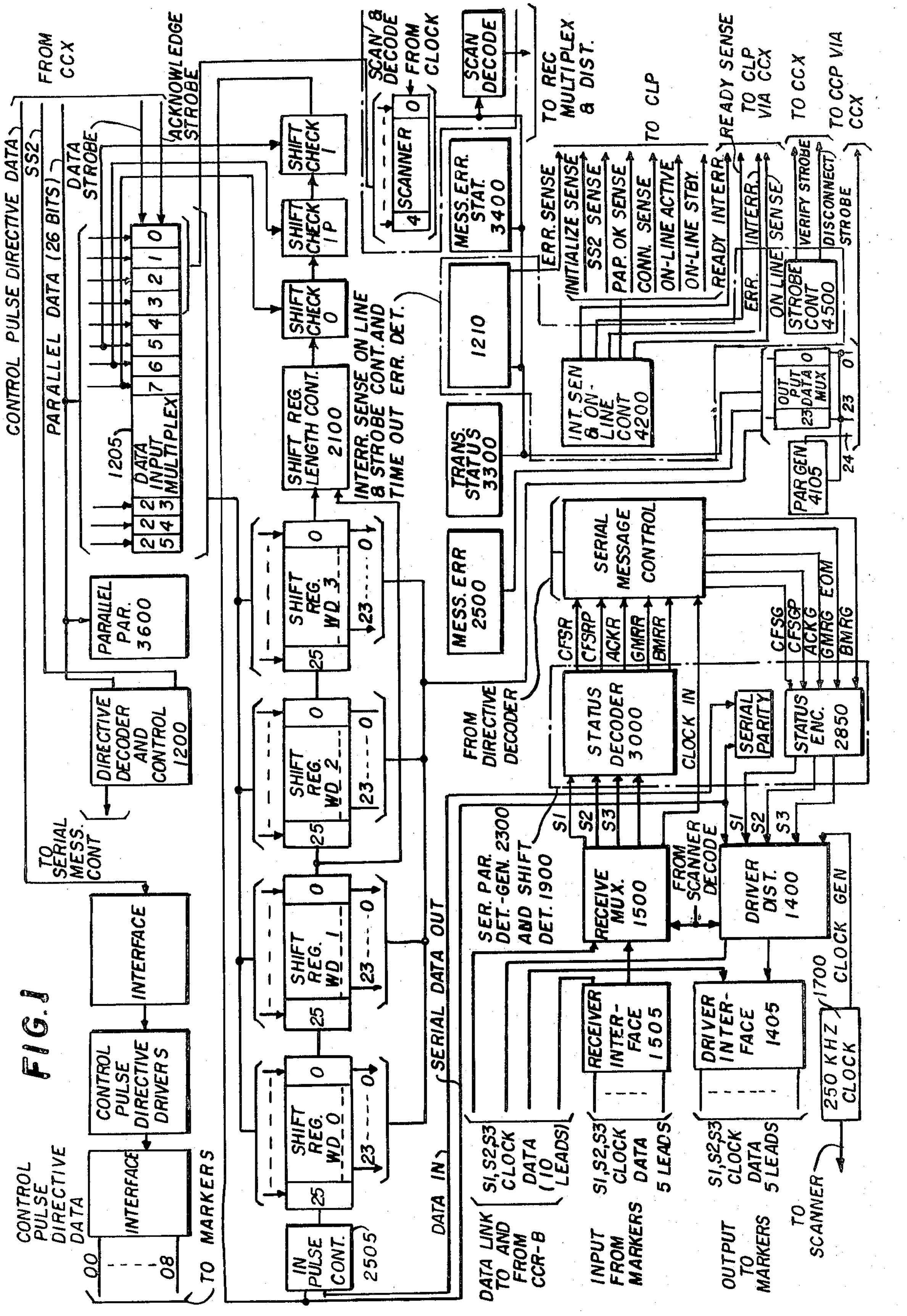
FIG. 1 is a block diagram of a computer communication register of the present invention.
Figure 10:
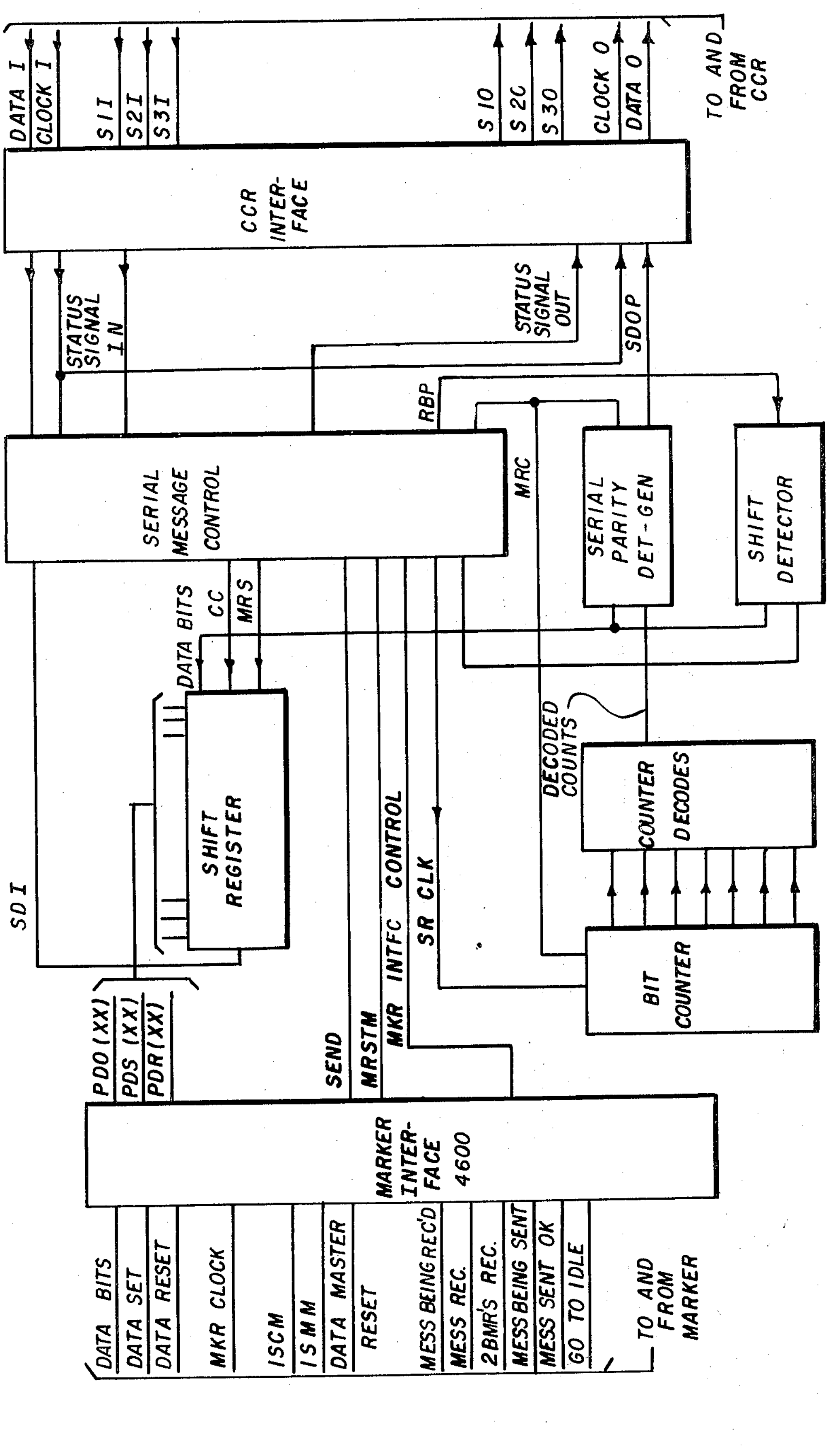
FIG. 10 is a block diagram of a marker transceiver.

The computer communication register of the present invention is illustrated in FIG. 1 of the drawings, and a marker transceiver is shown in FIG. 10 of the drawings. Except for the marker interface circuit of the marker transceiver, the remaining portion of the transceiver (referred to as the marker communication register) is similar to a corresponding portion of the computer communication register of FIG. 1, and thus will not be described in detail. A system incorporating the preferred embodiment of the present invention will now be briefly described.

A. General System Description

Figure 2:
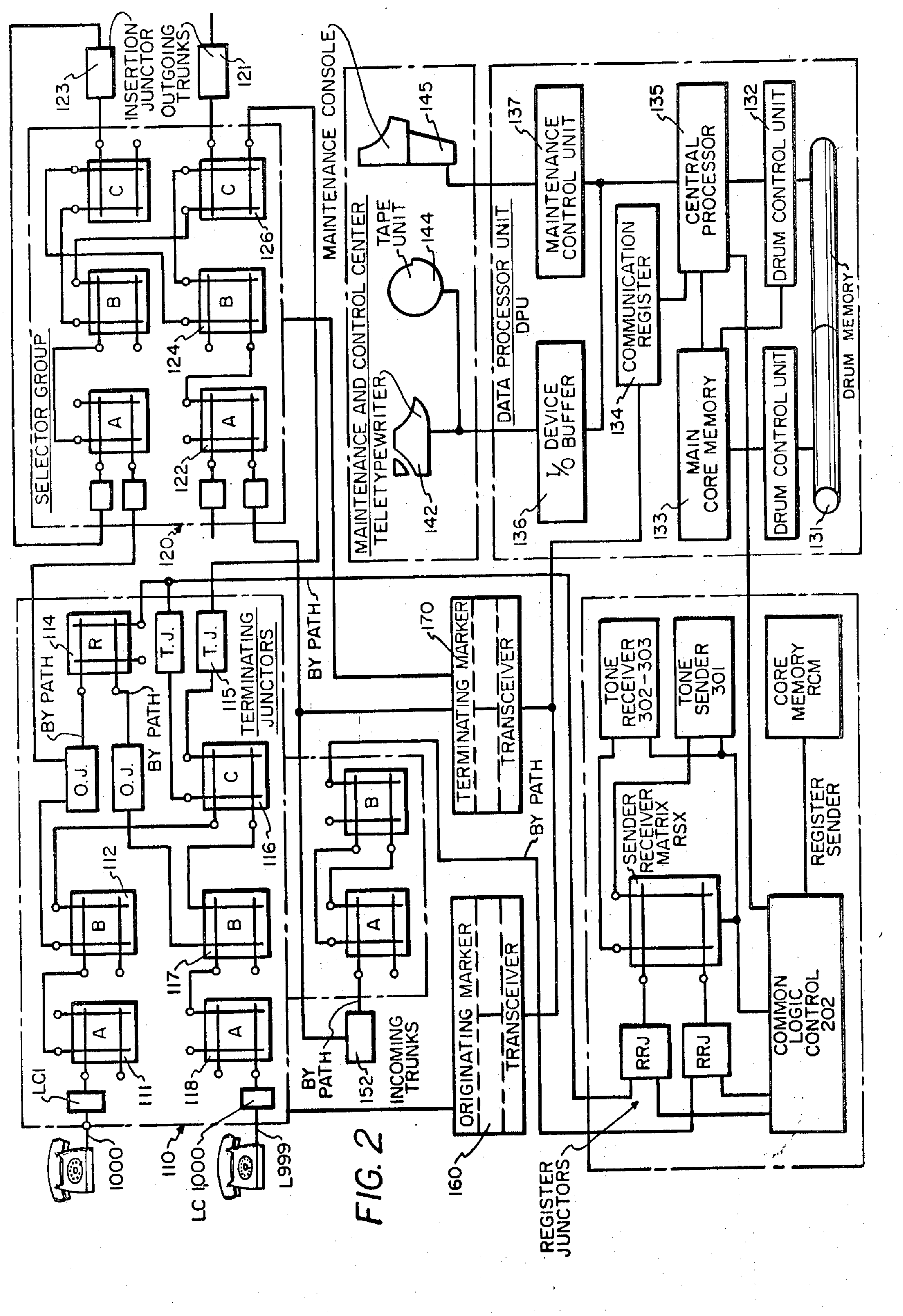
FIG. 2 is a block diagram of a communication switching system incorporating the preferred embodiment of the invention.

The preferred embodiment of the invention is incorporated in a telephone switching system as shown in FIG. 2. The system is disclosed in said system patent application. The system comprises a switching portion comprising a plurality of line groups such as line group 110, a plurality of selector groups such as selector group 120, a plurality of trunk-register groups such as group 150, a plurality of originating markers, such as marker 160, and a plurality of terminating markers such as marker 170; and a control portion which includes register-sender groups such as RS, data processing unit DPU, and a maintenance control center 140. The line group 110 includes reed-relay switching network stages A, B, C and R for providing local lines L000-L999 with a means of accessing the system for originating calls and for providing a means of terminating calls destined for local customers. The trunk-register group 150 also includes reed-relay switching networks A and B to provide access for incoming trunks 152 to connect them to the register-sender, the trunks also being connected to selector inlets. The selector group 120 forms an intermediate switch and may be considered the call distribution center of the system, which routes calls appearing on its inlets from line groups or from incoming trunks to appropriate destinations, such as local lines or outgoing trunks to other offices, by way of reed-relay switching stages A, B and C. Thus the line group 110, the trunk-register groups 150, and the selector group 120 form the switching network for this system and provide full-metallic paths through the office for signaling and transmission.

The originating marker 160 provides high-speed control of the switching network to connect calls entering the system to the register-sender 200. The terminating markers 170 control the switching networks of the selector group 120 for establishing connections therethrough; and if a call is to be terminated at a local customer's line in the office then the terminating marker sets up a connection through both the selector group 120 and the line group 110 to the local line.

The register-sender RS provides for receiving and storing of incoming digits and for outpulsing digits to distant offices, when required. Incoming digits in the dial pulse mode, in the form of dual tone (touch) calling multifrequency signals from local lines, or in the form of multi-frequency signals from incoming trunks are accommodated by the register-sender. A group of register-junctors RRJ function as peripheral units as an interface between the switching network and the common logic circuits of the register-sender. The ferrite core memory RCM stores the digital information under the control of a common logic 202. Incoming digits may be supplied from the register-junctors via a sender-receiver matrix RSX and tone receivers 302–303 to a common logic, or may be received in dial pulse mode directly from the register-junctors. Digits may be outpulsed by dial pulse generators directly from a register-junctor or multifrequency senders 301 which are selectively connected to the register-junctors via the sender-receiver matrix RSX. The common logic control 202, and the core memory RCM form the register apparatus of the system, and provide a pool of registers for storing call processing information received via the register-junctors RRJ. The information is stored in the core memory RCM on a time-division multiplex sequential access basis, and the memory RCM can be accessed by other sub-systems such as the data processor unit 130 on a random access basis.

The data processor unit DPU provides stored program computer control for processing calls through the system. Instructions provided by the unit DPU are utilized by the register RS and other sub-systems for processing and routing of the call. The unit DPU includes a drum memory 131 for storing, among other information, the equipment number information for translation purposes. A pair of drum control units, such as the unit 132 cooperate with a main core memory 133 and control the drum 131. A central processor 135 accesses the register-sender RS and communicates with the main core memory 133 to provide the computer control for processing calls through the system. A communication register 134 transfers information between the central processor and the originating markers 160 and terminating markers 170. An input/output device buffer 136 and a maintenance control unit 137 transfer information from the maintenance control center 140.

The line group 110 in addition to the switching stages includes originating junctors 113 and terminating junctors 115. On an originating call the line group provides concentration from the line terminals to the originating junctor. Each originating junctor provides the split between calling and called parties while the call is being established, thereby providing a separate path for signaling. On a terminating call, the line group 110 provides expansion from the terminating junctors to the called line. The terminating junctors provide ringing control, battery feed, and line supervision for calling and called lines. An originating junctor is used for evey call originating from a local line and remains in the connection for the duration of the call. The originating junctor extends the calling line signaling path to the register-junctor RRJ of the register-sender RS, and at the same time provides a separate signaling path from the register-sender to the selector group 120 for outpulsing, when required. The originating junctor isolates the calling line until cut-through is effected, at which time the calling part is switched through to the selector group inlet. The originating junctor also provides line lock out. The terminating junctor is used for every call terminating on a local line and remains in the connection for the duration of the call.

The selector group 120 is the equipment group which provides intermediate mixing and distribution of the traffic from various incoming trunks and junctors on its inlets to various outgoing trunks and junctors on its outlets.

The markers used in the system are electronic units which control the selection of idle paths in the establishing of connections through the matrices, as explained more fully in said marker patent application. The originating marker 160 detects calls for service in the line and/or trunk register group 150, and controls the selection of idle paths and the establishment of connections through these groups. On line originated calls, the originating marker detects calls for service in the line matrix, controls path selection between the line and originating junctors and between originating junctors and register-junctors. On incoming trunk calls the originating marker 160 detects calls for service in the incoming trunks connected to the trunk register group 150 and controls path selection between the incoming trunks 152 and register-junctors RRJ.

The terminating marker 170 controls the selection of idle paths in the establishing of connections for terminating calls. The terminating marker 170 closes a matrix access circuit which connects the terminating marker to the selector group 120 containing the inlet being used by the call being terminated, and if the call is terminated in a local line, the terminating marker 170 closes another access circuit which in turn connects the marker to the line group 110. The marker connects an inlet of the selector group to an idle junctor or trunk circuit. If the call is to an idle line the terminating marker selects an idle terminating junctor and connects it to a line group inlet, as well as connecting it to a selector group outlet. For this purpose the appropriate idle junctor is selected and a path through the line group 110 and the selector group 120 is established.

The data processor unit 130 is the central coordinating unit and communication hub for the system. It is in essence a general purpose computer with special input-output and maintenance features which enable it to process data. The data processing unit includes control of: the originating process communication (receipt of line identity, etc.), the translation operation, route selection, and the terminating process communication. The translation operation includes: class-of-service look-up, inlet-to-directory number translation, matrix outlet-to-matrix inlet translation, code translation and certain special feature translations.

Typical Call

This part presents a simplified explanation of how a basic call is processed by the system. The following call type is covered: call from a local party served by one switching unit to another local party served by the same switching unit.

In the following presentations, reed relays are referred to as correeds. Not all of the data processing operations which take place are included.

When a customer goes off-hook, the D.C. line loop is closed, causing the line correed of his line circuit to be operated. This action constitutes seizure of the central office switching equipment, and places a call-for-service.

After an originating marker has identified the calling line equipment number, has preselected an idle path, and has identified the R unit outlet, this information is loaded into the marker communication register MCR and sent to the data processor unit via its communication transceiver CCR.

While sending line number identity (LNI) and route data to the data processor, the marker operates and tests the path from the calling line to the register-junctor. The closed loop from the calling station operates the register-junctor pulsing relay, contacts of this relay are coupled to a multiplex pulsing highway.

The data processor unit, upon being informed of a call origination, enters the originating phase.

As previously stated, the "data frame" (block of information) sent by the marker includes the equipment identity of the originator, originating junctor and register-junctor, plus control and status information. The control and status information is used by the data processor control program in selecting the proper function to be performed on the data frame.

The data processor analyzes the data frame sent to it, and from it determines the register-junctor identity. A register-junctor translation is required because there is no direct relationship between the register-junctor identity as found by the marker and the actual register-junctor identity. The register-junctor number specifies a unique cell of storage in the core memories of both the register-sender and the data processor, and is used to identify the call as it is processed by the remaining call processing programs.

Once the register-junctor identity is known, the data frame is stored in the data processor's call history table (addressed indirectly by register-junctor number), and the register-sender is notified that an origination has been processed to the specified register-junctor.

Upon detecting the pulsing highway and a notification from the data processor that an origination has been processed to the specified register-junctor, the central control circuits of the register-sender sets up a hold ground in the register-junctor. The marker, after observing the register-junctor hold ground and that the network is holding, disconnects from the matrix. The entire marker operation takes approximately 75 milliseconds.

Following the register-junctor translation, the data processor performs a class-of-service translation. Included in the class-of-service is information concerning party test, coin test, type of ready-to-receive signaling such as dial tone required, type of receiver (if any) required, billing and routing, customer special features, and control information used by the digit analysis and terminating phase of the call processing function. The control information indicates total number of digits to be received before requesting the first dialed pattern translation, pattern recognition field of special prefix or access codes, etc.

The class-of-service translation is initiated by the same marker-to-data processor data frame that initiated the register-junctor translation, and consists of retrieving from drum memory the originating class-of-service data by an associative search, keyed on the originator's LNI (line number identity). Part of the class-of-service information is stored in the call history table (in the data processor unit core memory), and part of it is transferred to the register-sender core memory where it is used to control the register-junctor.

Before the transfer of data to the register-sender memory takes place, the class-of-service information is first analyzed to see if special action is required (e.g., non-dial lines or blocked originations). The register-junctor is informed of any special services the call it is handling must have. This is accomplished by the data processor loading the results of the class-of-service translation into the register-sender memory words associated with the register-junctor.

After a tone receiver connection (if required), the register-junctor returns dial tone and the customer proceeds to key (touch calling telephone sets) or dial the directory number of the desired party. (Party test on ANI lines is performed at this time.)

The register-junctor pulse repeating correed follows the incoming pulses (dial pulse call assumed), and repeats them to the register-sender central control circuit (via a lead multiplex). The accumulated digits are stored in the register-sender core memory.

In this example, a local line without special features is assumed. The register-sender requests a translation after collecting the first three digits. At this point, the data processor enters the second major phase of the call processing function — the digit analysis phase.

The digit analysis phase includes all functions that are performed on incoming digits in order to provide a route for the terminating process phase of the call processing function. The major inputs for this phase are the dialed digits received by the register-sender and the originator's class-of-service which was retrieved and stored in the call history table by the originating process phase. The originating class-of-service and the routing plan that is in effect is used to access the correct data tables and provide the proper interpretation of the dialed digits and the proper route for local terminating (this example) or outgoing calls.

Since a local-to-local call is being described (assumed), the data processor will instruct the register-sender to accumulate a total of seven digits and request a second translation. The register-sender continues collecting and storing the incoming digits until a total of seven digits have been stored. At this point, the register-sender requests a second translation from the data processor.

For this call, the second translation is the final translation, the result of which will be the necessary instructions to switch the call through to its destination. This information is assembled in the dedicated call history table in the data processor core memory. Control is transferred to the terminating process phase.

The terminating process phase is the third (and final) major phase of the call processing function. Sufficient information is gathered to instruct the terminating marker to establish a path from the selector matrix inlet to either a terminating local line (this example) or a trunk group. This information plus control information (e.g. ringing code) is sent to the terminating marker.

On receipt of a response from the terminating marker, indicating its attempt to establish the connection was successful, the data processor instructs the register-sender to cut through the originating junctor and disconnect on local calls (or begin sending on trunk calls). The disconnect of the register-sender completes the data processor call processing function. The following paragraphs describe the three-way interworking of the data processor, terminating marker, and the register-sender as the data frame is sent to the terminating marker, and the call is forwarded to the called party and terminated.

A check is made of the idle state of the data processor communication register, and a terminating marker. If both are idle, the data processor writes into register-sender core memory that this register-junctor is working with a terminating marker. All routing information is then loaded into the communication register and sent to the terminating marker in a serial communication.

The register-sender now monitors the ST lead (not shown) to the network, awaiting a ground to be provided by the terminating marker.

The marker checks the called line to see if it is idle. If it is idle, the marker continues its operation. These operations include the pulling and holding of a connection from the originating junctor to the called line via the selector matrix, a terminating junctor, and the line matrix.

Upon receipt of the ground signal on the ST lead from the terminating marker, the register-sender returns a ground on the ST lead to hold the terminating path to the terminating junctor.

When the operation of the matrices has been verified by the marker, it releases then informs the data processor of the identity of the path and that the connection has been established. The data processor recognizes from the terminating class that no further extension of this call is required. It then addresses the register-sender core memory with instructions to switch the originating path through the originating junctor.

The register-junctor signals the originating junctor to switch through and disconnects from the path, releasing the R matrix. The originating junctor remains held by the terminating junctor via the selector matrix. The register-sender clears its associated memory slot and releases itself from the call. The dedicated call history table (for that register) in the data processor core memory is returned to idle.

B. Symbolism for Gates and Bi-stable Devices

The logic circuits of the communication register subsystem are generally implemented with integrated circuits, mostly in the form of NAND gates, although some other forms are also used. The showing of the logic in the drawings is simplified, in most instances, by using gate symbols for AND and OR functions, the AND function being indicated by a line across the gate parallel to the input base line, and the OR function being indicated by a diagonal line across the gate. Inversion is indicated by a small circle on either an input or an output lead. The gates are shown as having any number of inputs and outputs, but in actual implementation these are limited by loading requirements and propagation delays well known in the art. Latches are indicated in the drawing by square functional blocks with inputs designated S and R for set and reset respectively; the circuits being in practice implemented generally by two NAND gates with the output of each connected to an input of the other, which makes the circuit a bi-stable device. The logic also uses bi-stable devices in the form of JK flip-flops implemented with integrated circuits, indicated in the drawings by rectangles having the J and K inputs indicated by a small semicircle, a clock input indicated by C, and set and reset inputs indicated by S and R. Not all of the inputs for these devices are shown in the drawings. The J and K inputs are each actually AND gates having three external inputs, but the unused inputs which are actually terminated in some manner are not always shown on the drawings.

C. Communication Registers CCR and MCR General Description

Figure 3:
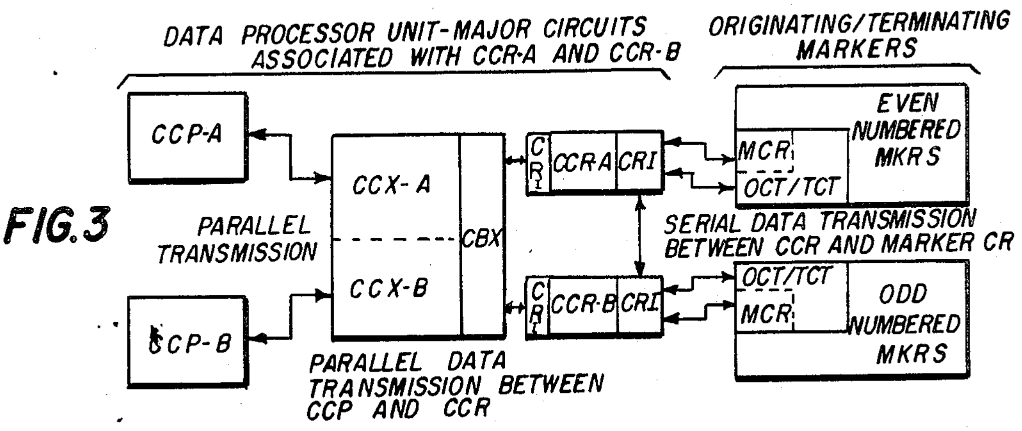
FIG. 3 is a block diagram illustrating the interconnections between the computer communication register of FIG. 1 and a plurality of marker communication registers of marker transceivers.

Referring now to FIGS. 1–3 of the drawings, the computer communication register CCR used in the data processor unit DPU and the marker communication register MCR used in the transceivers OCT and TCT of the respective originating and terminating markers provide for data transmission between the data processor unit DPU and the originating and terminating markers during call processing and maintenance. Each marker has a communication transceiver, and the communication register MCR is located within the transceiver. The marker communication register MCR makes up the major portion of each marker's communication transceiver.

The communication register in the data processor unit is known as the computer communication register CCR and is controlled by the computer central processor CCP via the computer channel multiplexor CCX. The register CCR operates in a manner similar to the communication transceivers in the markers.

The register CCR (FIG. 1) is effectively a communication transceiver, although it is not normally referred to as such. It is a controller accessed from the multiplexor CCX, as are the computer and maintenance device buffers (not shown), but it communicates with the markers rather than the input/output devices. The register CCR functions as a store and forward buffer for data transmitted between the markers and the processor CCP located within the unit DPU. Data is sent to the register CCR in parallel from the processor CCP, via the multiplexor CCX, and is transmitted from the register CCR to the markers serially. Data from the markers comes to the register CCR serially and is sent to the processor CCP in parallel.

Referring now to FIG. 3, there are two registers in the unit DPU, CCR-A and CCR-B, operating in an active-standby configuration. The on-line activate register CCR transfers call processing, metering, routining, and maintenance information between the processor CCP and the originating and terminating markers. The on-line standby register CCR dedicates itself to the data link at which its scanner is set. The standby register CCR can only send and receive data between itself and the link at which its scanner is stopped. Data can be exchanged between registers CCR-A and CCR-B during a maintenance routine. The communication registers can be reconfigured by the use of select directives (SEL instructions) from the processor CCP. The units CRI for the registers CCR-A and CCR-B are cable driver/receiver interface circuits, and the unit CXB between the multiplexors CCX-A and CCX-B associated with the respective processors CCP-A and CCP-B comprises computer channel multiplexor cables.

C1. Modes of Operation

There are three basic modes of operation of the register CCR (On-Line Active):

a. Scanning. In this mode, the register CCR scans the data links for a "call for service received" signal CFSR from a marker.

b. Sending. In this mode, the register CCR is sending a message to a marker.

c. Receiving. In this mode, the register CCR is receiving a message from a marker.

While in the scanning mode, the on-line active register CCR can be seized by either a marker or the central processor. The on-line standby register CCR can be placed into the scanning mode but will not scan due to its standby status. In the sending or receiving modes, the on-line standby register CCR looks for a call for service signal from the register CCR or marker data link at which its scanner is set.

If the register CCR is seized by the central processor CCP while the CCR is scanning, the communication register stops scanning and returns an "idle and scanning" status to the central processor. This status is held until the processor CCP disconnects, permitting the register CCR to begin scanning again. If the register CCR had been idle when the processor CCP seized it, the CCP can load a message into the register CCR and then initiate the transmission of the message to the marker specified by means of a marker address loaded into the input address word.

As in the scanning mode, if the central processor seizes the register CCR when it is sending, the register CCR holds its status until requested to disconnect by the processor CCP. If the communication register is not seized, and it finishes sending, its status changes to "idle and scanning," after a successfully sent message. If the message was sent unsuccessfully, its status changes to a "trouble status." The latter case causes an interrupt to be sent to the processor CCP, and the CCP initiates a software program that permits fault isolation of the trouble. When the interrupt is reset and the register CCR is disconnected from the processor CCP, the register CCR begins scanning again. The processor CCP can place the register CCR into the sending mode, if it does so before the interrupt is reset, causing the CCR to send instead of scan. The register CCR can be directed to interrupt the CCP after each successfully sent message as well as when an error is detected during the message transmission.

The register CCR interfaces with the processor CCP via the computer channel multiplexor CCX and from the CCP, the CCR receives 24 data bits, one parity bit, one memory protect bit (used by the processor CCP and not used by registers CCR and MCR), a select strobe signal SS2, a data strobe signal, acknowledge and control strobe signals, and control pulse directive CPD data for the markers. The register CCR sends the processor CCP 24 data bits, one parity bit, one memory protect bit, a verify strobe signal, and a disconnect strobe signal. This two-way communication between the processor CCP and register CCR is performed in parallel.

Sense Lines

There are 14 sets of three sense lines hardwired to the register CCR from the markers; eight for the originating markers and six for the terminating markers (FIG. 1). The sense lines are connected via cable connections to the processor CCP via the computer line processor CLP (FIG. 2) and are not interrogated by the register CCR (or sent via the multiplexor CCX). These sense lines and their functions (when set to a logic level 1) are as follows:

a. STANDBY INTERRUPT. Informs the processor CCP that the marker is in a standby state (originating marker only).

b. MALFUNCTION INTERRUPT. Informs the processor CCP of any trouble encountered during marker operation (originating marker and terminating marker).

c. IDLE. Informs the processor CCP that the marker is in an idle condition (originating and terminating marker).

d. CLOCK ALARM. If the marker clock signal does not become a logic level 1 within a certain time period, the signal CLOCK ALARM is enabled (originating marker and terminating marker).

e. ON LINE. Informs the processor CCP that the marker is in a mode capable of call processing (originating and terminating marker).

f. OFF LINE. Informs the processor CCP that the marker cannot handle call processing but is not in MALFUNCTION (originating and terminating marker).

g. MESSAGE RECEIVED LATCH OR INITIALIZE SEND. Informs the processor CCP that the message received latch in the marker is set to a logic 0 or that the marker is in a "constant send" condition.

There are four sense lines to the central processor from the interrupt and sense control section of the register CCR via the computer channel multiplexor:

a. READY SENSE. Indicates that the register CCR has successfully received or sent a data frame from a marker.

b. READY INTERRUPT. Initiates further processing by interrupting the processor CCP indicating it has completed successfully or unsuccessfully the previously requested function.

c. ERROR INTERRUPT. Indicates to the processor CCP that the data frame transfer was not performed properly.

d. ON-LINE SENSE. Indicates that the register CCR is on-line.

C2. Clock, Data, and Status Leads

Each scanner address in the register CCR is dedicated to five leads from a marker on the other register CCR. These leads are the data, clock, and three status leads (FIG. 1). Selecting a scanner address or detecting a signal CFSR on the status leads (see item c below) enables these leads for communications as follows:

a. DATA. Used to transmit data words; two words used with an originating marker and four with a terminating marker.

b. CLOCK. Transmits a CCR clock signal used by the marker communication register to send the data words to the register CCR.

c. S1 (Status Lead 1), S2 (Status Lead 2), and S3 (Status Lead 3). Transmits marker communication status to the register CCR, and CCR status to the marker.

C3. Data Transfer Between Communication Registers

The "call for service received" signal CFSR from the marker prepares (initializes) the register CCR for operation. The register CCR then sends an acknowledge signal to the marker communication register and thereafter begins receiving data from it. Shift checks and parity checks are made on each word shifted into the register CCR. After two or four words of data have been received, depending on whether data is coming from the originating marker communication transceiver OCT or the terminating marker communication transceiver TCT, respectively, further transmission is inhibited. The register CCR then sends a good message received signal GMR or a bad message received signal BMR to the marker communication transceiver.

If a signal GMR is sent to the marker transceiver, the marker transceiver removes its call for service signal CFS and a CCR ready sense line (with or without a ready interrupt-level 4) is set to the high state (depending on the program control exercised by the processor CCP). If a signal BMR is sent to the marker transceiver, it removes its call for service and sends the message to the register CCR again. Each BMR signal causes the register CCR to send an error interrupt to the processor CCP. If an error interrupt is received two consecutive times, the processor CCP notes this as a fault and requests program isolation of it. If the call for service is not removed by the marker, a time out circuit in the register CCR initiates an error interrupt to the processor CCP or places the register CCR in the idle and scanning mode (depending upon program control exercised by the processor CCP).

When the processor CCP sends data to a marker, the processor CCP first executes an instruction notifying the register CCR to present its status. The register CCR then returns a "standard status word" to the processor CCP. This standard status word contains the following information concerning CCR status:

a. If the register CCR is sending or receiving.

b. If the register CCR is idle and scanning.

After receiving the status word, the processor CCP selects the scanner address of the marker to which it wishes to send and loads the shift registers in the register CCR with data. The register CCR then sends the data. Each word is checked for parity and proper shifting by the marker. A BMR signal is sent back to the register CCR after each data frame and at the end of the message if errors are detected. If no errors are detected, a GMR signal is sent at the end of the message.

If a signal GMR is received at the end of the message, the register CCR either goes into the "idle and scanning" mode or interrupts the processor CCP, depending on the program control exercised by the processor CCP. If a signal BMR is received at the end of the message, the register CCR generates an error interrupt which causes the processor CCP to reset the register CCR and begin loading data into the CCR shift registers again. If a signal BMR is received a second time, the CCR fault isolation program is run by the processor CCP to locate the cause of the problem.

The transceiver in each marker and the active register CCR in the data processor unit is used to transfer call processing, metering, routining, and maintenance information between these sub-systems.

Configuration

With the maximum configuration of two office sections and one selector section, the maximum number of markers that can be provided is 14. For any configuration of office and selector sections, the maximum amount of marker pairs is four originating markers and three terminating markers.

Each originating marker and its duplicate can process two different calls simultaneously, if the calls are in different line or trunk register group matrices. The two markers in a terminating marker pair cannot be operated simultaneously because they use a common data bus to the trunks and/or junctors they control. The terminating marker pair is, therefore, operated on an alternating basis.

Figure 4:
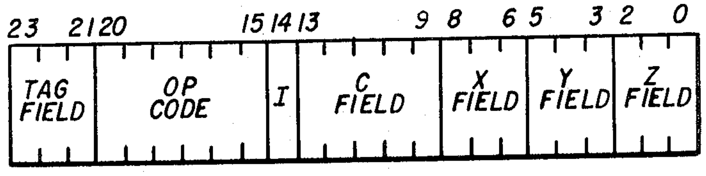
FIGS. 4–9 are charts of information useful in understanding the present invention.

The on-line standby configuration of the two computer communication registers is under control of the DPU software. As shown in FIG. 4, there is shown the format of select (SEL) instructions used to change the CCR on-line standby status. The operation code (OP CODE) represents the operation to be performed. The tag field is unused when addressing the register CCR. Select instructions are also used to control the operation of the register CCR for such operations as:

a. Causing the register CCR to send a message.

b. Clearing the register CCR of all stored errors and interrupts.

c. Disconnecting the register CCR from the input-output bus.

C5. Marker Communication Transceivers

The marker communication transceivers OCT and TCT are primarily the same for both the originating and terminating markers; therefore, only the originating marker communication transceiver will be described. As shown in FIG. 3, the transceiver OCT is linked with the register CCR within the unit DPU in two ways:

a. Sense lines from the transceiver OCT.

b. Control pulse directive (CPD) bus from the register CCR.

The communication register MCR within the transceiver OCT transmits serially to the computer communication register CCR via clock pulse, data, and status leads. Transmission from the register CCR to the MCR of the transceiver OCT only occurs during equipment routining.

The originating marker — data processor unit communication normally consists of a one-way serial transmission from the register MCR to the computer communication register CCR of the data processor unit. This transmission contains such information as:

a. Control data and marker identity.

b. Originating line number or incoming trunk identity.

c. Matrix identity of originating junctor.

d. Matrix identity of register junctor.

Marker status and alarm sense lines are connected through the register CCR to the computer line processor CLP. These sense lines are hardwired through the register CCR directly to the processor CLP and should not be confused with the CCR sense lines that are used to provide the status of the register CCR to the processor CCP. The sense lines from the markers relate only the various conditions of the markers. Examples of these marker sense lines are ON LINE, STANDBY, CLOCK ALARM, etc., as hereinafter described in greater detail.

Control pulse directive signals CPD are transmitted from the processor CCP to the markers over the control pulse directive bus. These CPD lines are hardwired through the register CCR and are not processed by the register CCR. The communication transceivers OCT and TCT are the sections of the markers that receive all control pulse directives. Some typical control pulse directives sent from the data processor unit to the markers are as follows:

a. Standby. Upon receiving this directive and as soon as the marker returns to the idle state, it will go into standby status. In this condition, a matrix call for service will not be assigned.

b. Malfunction interrupt reset. This directive inhibits the marker from sending malfunction signals to the processor CCP.

c. Reset enable. Resets the marker.

d. Report blockage. Upon receiving this directive, the marker will report the condition of busy links, busy paths, and busy register-junctors whenever they are encountered.

e. Do not report blockage. The marker will not report the conditions listed in (d).

f. Send shift register data. When the marker goes into a trouble condition, it sends the data in its shift register to the data processor unit.

g. Perform foreign potential line test. The marker performs a foreign potential test on the TIP and RING transmission leads.

h. Do not perform foreign potential line test. The marker does not perform a foreign potential test on the TIP and RING leads.

C6. Computer Communication Register CCR

The computer communication register is duplexed within the data processor unit and communicates with the originating and terminating markers by the use of communication registers in each marker. Each one of the registers CCR-A and CCR-B communicates with a maximum of 14 markers by the use of data links (each link contains five leads). There are 15 data links, of which 14 are for markers, and one is used to provide a communication path between the two CCR registers. There are also provisions for communicating with the markers by the use of CPD signals. Since the two registers CCR-A and CCR-B are similar to one another, only register CCR-A will be described herein.

C7. CCR Subcircuits

Figure 12:
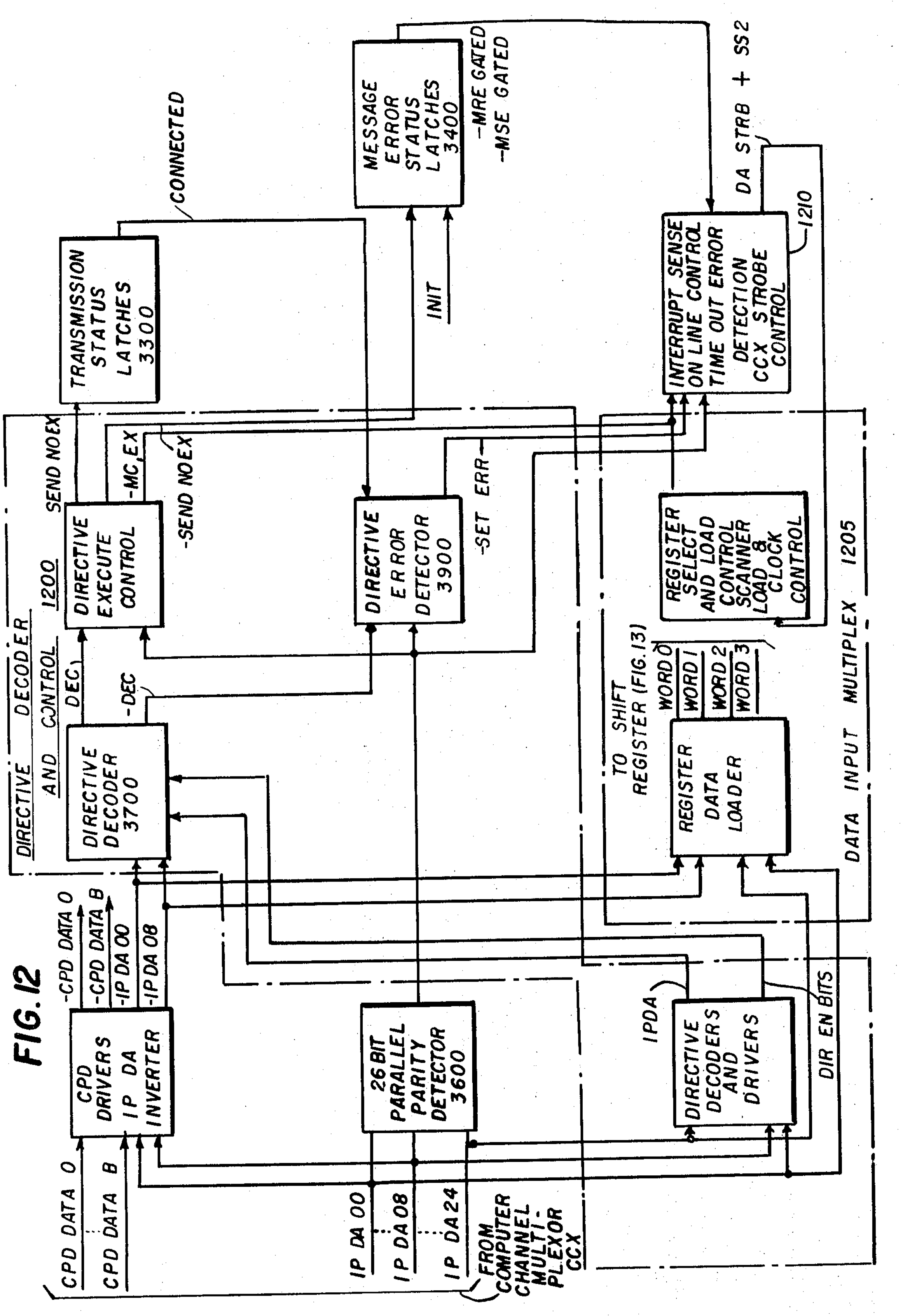
FIGS. 12 and 13 comprise a somewhat more detailed block diagram of the computer communication register of FIG. 1.
Figure 13:
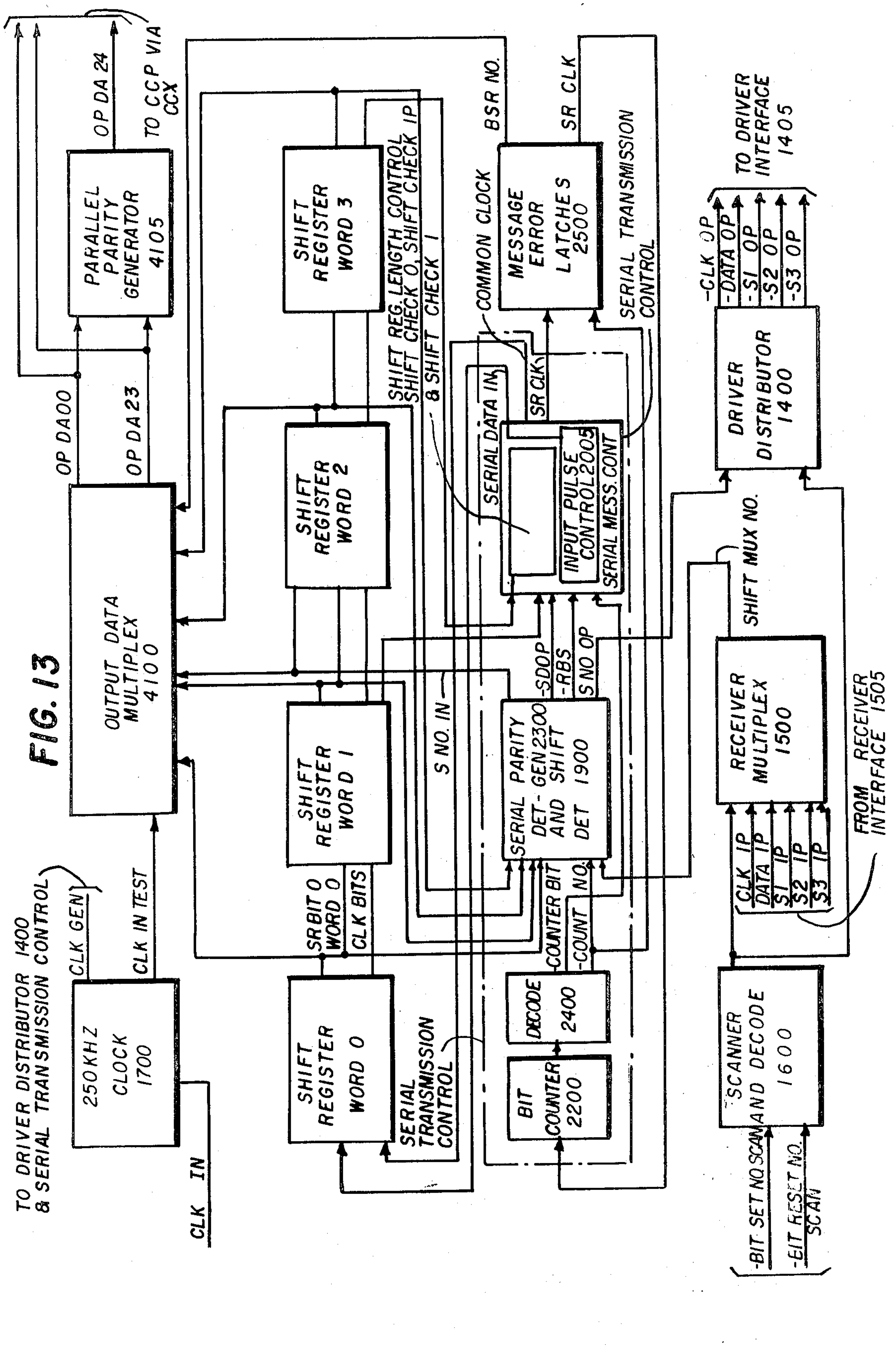

As shown in FIGS. 1, 12 and 13, subcircuits within the register CCR include the shift registers, scanner and scanner decode, serial transmission control, and the parallel parity circuits.

Figure 5:
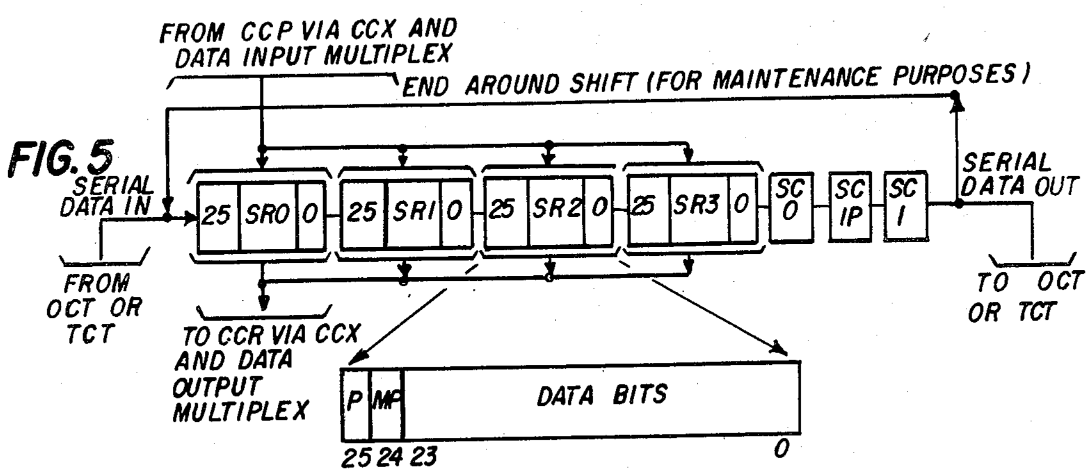

The shift register comprises four shift register word portions — shift register words 0–3 (see FIG. 5). The following is a table listing an explanation of the shift register terms:

- BITS 0–23 — Data bits, set by computer central processor or markers
- BIT 24 — Memory protect bit (MP); always zero when computer central processor or marker is sending
- BIT 25 — Parity bit (P); set by computer central processor when sending or by the marker when marker is sending
- SRO, SR1, SR2, SR3 — Shift registers 0, 1, 2 and 3
- SCO, SCIP, SC1 — Shift check bit flip-flops
- OCT — Originating marker communication transceiver
- TCT — Terminating marker communication transceiver
- CCX — Computer channel multiplexor
- CCP — Computer central processor These four registers receive parallel data from the processor CCP, via the data input multiplex, and shift the data out serially to the marker communication registers MCR in either one of the transceivers OCT or TCT. When transmitting to the transceiver OCT, only shift registers 0 and 1 are used. The shift registers receive serial data from the transceivers OCT and TCT and transmit the data to the processor CCP, in parallel, via the CCR data output multiplex.

As shown in FIGS. 1 and 13, a scanner and scanner decode circuit 1600 is used to scan for calls for service from the markers and to specify marker addresses during the sending mode.

The serial message control circuits of FIG. 1 include (1) a 6-bit counter that controls the sequence of events in the register CCR; (2) a section used for checking and generating the parity of the serial data (input and output); (3) a shift checking control circuit that checks the serial input data sent into the shift register for proper shifting; (4) a status decoder circuit which initiates the register CCR operation when a call for service is received; (5) a clock circuit that provides a signal (—COMMON CLOCK) that enables the data to be shifted into the shift registers; and (6) circuitry used to initialize the register CCR.

The parallel parity circuit is used to generate parity for each 24-bit (0–23) data word coming from the register CCR that passes through the communication register data output multiplex to the computer channel multiplexor CCX. The parity circuit sets bit 24 for odd parity when bits 0–23 are even. A parity circuit is used to check all 26 bits (0–25) coming from the multiplexor CCX. If these 26 bits have odd parity, the multiplexor CCX is notified to indicate that the data was received without error.

The data input multiplex bus receives 26 bits of information from the multiplexor CCX. Bits 0–23 are data bits. Bit 24 is a memory protect bit, always set to 0 for all register CCR operations. Bit 25 is the parity bit.

Figure 6:
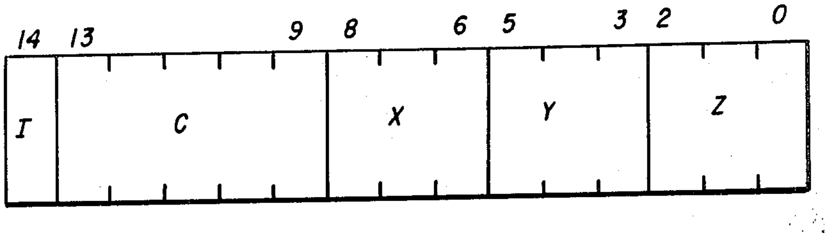

The directive decoder circuit is used to decode the input-output (I/O) command word (the effective address of the SEL instruction, see FIGS. 4 and 6) coming from the multiplexor CCX. Decoding takes place in conjunction with a "select strobe 2" signal SS2 which occurs during a SEL instruction. Referring to FIG. 6, the following is a list of the standard input/output command word format:

- I - When set, ready signals from the computer communication register will cause a level 4 interrupt to the computer central processor
- C - Specifies controller to be addressed
- X - X field; always set to 0 when communicating with the computer communicating register
- Y - Y field; directive extension of the Z field
- Z - Z field; indicates the directive to be performed by the computer communication register Some examples of SEL instructions are as follows: Y field = 0, Z field = 6, (or 06), which is the "operate active" instruction enabling the register CCR to scan all data links for calls for service; Y = 1, Z = 6 (16), which is the "operate standby" instruction that permits the register CCR to scan only the data link at which the scanner is set; and Y = 0, Z = 5 (05), which is the "take controller (CCR in this case) off line" instruction that takes the specified register CCR off line.

Three shift check bit flip-flop circuits (SC1, SC1P and SCO) are used to check for proper data shifting during the sending or receiving of serial data between the communication transceivers of the markers and the register CCR. These bits are also used by the markers to check for proper data shifting into the shift registers of the transceivers of the markers.

The data output multiplex bus receives parallel data from the shift registers for further transfer to the processor CCP via the multiplexor CCX. It is also used to present the CCR standard status word and the two error status words (see Tables 1, 2 and 3, respectively) to the processor CCP, when directed. The standard status word provides the status of the register CCR to the processor CCP prior to data transfer to and/or from the register CCR. The error status words can be requested by the processor CCP upon receiving an error interrupt. The processor CCP uses the error status data to determine further actions via program control.

The transmission status latches provide the status of messages received or sent by the register CCR, which is used to control other operations within the register CCR. These latches also provide control for the shift register length control circuit, and they also generate control signals used to set interrupts sent to the processor CCP.

The CCR status latches include the busy sending, busy receiving, connected, and idle and scanning latches. These latches provide data used in the standard status word which is sent to the multiplexor CCX via the data output multiplex. The output signals from the latches also control other circuits within the register CCR.

The interrupt and sense control circuits contain the ON LINE and READY INTERRUPT sense line latches whose outputs are connected to the computer line processor CLP via the CCX cable interface circuit (CXB). There are other sense line outputs from these control circuits such as ON LINE ACTIVE and ERROR SENSE that are connected to the processor CLP directly (via a cable) and are not acted upon by the multiplexor CCX.

The output of the time-out error detection circuit as shown in FIG. 12 is called TOE GEN and can time-out the register CCR under certain conditions, such as a "stuck" call for service from a marker.

The strobe control circuit generates the signals DISCONNECT STROBE and VERIFY STROBE which are sent to the multiplexor CCX, and a DATA STROBE + SS2 signal used by other circuits within the register CCR.

The error status circuit provides an indication of error status from the message error latches which generate the signals BAD SHIFT RECEIVED, BAD PARITY RECEIVED, and BAD PARITY SENT. These signals are used for the error status words (1 and 2) and by other circuits within the register CCR. The shift register length control circuit 2100 connects the shift check bit circuits to shift register 1 or 3 depending on which marker is communicating with the register CCR. Therefore, for an originating marker, the shift register length control circuitry connects register 1 to the shift check bit circuits. When communicating with the terminating marker, shift register 3 is connected to the shift check bit circuits. The driver distributor circuit 1400 (via the interface 1405) transfers the serial output of the register CCR into the communication register of the marker whose address was generated by the scanner (FIG. 1). Any marker can be connected to any one of the outputs of the driver distributor to provide any desired configuration.

The receiver multiplex circuit 1500 (via the interface 1505) receives the serial input from a marker communication register and transfers this data to the register CCR shift registers under control of the serial transmission control circuit.

The clock circuit 2850 is a 250 kHz clock generator used to transmit data in both directions between the CCR registers and the marker transceivers.

The transfer of the control pulse directives (CPD's) from the processor CCP to up to 14 possible marker communication transceivers is performed in the register CCR by the CPD drivers circuit consisting of cable receivers, before they are sent to the CPD drivers. These marker CPD instructions do not perform any function in the register CCR.

TABLE 1

Standard Status and Scanner Address Word

| BIT(S) POSITION | EXPLANATION |
|---|---|
| 0–4 | Scanner bits 0–4 (address scanner output) |
| 5 | CCR is in the idle and scanning state |
| 6 | CCR is in the sending state |
| 7 | CCR is in the receiving state |
| 8 | Message sent successfully |
| 9 | Message received successfully |
| 10 | Error in sending |
| 11 | Error in receiving |
| 12 | Scan state: 1=on-line active, 0=on-line standby or off-line |
| 13 | Interrupt after sending set |
| 14 | 1=4 word message, 0=2 word message |
| 15 | Ready interrupt |
| 16 | Error interrupt |
| 17 | Ready interrupt armed |
| 18 | Error interrupt for receiving time out errors enabled |
| 19 | Spare (=0) |
| 20 | Transmission error |
| 21 | Directive error |
| 22 | "PRIME" flip-flop in CCR |
| 23 | Spare (=0) |
| 24 | Parity bit of standard status word |

TABLE 2

Error Status Word 1

| BIT(S) | EXPLANATION |
|---|---|
| 0–3 | Receiving parity error word 0–2 |
| 4–7 | Error in shifting word 0–2 |
| 8–11 | Sending parity error word 0–3 |
| 12 | Parity error receiving — CCR or MKR CR |
| 13 | Shifting error — CCR or MKR CR |
| 14 | Sending parity error — CCR |
| 15 | Message received bad at MKR CR |
| 16 | Prefix bit 1 (SC1, normally a 1) |
| 17 | Prefix bit 2 (SC1P, normally a 1) |
| 18 | Prefix bit 3 (SCO, normally a 0) |
| 19 | Data in from selected link |
| 20 | Clock detector output from selected link |
| 21 | Status 1 in from selected link |
| 22 | Status 2 in from selected link |
| 23 | Status 3 in from selected link |
| 24 | Parity bit of error status word 1 |

TABLE 3

Error Status Word 2

| BIT(S) | EXPLANATION |
|---|---|
| 0–3 | Parity bit (bit 25) of data words 0–3 |
| 4–5 | Spares (=0) |
| 6–9 | Data bit 24 of data words 0–3 (should be =0) |
| 10–16 | Spares (=0) |
| 17 | Serial transmission logic initialized |
| 18 | Spare (=0) |
| 19 | Data lead out |
| 20 | Spare (=0) |
| 21–23 | Status leads 1–3 out |
| 24 | Parity bit of error status word 2 |

C8. CPD Instruction Code Format

Figure 7:
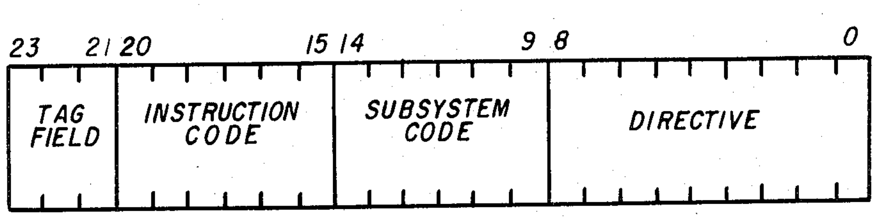

The CPD instruction code format is shown in FIG. 7. Sub-system code bits (9–14) indicate to which of 64 possible sub-systems (addresses) a CPD may be sent. Of the 64 addresses, 14 are reserved for markers (addresses 14 through 31). The CPD sub-system code address is normally in octal form. For example, the sub-system code address one-four (14), written in octal form, is represented in bits 9–14 as 001 100 in binary coded octal form. The directive bits 0 through 8 define the function to be performed, and the instruction bits 15 through 20 define control pulse directive (CPD) code 178. The tag field defines an address modification.

The CPD signals used by the markers are sent by the processor CCP via the multiplexor CCX and resistor CCR. There are 14 CPD lines (or C strobe lines), one for each marker. There are 126 data lines, nine for each marker. The active multiplexor CCX can connect the appropriate CPD line and data lines to the associated marker. The nine directive data bits transmitted over the data lines indicate the operation to be performed.

C9. Select Instructions

The communication registers CCR-A and CCR-B in the data processor unit can be placed into an on-line active or on-line standby configuration by the use of select (SEL) instructions. For a representation of the select instruction format, see FIG. 4.

The SEL instructions that control the function of the register CCR use standard input/output command word format (bits 0–14) as the effective address of the instruction (see FIG. 6). Bits 9–13 represent the C field portion of the SEL instruction and are used to specify one of 16 possible controllers to be addressed (only the first eight are used by the processor CCP). Bit 9 is set to indicate the "B" registers CCR-B. An example of this situation would be to observe the C field of the communication registers. The C field that relates to register CCR-A is 06 (octal) and for register CCR-B, 07 (octal). Bit 9 is then observed to be set for register CCR-B (07 equals 000 111 in binary coded octal).

The X field of the SEL instruction is always 0 when addressing the CCR controller. The Y and Z fields are the directive modifier and the directive, respectively, which instruct the particular register CCR (A or B) as to what operations to perform. For example, the octal representation of the 15 lower order binary bits of a SEL instruction could be 06000. The C field portion (06) indicates that register CCR-A is the addressed controller. The X field is 0, as it always is when addressing the CCR registers. The Y field is 0 (which represents the standard status word) and the Z field is 0, which together with the Y field, instructs the register CCR to gate the status group specified by the Y field (standard status word) on to the data output multiplex.

If this SEL instruction is followed in the software program by a STC (store the input channel) instruction, the data on the data output multiplex (in this case the standard status word) is sent to the core main memory section of the computer and stored there at a location specified by the effective address section of the STC instruction (bits 0–14).

If this SEL instruction was followed in the program by a CCI (character copy input) instruction, the data on the data output multiplex is stored in the A register of the computer central processor CCP.

Figure 8:
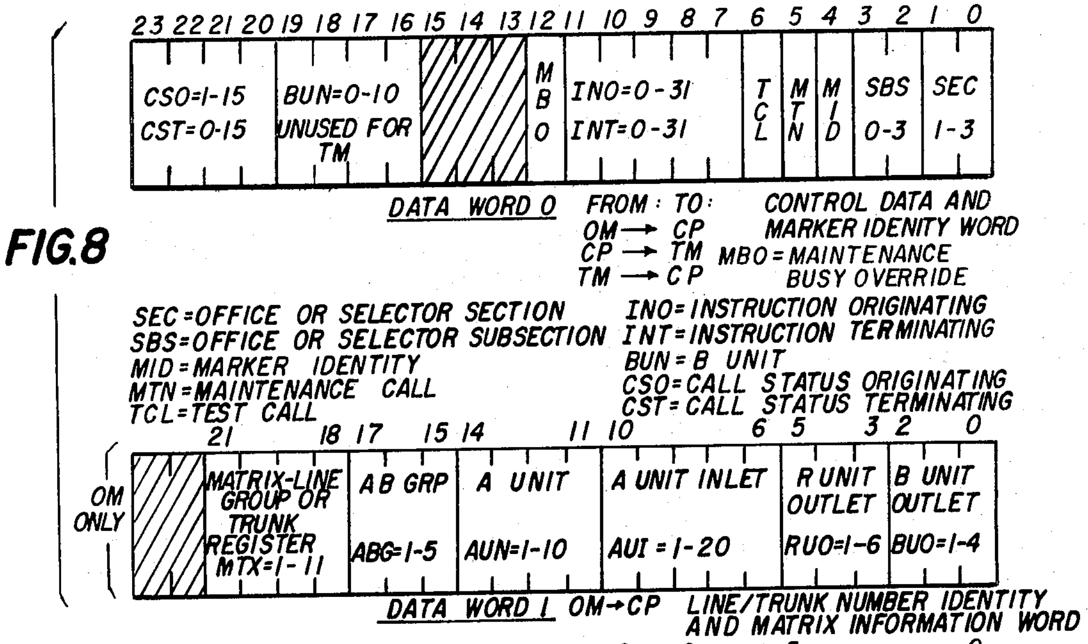
Figure 9:
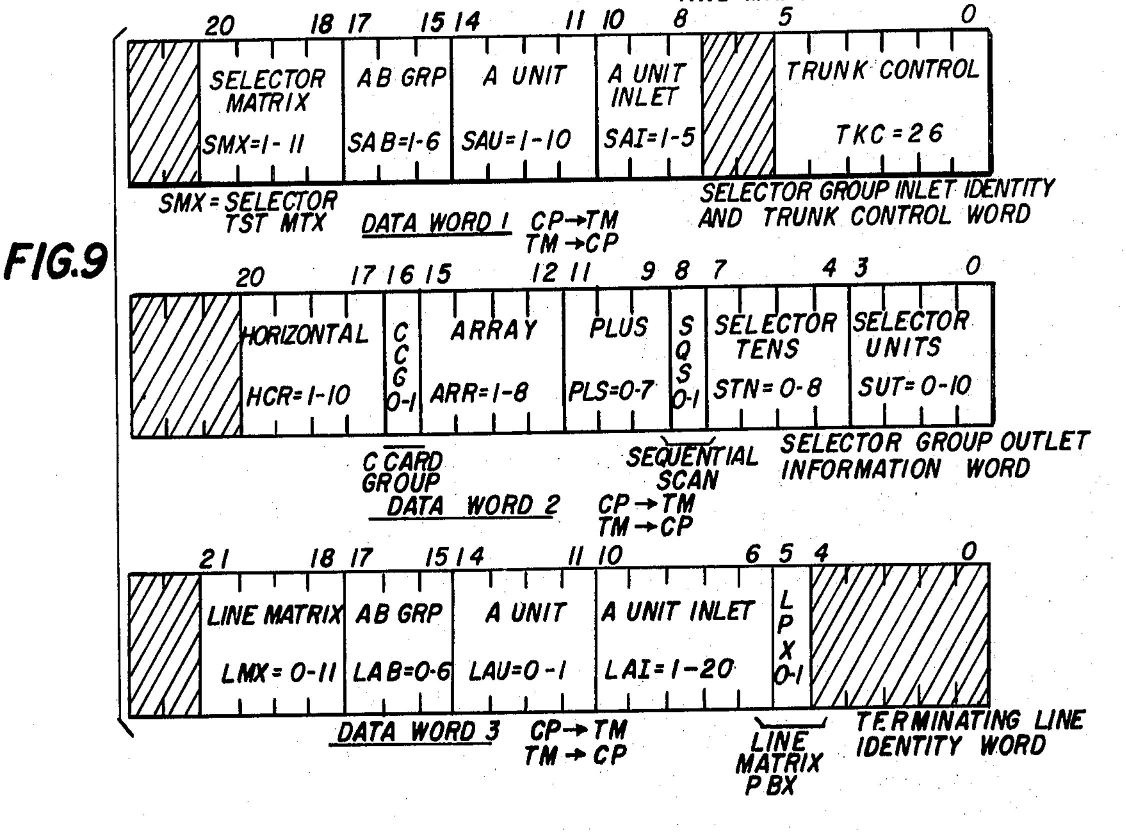

If the Z field of a SEL instruction sent to the register CCR is 3 (011 in binary), the register CCR sends the data words stored in its shift registers to the marker at the preselected scan address. The Y field determines the number of words sent and the manner in which they are sent. Therefore, if the Y field is 0 (SEND 2), two words are sent in the normal mode. If the Y field is 2 (SEND 2 PRIME), two words are sent to a marker in a special mode that causes the message to be returned automatically as sent. Words are sent in the same manner with the Y = 1 (SEND 4) and Y = 3 (SEND 4 PRIME) directives, except that four words instead of two are transferred. The formats for these data words are shown in FIGS. 8 and 9.

C10. Standard Status and Scanner Address Word

The format for the standard status and scanner address word is shown in Table 1. This word is always checked by the processor CCP before the register CCR is placed into a mode of operation; for example, if the processor CCP selects the register CCR while it is in the sending mode. If the standard status word is requested at this time, standard status word bit 6 is set. The address (0–13) of the 14 marker data links is indicated by the bits 0–3 of the address scanner, or if the scanner of the active register CCR is connected to the data link of the standby register CCR, then the address is address 14. The directive that causes this word to be placed on the data output multiplex and which loads the scanner address, has both its Y and Z fields set to 0 and must be followed by a "LDC" or "CCO" instruction.

C11. Error Status Words

Error status word 1 is shown in Table 2. If a directive Z = 0 and Y = 1 is sent to the register CCR from the central processor, error status word 1 is gated to the data output multiplex. A separate SEL instruction, such as a store the input channel (STC) or a character copy input instruction (CCI), cause this data to be stored in either the computer core main memory CMM or the A register within the processor CCP, respectively.

There is a second CCR error status word (see Table 3) that may be selected by a CCP directive. This error status word, along with error status word 1, is requested if an error is detected when the standard status word (bits 10 and 11, Table 1) is checked.

C12. Marker Communication Register MCR

The originating marker communication register MCR is shown in FIG. 10. This register is located in the communication transceiver OCT of each originating marker.

The marker subcircuits communicate with the register MCR of its transceiver, instructing it when to send information to the register CCR. The register MCR, in turn, communicates with the marker subcircuits, forwarding status information related to the data received from the register CCR. In addition, the transceiver OCT gathers marker status information used for fault analysis and forwards it to the register CCR by means of the register MCR.

C13. Originating Marker Communication Frame

The data communication frame is a two word information frame sent between the communication registers of the originating markers OM and those of the data processor unit. In the case of the originating marker, two words are sent to the data processor unit via the register CCR during normal call processing (see FIG. 8). The call processing information contained in the data communication frame pertains to line or trunk origination data.

The contents of the originating marker communication frame, shown in FIG. 8, are as follows:

a. Data word 0 — This is the control data and marker identity word for the total 2 word frame of information.

b. Data word 1—This is the line or trunk number identity and matrix information word that identifies the selected originating junctor (line originations only) and register junctor. The line or trunk number identification includes all the fields from bit 6 through bit 23 of data word one.

There are 12 possible call processing and test call frames, each frame containing 48 data bits. Frames one (line origination) and two (trunk origination), are the normal call processing frames sent from the originating marker to the DPU. Frames three through 12 are test call frames (see FIG. 11) exchanged between the marker communication register and the computer communication register.

For the unit DPU to communicate with the marker OM, the register CCR must be idle, although the marker can be either idle, in trouble, or busy. If idle, the unit DPU sends a STANDBY control pulse directive CPD to the marker communication transceiver (via the register CCR) which places the marker in a standby state. This CPD instruction occurs after the register CCR is loaded with a communication frame. When the marker returns an "acknowledge" signal to the unit DPU, the register CCR begins serial transmission to the register MCR.

Parity is checked on each word in the frame sent to the register MCR. If correct parity was observed, the transceiver OCT returns a "good message received" signal to the register CCR. If correct parity was observed, a "bad message received" signal is sent to the register CCR. The unit DPU can initiate a retrial of the communication frame. If this retrial is still unsuccessful, the register CCR is declared at fault and the unit DPU initiates a fault isolation program to determine exactly what section of the register CCR is defective.

C14. Marker Communication Register Subcircuits

The marker communication register MCR of the originating marker transceiver OCT of FIG. 10 receives the incoming serial data, initializes counters and latches, generates commands that pertain to the MCR status, and distributes the necessary signals to the other sections of the register MCR. Except for the marker interface circuit, each one of the MCR subcircuits is similar to the correspondingly named subcircuit of the register CCR. Except for the size or word capacity of the shift registers, the originating and terminating markers are similar to one another, and thus only the transceiver OCT will be described.

The parity and shift circuits check for good (odd) parity and proper bit shifting on all data sent to or received by the register MCR. Parity is checked on each incoming 26-bit serial data word and correct parity is generated for each 26-bit serial data word shifted out to the computer communication register. The shift detection circuits determine if the shift register is accepting data properly.

There are two 26-bit shift registers in the originating marker communication register. Incoming data is loaded into the shift register serially and is removed from the shift register in parallel to be sent to other circuits within the marker. The marker shift register also acts as a buffer between the marker and the register CCR.

The binary counter and counter decoder circuit consists of a 6-bit binary counter and a 57-bit (0–56) decode section (48 data bits, 2 parity, 2 memory protect, and 3 shift checking bits). The binary counter counts each bit as it is loaded into the shift register.

The marker interface circuitry relates marker communication register status information to other circuits within the marker. Communication from the marker circuits to the register MCR consists of instructing it when to send data to the computer communication register. Communication to the register MCR also consists of data from test points throughout the marker.

CCR interface circuitry consists of cable drivers that transfer information over 10 leads between the marker communication register and the computer communication register. These leads are as follows:

a. Six status leads, S1, S2, and S3 (3 input and 3 output).

b. Two clock leads (1 input and 1 output) used to transfer serial data into and out of the marker shift register.

c. Two data leads (1 input and 1 output) which carry the serial data communication.

C15. Terminating Marker Communication Frame

The terminating marker TM performs only operations ordered by the unit DPU via the register CCR. It never goes out of the idle state on its own, as does the originating marker OM, but it is directed controlled by the unit DPU. When the terminating marker TM is idle, the register CCR can load the communication frame into the marker's communication register.

The format for the four-word data frame for the terminating marker is shown in FIG. 9, and the contents of this communication frame are as follows:

a. Data word 0 — This is the control and marker identity word for the total four word frame of information.

b. Data word 1 — This is the selector group inlet identity and the trunk and terminating junctor control word.

c. Data word 2 — This is the selector group outlet information word. This word specifies a particular group of outlets in the selector group matrix. It also identifies the trunk or terminating junctor selected by the terminating marker TM.

d. Data word 3 — This is the terminating line identity word. This word contains the information required to specify a particular line equipment for a local call termination. Data word 3 also contains information for termination to private branch exchanges on the line matrix. (For trunk terminations, all bits of data word 3 remain in the reset state).

C16. Marker Maintenance Frames

Diagnostic data transfer between the two CCR registers and the marker MCR registers includes error indication, the sequence state of the marker in which the error occurred, and other miscellaneous marker status information.

Figure 11:
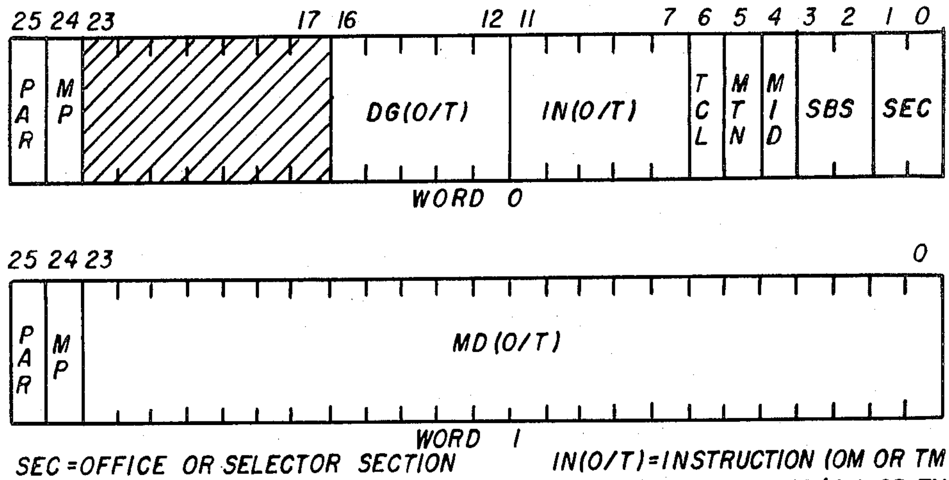
FIG. 11 is a chart of information useful in understanding the present invention.
Figure 48:
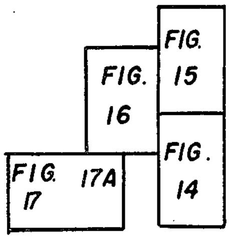
Figure 49:
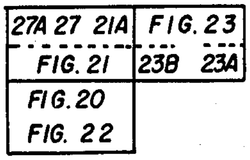
Figure 50:
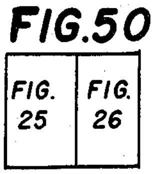
Figure 51:
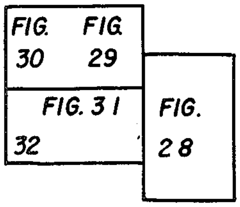
Figure 52:
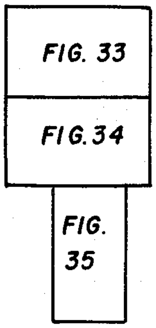
Figure 53:
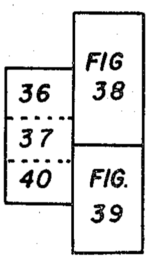
Figure 54:
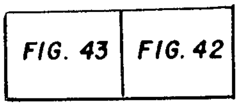
Figure 55:
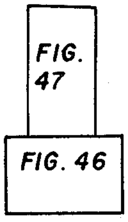

The maintenance communication frame format for words 0 and 1 is shown in FIG. 11. Word 0 of either the OM or the TM frame are used for both requesting the marker to return diagnostic data and for maintenance commands. When the marker receives a diagnostic data retrieval command or a maintenance command, it always returns a communication frame as a reply. The first 12 bits (0–11) of word 0 are identical to data word 0 of the OM and TM communication frame (FIG. 8).

Fields SEC, SBX, and MID (FIG. 11) of word 0 have the same meaning as word 0 of the communication frame shown in FIG. 8, that of identifying the marker being addressed.

The remaining fields of word 0 are interpreted as follows:

a. MTN — When set, this field indicates that the frame is either a maintenance data retrieval command or a maintenance command.

b. TCL — When reset, this test call bit indicates maintenance data retrieval.

c. IN (O/T) — This instruction field indicates various maintenance commands to either the OM or TM, respectively.

d. DG (O/T) — This data group field indicates which 24-bit group of marker status levels is to be returned to the DPU.

Word 1 of the originating marker frame or the terminating marker frame are used to transfer the diagnostic information from the marker to the unit DPU. The 24-bit (0–23) maintenance data field of this word [MD (O/T)] contains the status of various latches and also many logic levels within the marker. The specific status group is determined by the data group field (bits 12–16 of word 0). During transmission from the register CCR to the register MCR, all 24 bits of the maintenance data field are in the reset state. Words 2 and 3 of the terminating marker maintenance communication frame are not used during maintenance transmissions and are placed in the reset state by the unit DPU.

C17. Typical Operation of Communication Registers During Call Processing

Considering now a brief description of a typical operation of the communication registers, the CCR registers are placed into an on-line active/standby configuration by select (SEL) instructions from the central processor CCP. For example, a SEL instruction makes CCR-A on-line active and another SEL instruction makes CCR-B on-line standby. The on-line CCR register is scanning the status leads of each marker for a call for service condition CFS. Referring to FIGS. 4 and 10, when a CFS condition is placed on the status leads by a marker communication transceiver, the CCR scanner gates the logic levels onto the status leads through the receiver multiplex into the status decoder.

The status decoder circuitry determines if the CFS condition is from an originating or terminating marker and generates the signal CFSR for the former or CFSRP in the case of the latter. Using the originating marker as an example, a CFSR signal prepared the register CCR for the receipt of two words from the register MCR. These words comprise the hereinabove-described communication frame.

The register CCR is now initialized to receive the communication frame from the marker communication register. The register CCR recognizes the CFS condition by sending an "acknowledge" signal synchronized with the clock pulses going to the transceiver OCT. The shift check bits and the data bits of the first word are now shifted into the shift register of the register CCR by the clock pulses.

On counts 25–28 and 51–54, shift check tests are performed on the received data words. The shift register's clocking signal is inhibited after the two words are in the shift register. On count 29, the first data word is checked for correct parity by the serial parity circuit. On count 55, the second data word is checked for correct parity. If the words were received properly, a "good message received" signal GMR is sent to the marker. If the two data words were not received properly, a "bad message received" signal BMR is sent to the marker.

C18. Good Message Received (GMR)

In the case of the GMR signal, the marker removes its call for service. The CCR READY SENSE line and "message received OK" signals are now set, and if the "arm ready interrupt" circuit is set, a READY INTERRUPT (level 4) is sent to the computer line processor CLP. This READY INTERRUPT is forwarded to the processor CCP, which acknowledges by sending a SEL instruction that retrieves the CCR standard status word and transfers it into the processor CCP. Based on information in the standard status word, such as the identity of the marker that created the interrupt and the state of the register CCR, the processor CCP executes SEL instructions that cause the data in the CCR shift registers to be loaded into the processor CCP. After storing the data from the register CCR, the processor CCP may either put the register CCR into the idle and scanning mode or reset it and go into a loading sequence to send data to the markers.

C19. Bad Message Received (BMR)

In the case of the BMR signal, the marker removes its call for service. The BMR signal is removed and an ERROR INTERRUPT sent to the processor CCP. The processor CCP then sends SEL instructions to the registers CCR that permit retrieval of the error status words.

The marker, at this time, has a CFS condition placed on the status leads to the register CCR to initiate resending the message. The central processor, by SEL instructions, retracts the scanner by one count (to allow for the "increment before testing for CFS on disconnect" feature) and places the register CCR in an idle and scanning state so that its scanner observes this second CFS condition.

If the second transmission to the register CCR has no errors, the original error indications that occurred during the first CFS condition is ignored and the standard status word and the data words are stored in computer core memory CCM. The processor CCP may now either disconnect the marker from the register CCR and place the register CCR into the idle and scanning state, or reset the register CCR and begin a loading sequence to send a frame to one of the markers.

If the second transmission is in error, the register CCR again sends a BMR signal to the marker. This time, however, the marker does not send another call for service to the register CCR. The CCR fault isolation program is now used to determine the cause of the BMR signal returned to the marker. The processor CCP is also capable of having one register CCR send to the other for maintenance purposes.

If the marker did not remove its call for service (stuck CFS), the TIME OUT circuit either causes the register CCR to initiate an error interrupt or it places the register CCR into the idle and scanning state. This action is dependent upon the status of the "don't interrupt received errors" (DIRE) latch which is located in the interrupt and sense control circuitry of the register CCR.

C20. Sending Sequence (to the Marker)

In this sequence, the CCR registers are assumed to be in the same configuration as in the foregoing received sequence description. The processor CCP is going to send data to the marker; therefore, it initially requests the status of the register CCR (standard status word). The sending sequence can be entered at the end of the receiving or sending sequence, or by selecting the register CCR when it is in the idle and scanning state.

Select and local channel commands from the processor CCP are used to enable the CCR shift registers, permitting the address word and data words to be loaded in parallel into the CCR shift registers. The address word causes the scanner to be set to the marker address. The register CCR is initialized for sending and is disconnected from the multiplexor CCX. The CCR register then sets the status leads to generate a call for service to the marker identified by the address word.

The marker observes the call for service and sets its status leads to the register CCR to generate an acknowledge signal within the register CCR. The register CCR then begins the serial transmission of the two data words to the marker via the driver distributor and interface circuitry within the register CCR.

Each word sent to the marker is checked for proper shifting and correct parity. Any errors detected during the transmission are stored and the transmission is allowed to continue until completion. The processor CCP is interrupted at the end of the transmission if an error or errors were detected.

If, at the end of the transmission, the processor CCP is interrupted due to an error, it can initiate a retrial. If the retrial is successful, the error involved with the first attempt is ignored. If the retrial is also unsuccessful, the computer communication register fault isolation program is then implemented.

As each data word of the communication frame is received into the marker communication register, it is checked for correct parity. The register MCR returns a "good message received" signal GMR to the register CCR if the parity is correct for all words received and no other errors have occurred. If errors are detected in the register MCR, a "bad message received" signal BMR is returned to the register CCR. The BMR signal causes the register CCR to send an error interrupt to the processor CCP, which initiates a retrial as described previously.

In the case of a GMR signal to the CCR, the register CCR either goes into the "idle and scanning" state or interrupts the processor CCP (if the register CCR is preset to do this). If the register CCR was set to interrupt after a successful transmission, the processor CCP can either disconnect the register CCR from the marker or re-enter the sending sequence.

D. Communication Registers CCR and MCR Detail Description

The following sub-sections describe in more detail various features of the communication registers of the present invention.

D1. Driver Distributor and Receiver Multiplex

Figure 14:
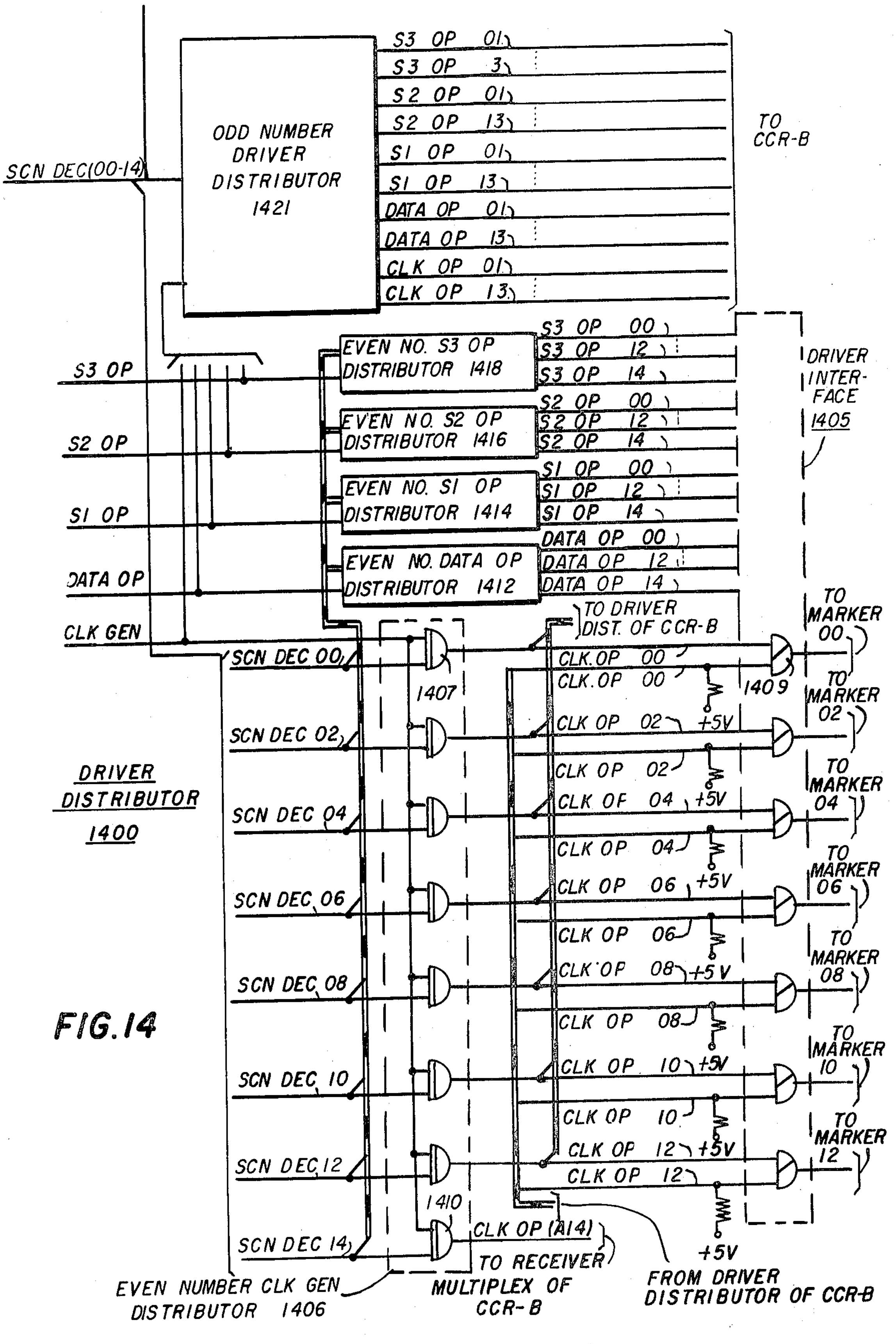
FIGS. 14–45, when arranged as shown in FIGS. 48–54, illustrate the computer communication register in functional block diagram form.
Figure 15:
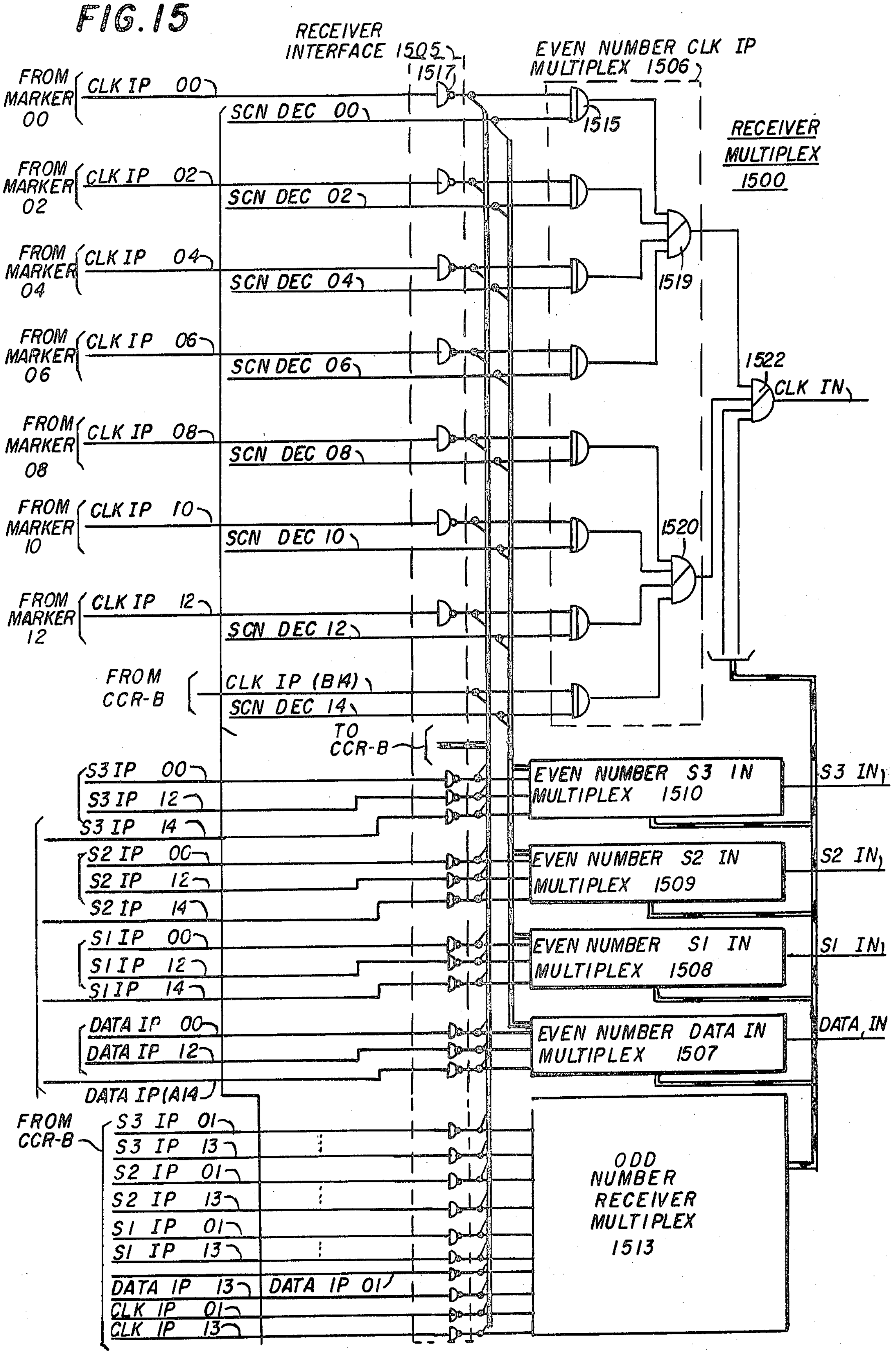
Figure 16:
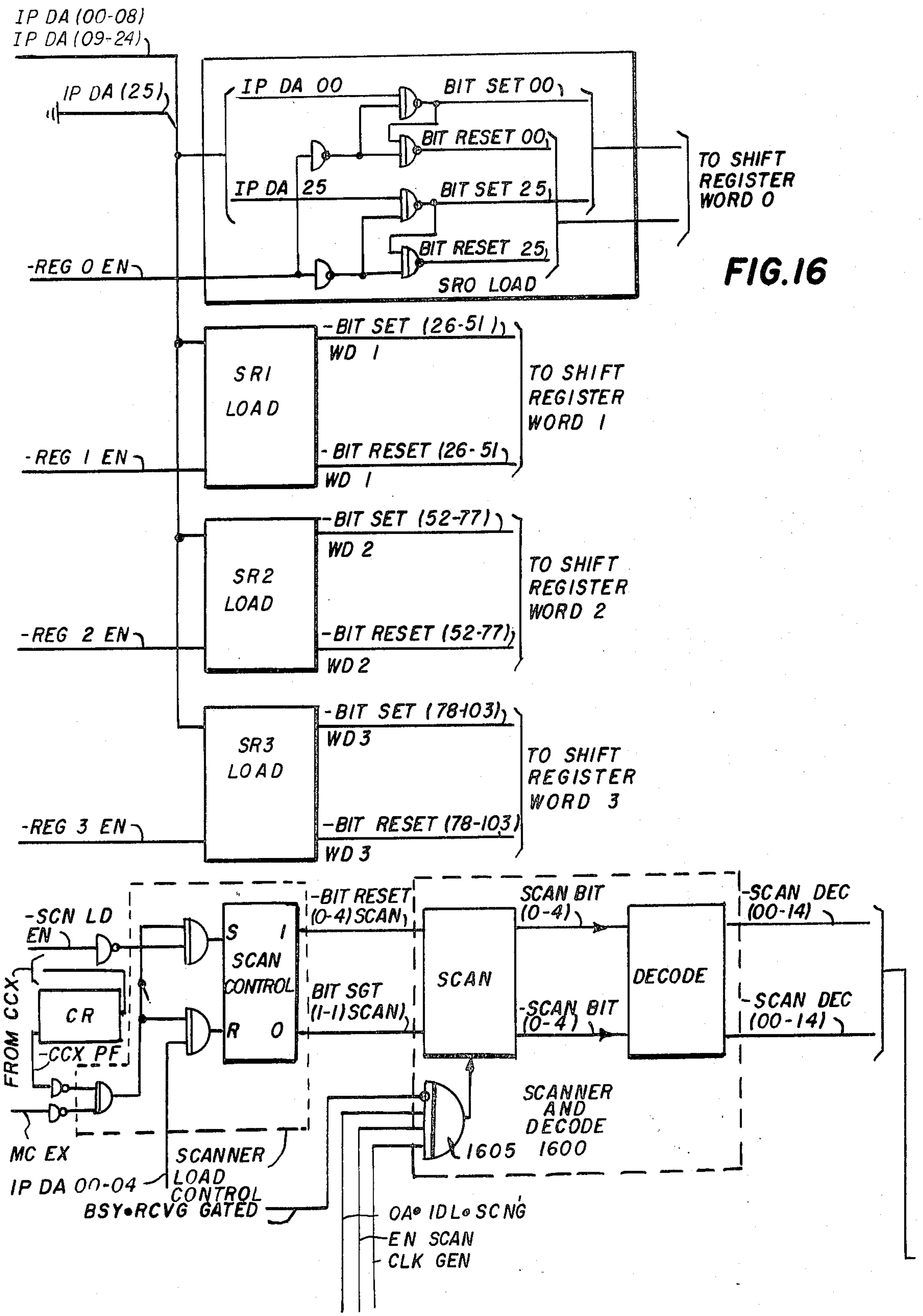

Considering now a more detailed description of the register CCR wwth reference now being made to FIGS. 14, 15 and 16, the driver distributor shown in FIG. 14 supplies the three status signals S1, S2, and S3, the data, and clock signal CLK GEN to the even-number marker registers MCR for both the originating and terminating markers and to the driver distributor of the communication register CCR-B, it being understood that the regwster CCR-A is being presently described since the register CCR-B is identical to it. There are 14 marker transceivers designated 00 through 13. The driver distributor 1400 of the register CCR-A includes an even-number clock generator distributor 1406 having a series of AND gates, such as the AND gate 1407, for gating the clock generated signal CLK GEN to the driver interface 1405 under the control of the even-number decoded scanning signals SCN DEC 00 through SCN DEC 14 from the scanner and decode 1600 of FIG. 16. In this regard, for example, the AND gate 1407 is enabled by the signal CLK GEN when the decoded scanner signal ACN DEC 00 becomes true to address the transceiver 00. The outputs of the gates of the even-number clock generator distributor 1406 are connected to a series of OR gates, such as the OR gate 1409 of the driver interface 1405, and the gates of the interface have their outputs connected to the various different even-number transceivers. For example, the gate 1409 is enabled by the gate 1407 to transfer the clock signal to the transceiver 00, the other input of the gate 1409 being connected to a clock output signal CLK OP 00 from a gate corresponding to the gate 1407 in the other register CCR-B for a purpose as hereinafter described in greater detail. An AND gate 1410 of the even-number clock generator distributor 1406 is enabled by the signal CLK GEN when the signal SCN DEC 14 becomes true to supply a signal CLK OP 14 to the receiver multiplex of the register CCR-B directly for enabling the two registers CCR-A and CCR-B to communicate with one another.

For the remaining data output signals DATA OP and the sense output signals S1 OP, S2 OP and S3 OP, the respective even-number distributors 1412, 1414, 1416 and 1418 comprise a series of AND gates in a similar manner to the even-number clock generator distributor 1406 and are enabled by the same even-number decoded outputs of the scanner of FIG. 16 to distribute the data and sense signals to the even-number markers and to the other register CCR-B. An odd-number driver distributor 1421 comprises AND gates (not shown) in a manner similar to the even-number distributors and are enabled by the odd-number decoded outputs of the scanner of FIG. 16 to supply the five signals to the corresponding driver interface of the other register CCR-B. Therefore, in accordance with the present invention, in order to insure that a power supply failure of either one of the registers CCR-A or CCR-B does not affect all of the marker registers, 7 of the links are provided between the register CCR-A and 7 of the markers and the remaining 7 links are provided between the register CCR-B and the remaining 7 markers. As a result, when the register CCR-A is in the standby condition, the register CCR-B communicates with the even-number markers via even-number distributors 1406, 1412, 1414, 1416, 1418, and the driver interface 1405 and it communicates with the odd-number markers via the aforementioned even-number distributors 1406, 1412, 1414, 1416, 1418 and the corresponding driver interface of the register CCR-B. Should the register CCR-A power supply fail, the register CCR-B can be placed in an active condition and utilize the marker links connected to its driver distributor for communicating with the seven odd-number markers, whereby the system can maintain its operation temporarily until the register CCR-A power supply can be repaired or replaced.

Referring now to FIG. 15, there is shown the receiver multiplex 1500 which includes an even-number clock input multiplex 1506 for multiplexing the clock input signal CLK IN from the even-numbered markers via direct links thereto and for multiplexing a clock input signal CLK IP (B 14) from the register CCR-B to supply a clock signal therefrom when the two registers communicate with one another. The addressing signals for the even-number clock input multiplex 1506 comprise the even-number decoded outputs of the scanner of FIG. 16, which are also supplied to similar even-number multiplex gates 1507–1510 for the respective signals DATA IP, and the sense signals S3 IP, S2 IP and SP IP from the even-number markers and the register CCR-B. For the purpose of insuring that if one of the communication registers CCR-A or CCR-B should fail the other communication register can continue to communicate with at least some of the markers, the odd-number markers are connected via links to the interface circuit (not shown) of the register CCR-B and from that circuit are connected in multiple to the odd-number receiver multiplex circuit 1513 of the register CCR-A so that the register CCR-A can communicate with each one of the 14 markers when the register CCR-B is in its standby condition. Similarly, the signals from the even-number markers are conveyed to the receiver multiplex of the register CCR-B. As a result, if the register CCR-A power supply fails, then the register CCR-B can communicate with the odd-number markers; and alternatively if the register CCR-B power supply fails, the register CCR-A can communicate with the even-number markers.

The even-number clock input multiplex 1506 includes a series of eight AND gates, such as the AND gate 1515, which are energized by the clock input signals from the even-number markers and from the register CCR-B when the appropriate address signals from the scanner are sequentially generated. For example, the gate 1515 is enabled by the decoded output signal SCN DEC 00 from the scanner of FIG. 16 when the signal ¬CLK IP (A00) from the marker 00, the last-mentioned signal being coupled through an inverter gate 1517 of the receiver interface 1505 which comprises a series of inverter gates for each one of the signals from the markers. The outputs of the first four AND gates associated with the decoded output signals 00 through 06 are connected to the inputs of an OR gate 1519, and the remaining four AND gates associated with the decoded output signals 08 through 14 are connected to the inputs of an OR gate 1520, the outputs of the OR gates being connected to the inputs of an OR gate 1522 which generates a signal CLK IN for use in the logic circuits of the register CCR-A. Two additional inputs to the OR gate 1522 are energized by signals from two OR gates (not shown) in the odd-number receiver multiplex circuit 1513 which includes a set of multiplex logic gates similar to the multiplex 1506 associated with the odd-numbered markers. It is to be understood that the even-number multiplex circuits 1507 through 1510 are each similar to the even-number clock input multiplex circuit 1506, and the odd-number receiver multiplex circuit 1513 is similar to the entire set of even-number multiplex logic gates.

D2. Shift Checking of Serial Information

Figure 19:
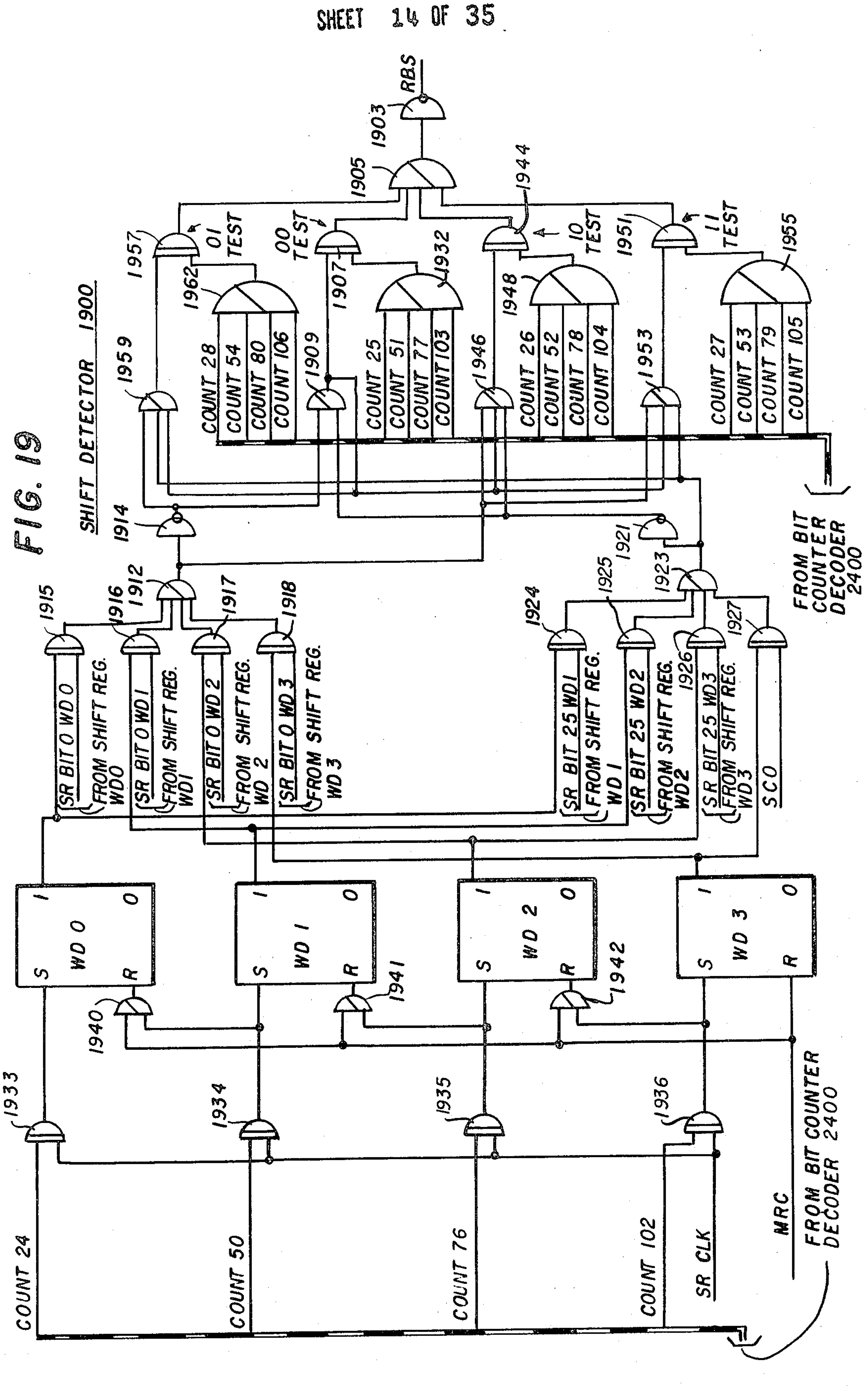
Figure 20:
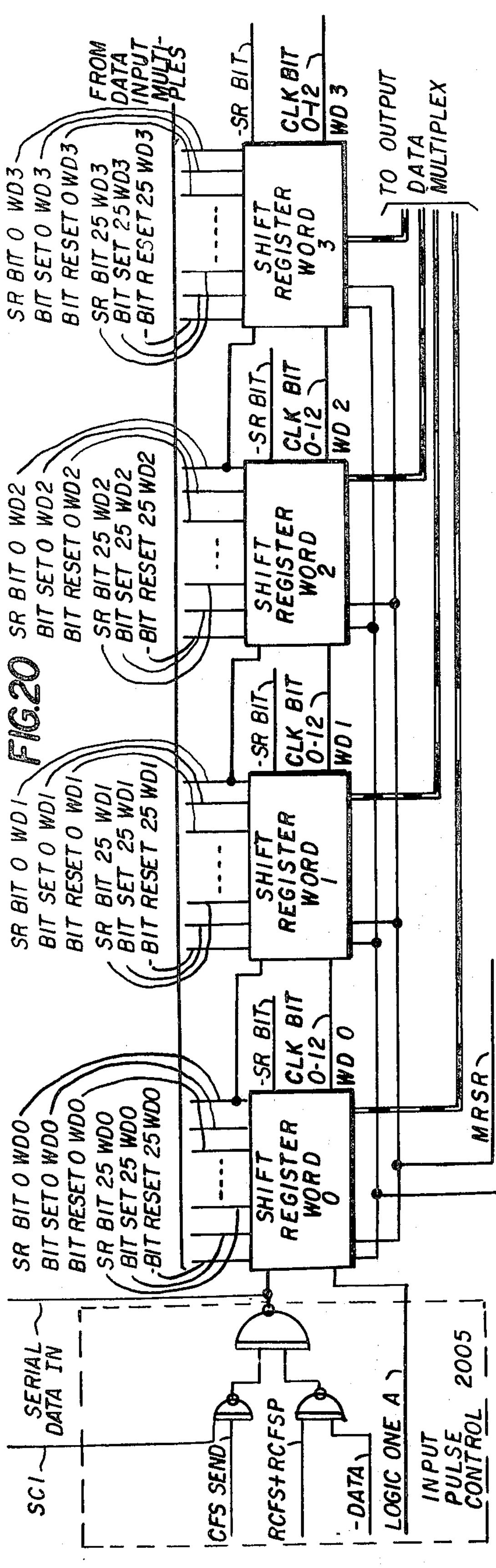

Referring now to FIG. 19 of the drawings, there is shown the shift detector 1900 for monitoring the serial data being shifted into the shift register shown in FIG. 20 for determining whether or not the shift register is functioning properly during each receipt of a serial message therein. In order to insure the proper functioning of the shift register and thus to insure the proper receipt of a message by it, each message received includes a header bit pattern 1 1 0, whereby the shift register is monitored by the shift detector 1900 to determine whether or not the header bits are being properly shifted through the shift register. Thus, the header bits are monitored as they travel past the junctions between the various shift register words 0 through 3 for a four word message from the terminating marker or past the junctions between the shift register words 0 and 1 for a two word message from the originating marker. In this regard, the shift register (FIG. 20) includes four shift register words 0 through 3, and each one of the shift register words includes 26 flip-flops designated 0 through 25. The shift register words are arranged with the highest order bits at the inputs and descending in value to the outputs. Moreover, the outputs of the shift register word 1 and the shift register word 3 are connected through the shift register length control circuit 2100 to the three shift control header flip-flops SC1, SC1P and SC0 for the three header bits 1, 1 and 0, respectively. Thus, the header bits are channeled through the shift register word 0 and shift register word 1 to the head bit flip-flops for a two word message, and the header bits are shifted serially through all four shift register words to the header bit flip-flops, which are also serially-interconnected in a shift register fashion, the output of the flip-flop SC1 constituting the signal DATA OP which is the data output for the markers. It should be noted that the header bit flip-flops are provided for storing the received header bits for the purpose that the received header bits may be returned from the marker to the register CCR-A for maintenance purposes. The header bit shift control flip-flop SC0 is set by an OR gate 2105, which enables the J input to the flip-flop SC0, and which has its inputs connected to a pair of coincidence AND gates 2107 and 2109. The gates 2107 and 2109 are respectively energized by the bit position 0 of word 1 and bit position 0 of word 3 of the shift register, the gate 2107 being energized by a signal 2WD indicating that a two word message is to be received and gate 2109 being enabled by a signal 4WD indicating that a four word message is to be received. The header bit flip-flops are enabled and disabled for respectively sending and receiving by corresponding latches of the serial message control interface by enabling the set and reset inputs to the header bit flip-flops.

Referring now to FIG. 19, if the message is improperly shifted within the shift register, a received bad shift signal RBS is generated at the output of an inverter gate 1903, which in turn is energized by an OR gate 1905. The signal RBS is supplied to the bad shift receive flip-flops of the message error and status latches so that appropriate action may be taken when a bad shifting is detected. An AND gate 1907 enabhes the gate 1905 in response to the enabling of an OR gate 1909 when the header bits are shifted so that the leading bit 1 is shifted to the bit 1 position of one of the shift register words, whereby the 0 bit position of that shift register word and the bit 25 position of the next shift register word should be in the reset or 0 condition which is detected by the gate 1909. In this regard, the gate 1909 is enabled by an OR gate 1912 via an inverter gate 1914, the gate 1912 being enabled by a series of four AND gates 1915–1918 which in turn are enabled by the bit position 0 of the respective shift register words 0 through 3 and by respective latches WD0 through 3.

Figure 22:
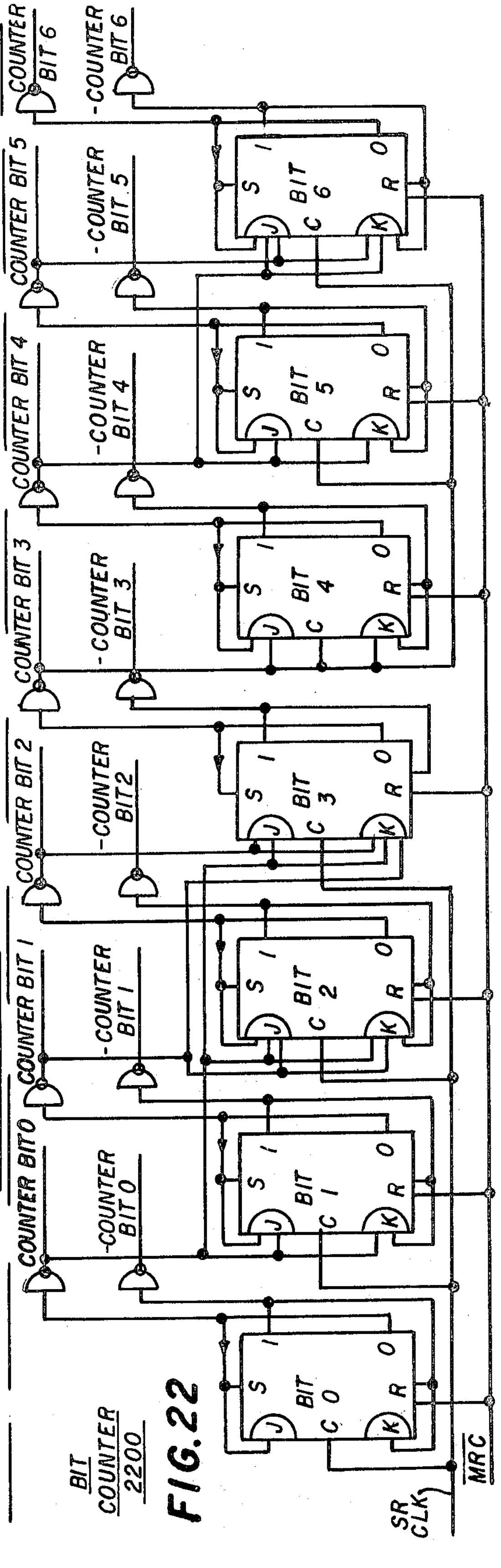
Figure 24:
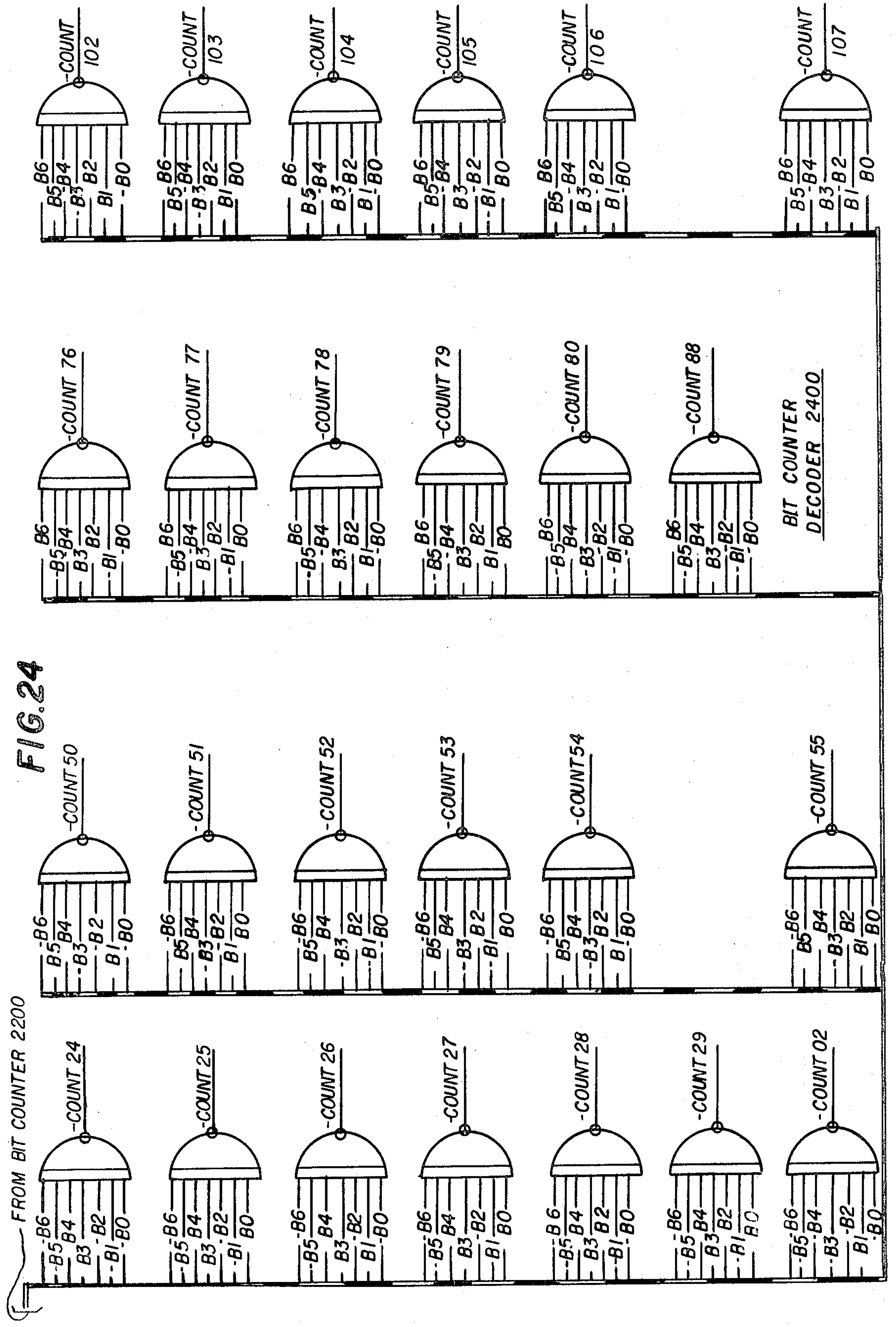
Figure 25:
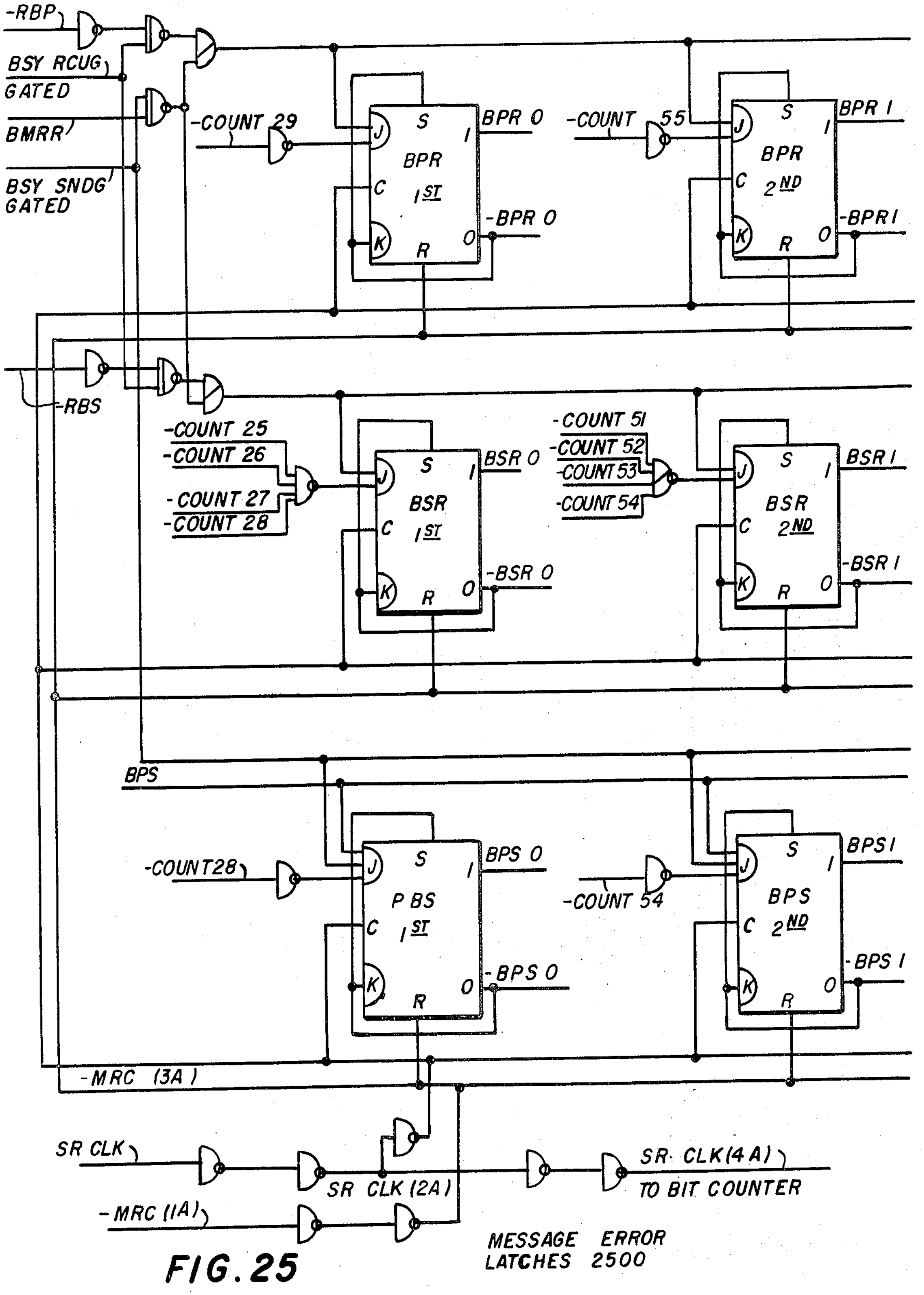
Figure 26:
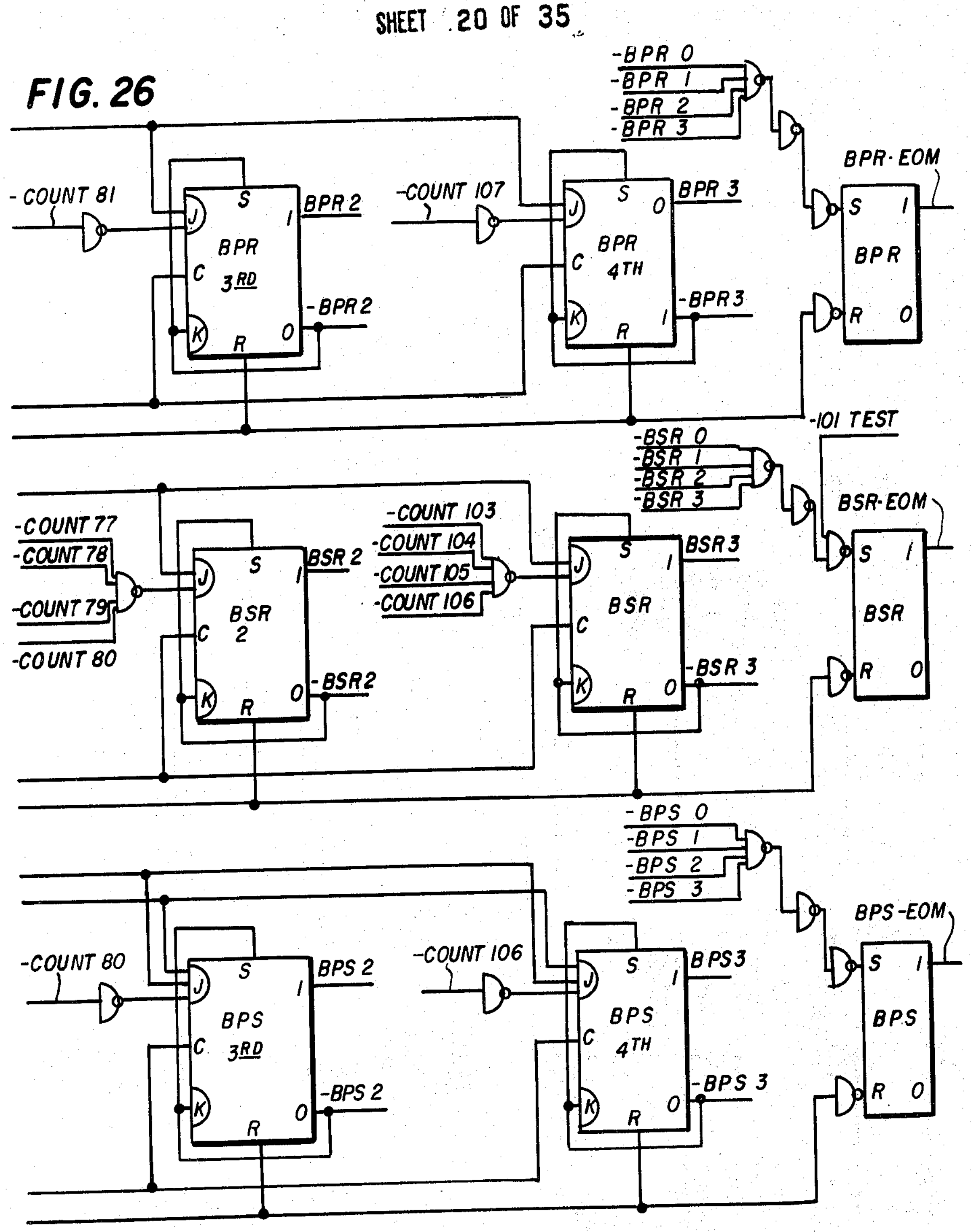

In order to monitor the 25th bit of the shift register words, the other input to the gate 1909 is connected through an inverter gate 1921 to the output of an OR gate 1923, which in turn is energized by the output of a series of four AND gates 1924 to 1927 energized respectively by the 25th bits of the shift register words 1, 2, 3 and the output of the header bit flip-flop SC0 and by the respective latches WD0 through WD3. The 00 condition is monitored between the adjacent shift register words under the control of an OR gate 1932 which has its output connected to the other input for the gate 1907 and which has its inputs connected to the bit counter decoder 2400 of FIG. 24. As the bit counter follows the bits being shifted into the shift register words, when the header bit 1 serving as the leading bit (see FIG. 1) is disposed in the position 1 of shift register word 0, the bit counter 2200 of FIG. 22 counts 25 bits, and thus its bit counter decoder 2400 generates the signal COUNT 25 and the bit position 0 of shift register word 0 and bit position 25 of shift register word 1 should have zeros contained therein. In this regard, at count 25 of the bit counter 2200, the AND gates 1915 and 1924 are not enabled due to the zeros in the bit positions 0 and 25 of the respective shift register words 0 and 1, and thus due to the inverter gates 1914 and 1921, the OR gate 1909 is enabled to in turn enable the gate 1907 and thus the gate 1905, whereby the inverter gate 1903 generates a 0 or false condition indicating that a bad shift has not occurred. Similarly, the 00 test is performed at counts 51, 77 and 103 corresponding to the junctions between the respective shift register words 0–1, 1–2, 2–3 and 3-SC0 (the shift check 0 header bit flip-flop). The latches WD0 through WD3 are set by a series of four AND gates 1933 to 1936 which are enabled by the respective signals COUNT 24, COUNT 50, COUNT 76 and COUNT 102 from the bit counter decoder 2400 of FIG. 24 when the signal SR CLK becomes true, the latter signal being the shift register clock signal for driving the shift register as hereinafter described in greater detail. A series of three AND gates 1940 through 1942 reset the latches WD0 through WD2, respectively, or the signal MRC, which is a master reset control, resets the latch WD3, the gates 1940 through 1942 resetting their respective hatches in response to the signal MRC being true or the count signal from the bit counter decoder 2400 which sets the succeeding WD latch. As a result, the WD latches are set by the bit counter decoder 2400 previous to the time during which the test is undertaken. The latches are reset at the time when the succeeding latches are set or during the generation of the signal MRC which also resets the latch WD3 directly.

The next test performed at the junction between the shift register words following the 0 0 test is the 1 0 test, which is performed at each junction between the shift register words when the leading header bit 1 is disposed within the 0 bit position of one shift register word and thus the 25th bit position of the following shift register word should be in its zero or reset condition. For this purpose, an AND gate 1944 has its output connected to one of the inputs of the gate 1905 and has its inputs connected to the outputs of a pair of OR gates 1946 and 1948, the gate 1946 having inputs connected to the output of the gate 1912, the output of the gate 1909 and the output of the gate 1921, the inputs to gate 1948 being connected to the respective signals COUNT 26, COUNT 52, COUNT 78 and COUNT 104. Thus, when the header bit pattern is disposed at the junction between a pair of shift register words as determined by the gate 1948, and when the leading bit 1 of the header pattern is disposed in the bit position 0 and the bit position 25 of the following shift register word is properly reset or 0, the gate 1912 is enabled to energize the gate 1946 and the gate 1923 is not enabled so that the inverter gate 1921 supplies a true signal to the gate 1946, whereby the gate 1946 is enabled to in turn cause the gate 1944 to be energized, so that the gates 1903 and 1905 do not generate the bad shift signal RBS.

Similarly, the third test to be performed at a given junction is the 1 1 test performed by the gate 1951 which monitors the junctions between the shift register words and is enabled when the leading bit 1 is disposed in the bit position 25 of a shift register word and the next bit 1 of the header pattern is disposed in the preceding bit position 0 of the preceding shift register word. If the above-mentioned two shift register word positions do not contain true indications or logic level ones, the gate 1951 is not enabled so that the gate 1903 generates the signal RBS to indicate a bad shift indication. The output of the gate 1951 is connected to an input to the gate 1905, and the inputs to the gate 1951 are connected to the outputs to a pair of OR gates 1953 and 1955. The gate 1951 is connected at its three inputs to the outputs of the three gates 1909, 1912 and 1923. The gate 1955 has its four inputs connected to the apropriate four outputs of the bit counter decoder 2400 for conducting the tests at the four junctions between the shift register words and the shift check 0 header bit flip-flop. Also, the fourth and last test performed at each junction is the 0 1 test performed when the middle header bit 1 is disposed in a bit position 25 of a shift register word and the following header bit 0 is disposed in the preceding bit position 0 of the preceding shift register word. In order to detect the presence of the 1 and the 0 during the 0 1 test, a gate 1957 has its output connected to an input of the gate 1905 and is enabled if the 0 and 1 are in the proper positions at the time of taking the 0 1 test. The inputs of the gate 1957 are connected to the outputs of a pair of OR gates 1959 and 1962, the three inputs of the gate 1959 being connected to the outputs of the gates 1914, 1923 and 1909 and the four inputs to the gate 1962 being connected to the appropriate four count output signals from the bit counter decoder 2400. It should now be apparent that the four count input signals to the four gates 1932, 1948, 1955 and 1962 are sequentially arranged such that corresponding signals are advanced by one count. The first test 0 0 determines that the flip-flops of the shift register can remain reset. The next test 0 1 determines that the flip-flops are able to be set, and the test 1 1 indicates that the flip-flops can remain set. The last test 1 0 indicates that the flip-flops can become reset. Also, by performing the series of tests for each shift register word it is also determined that the shift register has not assumed an alternating failure mode of operation. All of this information is determined by testing only three header bits, even though the first two tests are not completely performed on the header bits themselves. It should also be understood that the shift detector 1900 is readily adapted to perform the shift tests on both a two word message from an originating marker and a four word message from a terminating marker since both two and four word messages enter the same shift register word 0.

D3. Serial Bits Transfer and Clock Control Therefor

Figures 17, 17A:
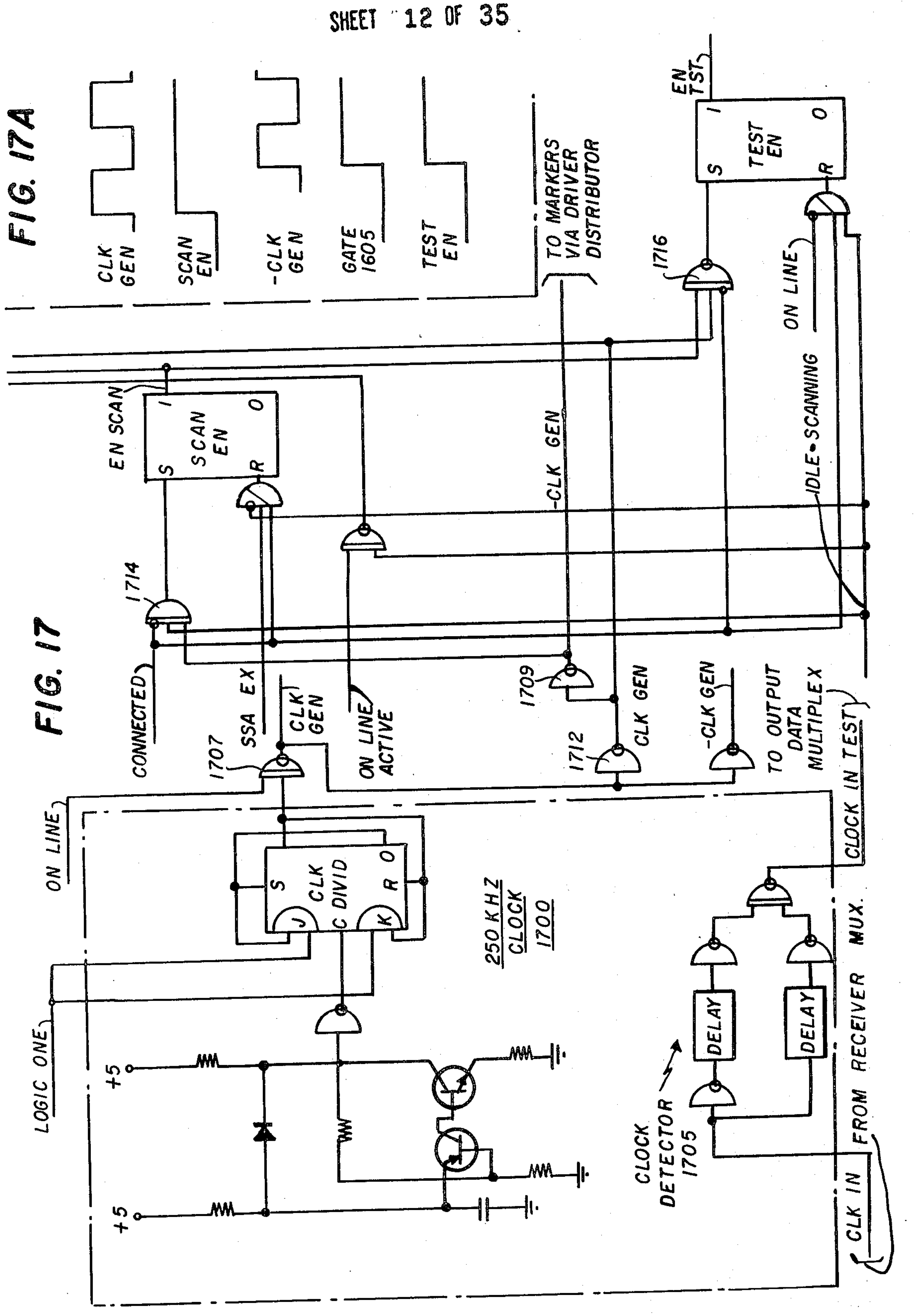
Figures 21, 21A, 27, 27A:
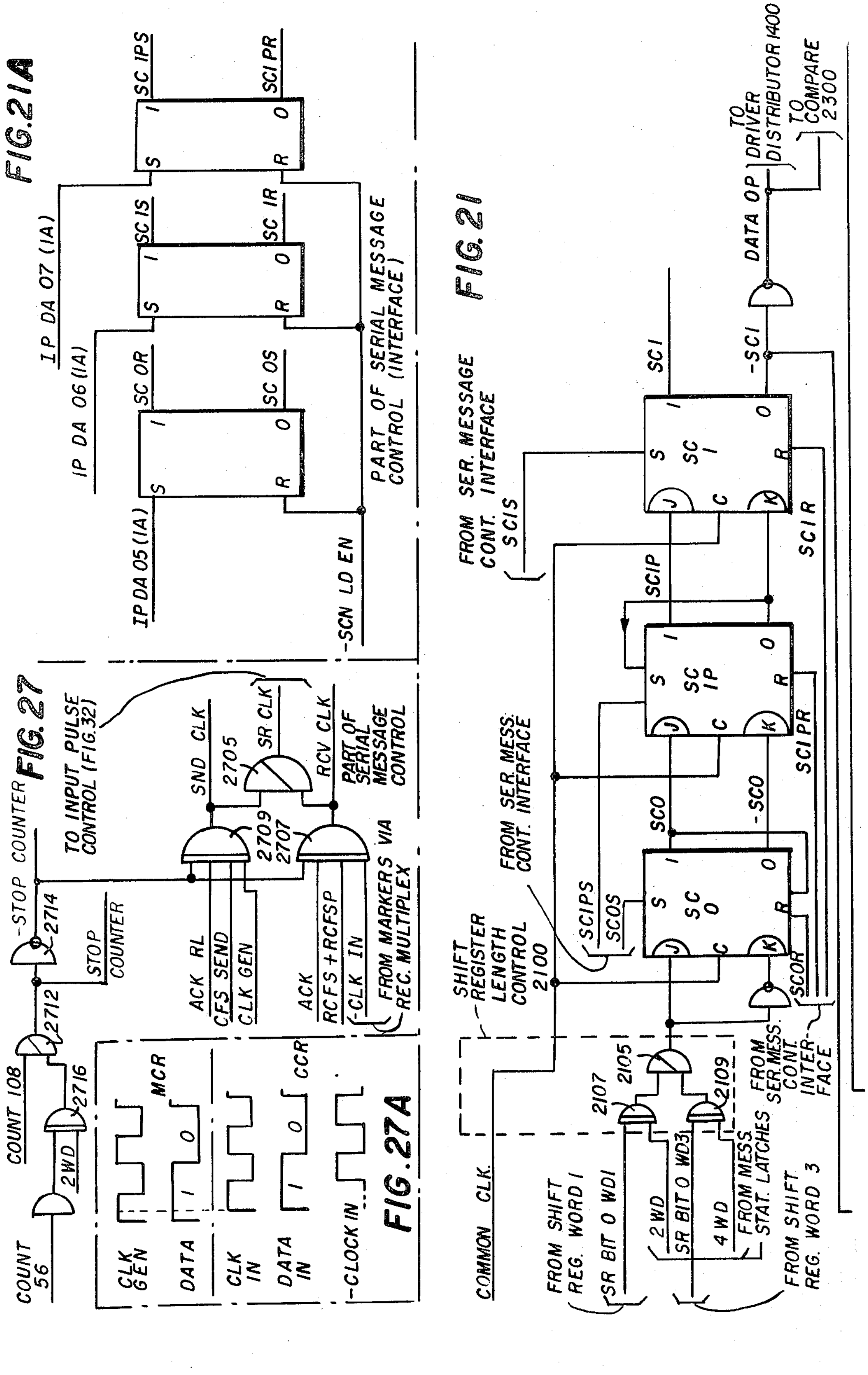
Figures 31, 32:
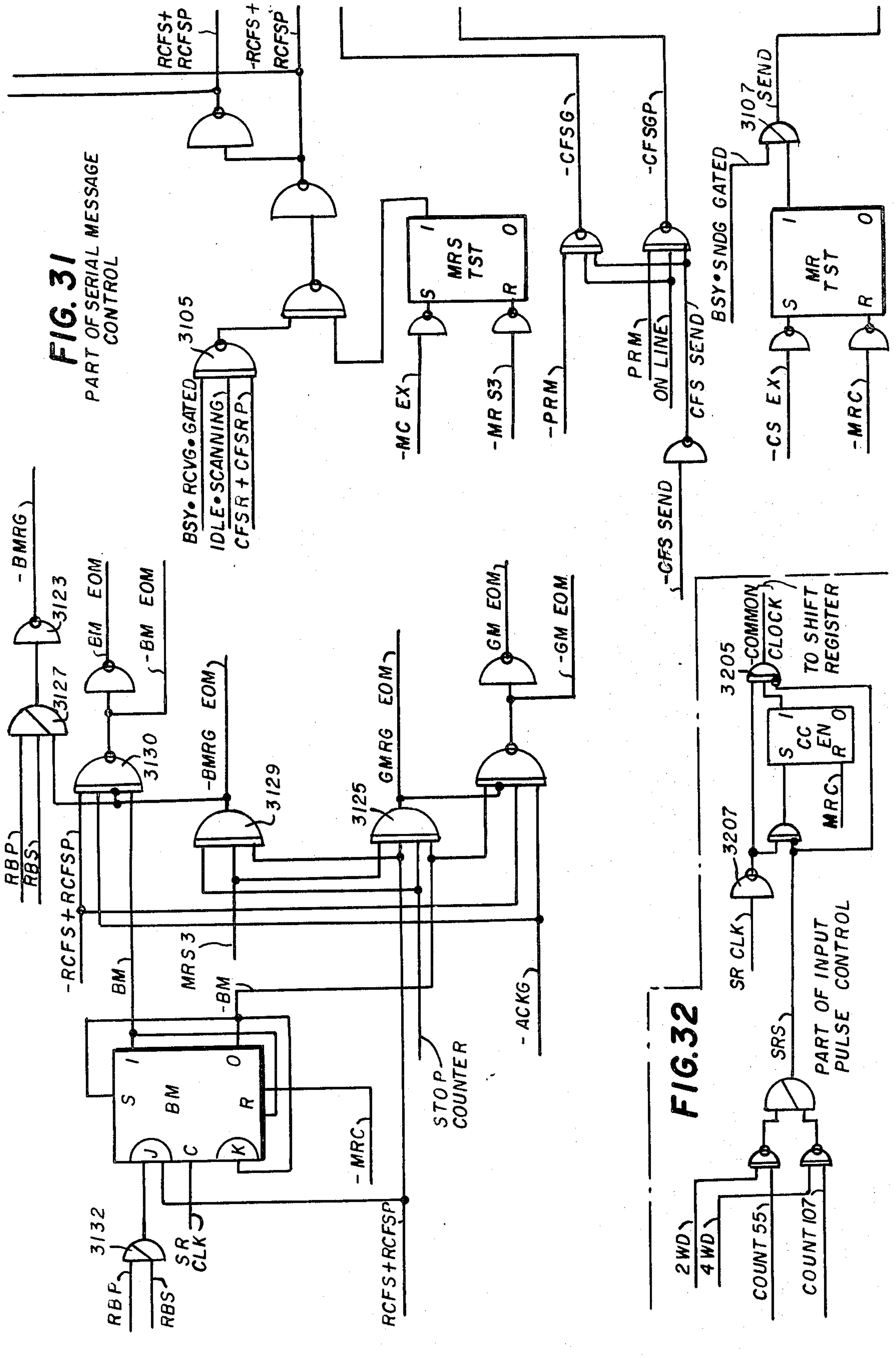

Referring now to FIGS. 27–32, sending and receiving of serial transmission between the registers will now be considered. In order to drive the shift register of FIG. 20 during either a message sending or receiving mode of operation, a signal –COMMON CLOCK advances the data through the shift register. As shown in FIG. 32, an AND gate 3205 of the input pulse control circuit generates the signal –COMMON CLOCK when the signal SR CLK via an inverter gate 3207 is false, a latch CC EN is set when the signal SR CLK is false and the signal SRS is true. An OR gate 2705 of the serial message control portion shown in FIG. 27 generates the signal SR CLK which is a clock signal of the square wave type generated during the receiving mode of operation in response to an AND gate 2707 and during a sending mode of operation in response to an AND gate 2709. In accordance with the present invention, sending is performed during the leading edge of the clock pulses and receiving is performed during the trailing edge of the same clock pulses. In this regard, as shown in FIG. 17, the output of the 250 KHZ clocks 1700 enables an AND gate when the register is on line to generate the signal CLK GEN, which is the clock generated signal used for driving the shift register of FIG. 20 and also for driving the corresponding shift registers in the markers. Thus, as shown in FIG. 17, the signal CLK GEN is transferred from an inverter gate 1709 via the driver distributor to the markers for driving their shift registers during their sending and receiving modes of operation. During the receiving mode of operation of the register CCR, in accordance with the present invention, the signal CLK GEN is supplied back from the sending marker to the receiving register CCR along with the data therefrom so that the data and clock signals arrive at the register CCR in phase regardless of the propagation delays of the cables interconnecting the marker and the CCR register. Thus, the clock generated signal CLK GEN from the register CCR causes the shift register of the sending marker transceiver to supply data to the receiving register CCR on the leading edges of the clock pulses of the signal CLK GEN, and the receiving register CCR shifts the input data into its shift register under the control of the same clock pulse signal (called signal CLK IN) returned from the sending marker transceiver. As a result, the gate 2707 of FIG. 27 is enabled by the signal –CLK IN, and for the sending mode of operation the signal CLK GEN is supplied to the gate 2709.

Since the data is sent during the leading edge of the clock signal and is received during the trailing edge of the same signal, the received data information is permitted to become stable before entering the shift register. As shown in FIG. 27A, both the signal CLK GEN and the data signals are transferred from the sending transceiver unit MCR to the receiving register CCR and they arrive at the CCR in phase, both being delayed by the same amount of time due to the cable propagation delays. It should be noted that the signal CLK GEN is designated signal CLK IN at the register CCR when it is returned from the unit MCR. The signal CLK IN is inverted to produce the signal which is utilized to transfer the received data into the CCR shift register. It should be noted from FIG. 27A that while the leading edge of the inverted clock signal -CLK IN is used to trigger the gate 2707, the heading edge of the inverted signal corresponds to the trailing edge of the signal CLK IN, whereby the received data signal is shifted into the CCR shift register during the middle portion and thus the stable portion of each data signal. Thus, the data received is not shifted during its transition period. The clock signal has a frequency of twice the frequency of the data signal to provide a 50 per cent duty cycle.

During the receiving mode of operation, as shown in FIG. 27, the gate 2707 is enabled by the signal RCFS+RCFSP during the receipt of the call for service from the marker unit MCR and after the acknowledged generated signal ACK G is true. Also, a signal STOP COUNTER must not be generated to enable the gate 2707. A gate 2712 is an OR gate which generates the signal STOP COUNTER when a two word message or a four word message is completed. In this regard, a signal COUNT 108 enables the gate 2712 after four words have been shifted within the shift register words 0 through 3 to stop the bit counter and also to enable an inverter gate 2714 for inhibiting either the gate 2707 during a receiving mode of operation or the gate 2709 during a sending mode of operaton. An AND gate 2716 enables the gate 2712 at the end of a two-word message being shifted by the shift register of FIG. 20 and is enabled by a signal COUNT 56 at the end of a two word message and a signal 2 WD.

Figure 28:
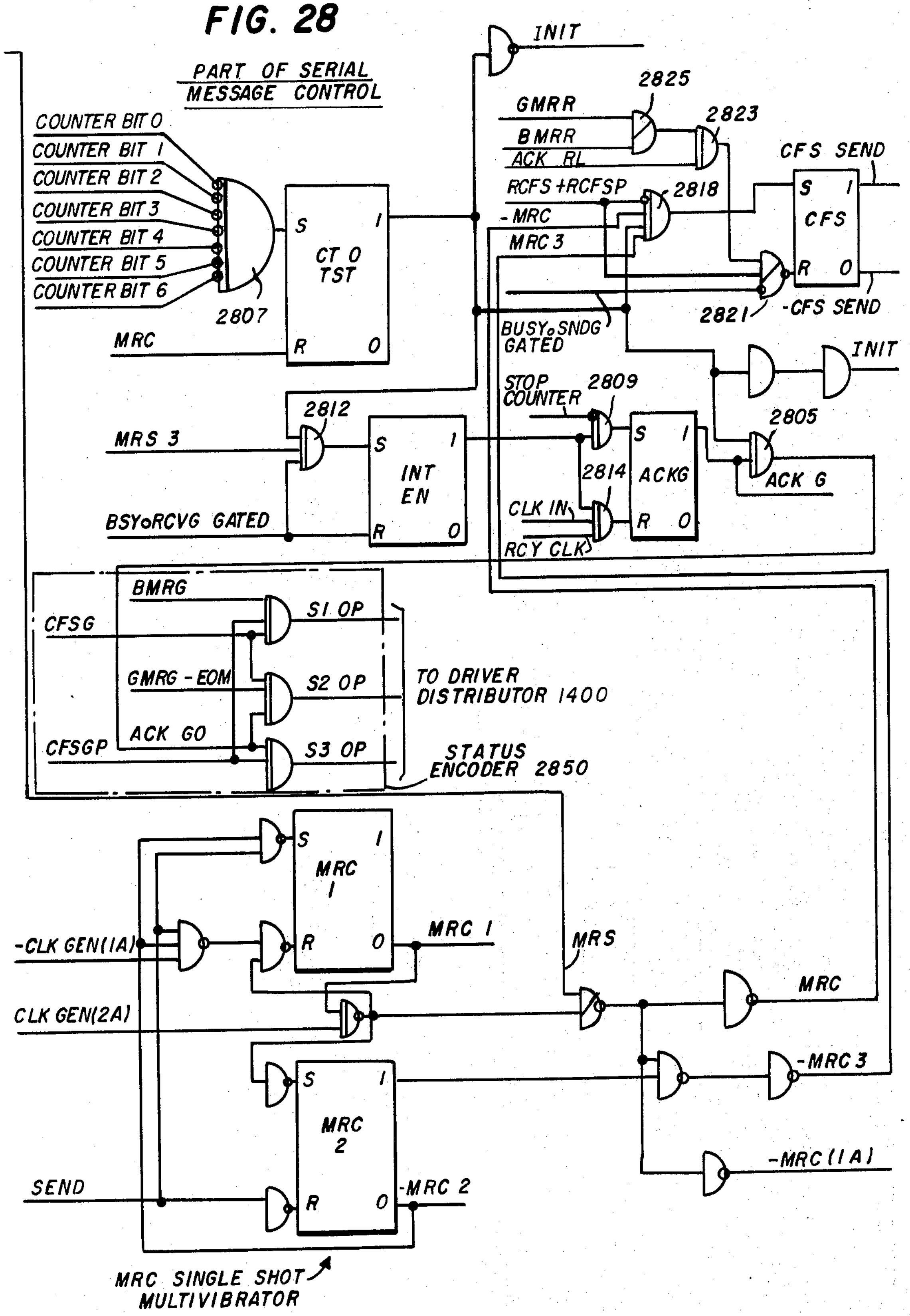
Figure 33:
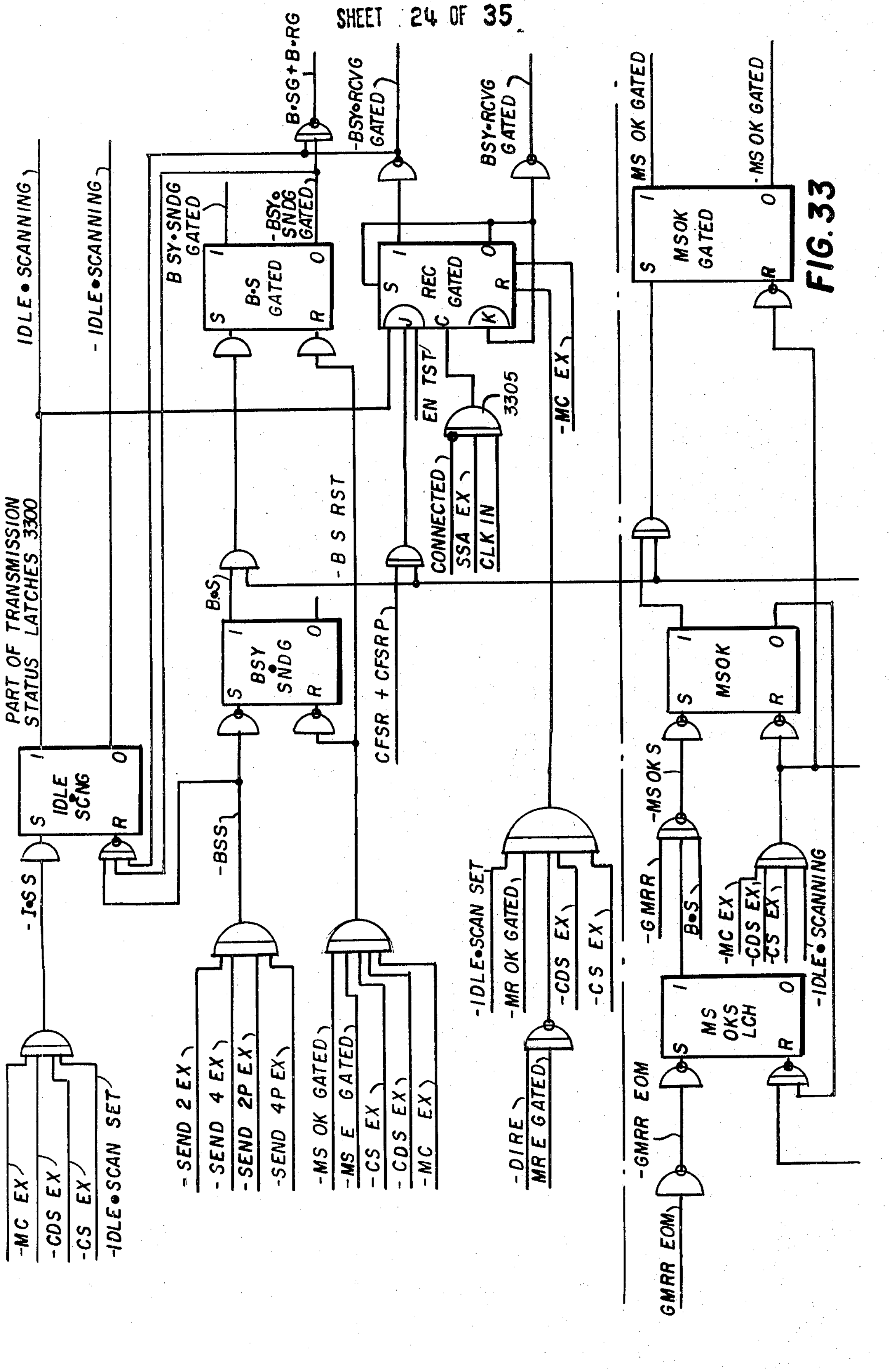
Figure 34:
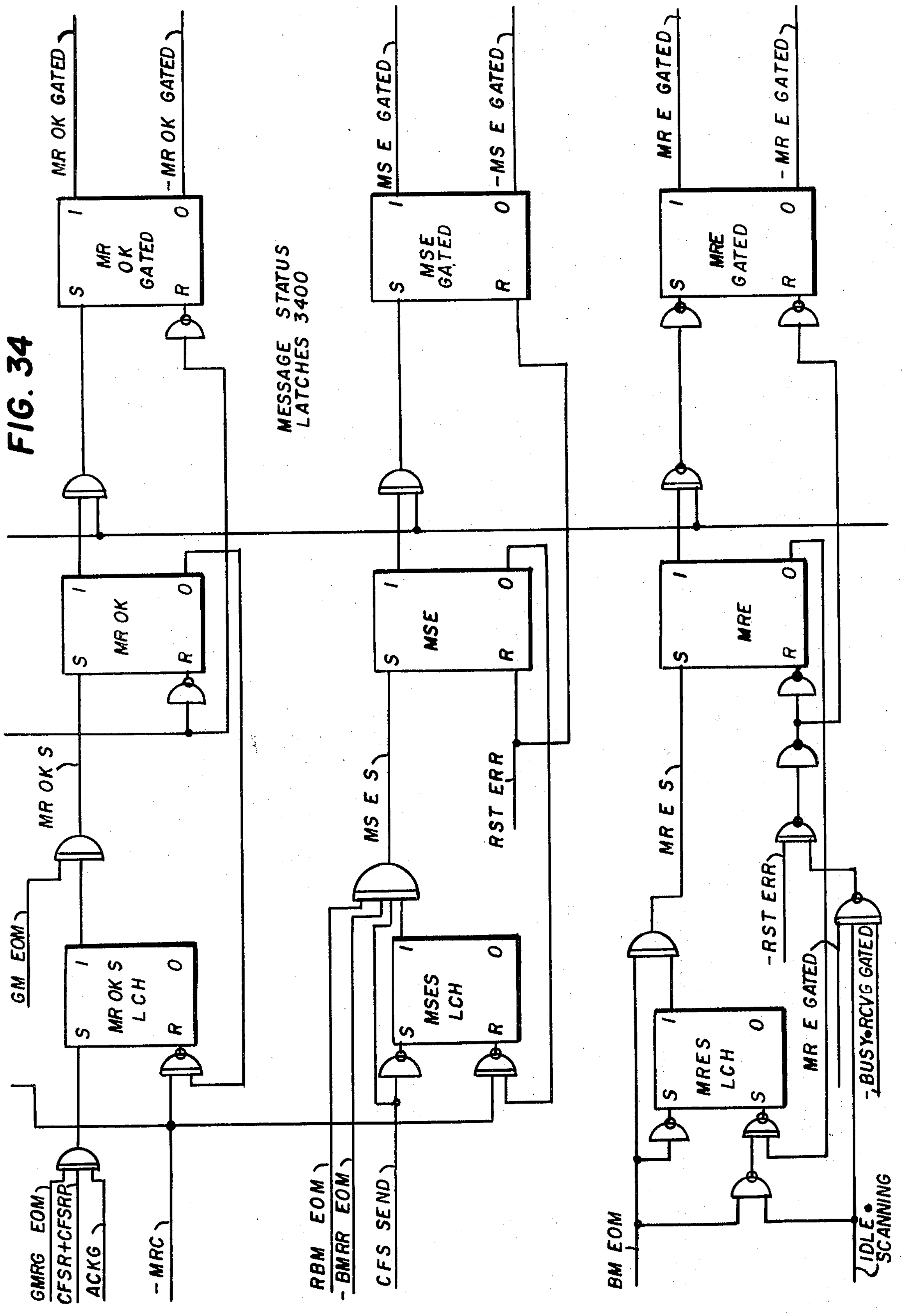

During a receiving mode of operation, the sending MCR unit supplies a call for service signal to inform the register CCR of the proposed serial transmission. When and if the register CCR is ready to receive the transmission, the receiving CCR register transmits an acknowledge signal to the sending unit MCR. As shown in FIG. 28, an AND gate 2805 generates a signal ACK GO which is encoded by the status encoder 2850 which in turn supplies the encoded acknowledge signal via the status leads S1 OP, S2 OP and S3 OP to the driver distributor of the register CCR and thence via the cabling to the sending register MCR. The gate 2805 is enabled by the setting of a latch CT O TST which is set by an AND gate 2807, which in turn is enabled when all of the positions of the bit counter are at zero. The counter must be reset to a 0 condition before sending or receiving so that an accurate count may be taken. The count 0 test latch CT O TST is reset by a master reset signal MRC. In order to insure that the sending register MCR does not commence sending data until the counter has been reset and is stabilized, the gate 2805 is not enabled until a latch ACK G is set, and the acknowledge latch ACK G is not set until an AND gate 2809 is enabled by the signal STOP COUNTER becoming false as a result of the bit counter being reset. The gate 2809 is also enabled by the one output of the initialized enable latch INT EN, which is set when an AND gate 2812 is enabled. However, the gate 2812 is not enabled until the latch CT O TST is set, a signal MRS3 is true, and a signal BSY·RCVG GATED is true. The latter signal is true once a call for service is detected during a scanning mode of operation of the register CCR, since a flip-flop REC GATED is set, as shown in FIG. 33 when the status of the register CCR is busy and receiving and gated. The signal MRS3 comes true following a single MRS pulse generated by the MRS single shot multivibrator of FIG. 29, the signal MRS 3 being generated by the MRS single shot multivibrator once the gate 3105 of FIG. 31 is enabled when the call for service is initiated. Thus, the signal MRS 3 insures that the acknowledged signal is not generated unless and until the count 0 test latch is set and a sufficient delay time interval determined by the MRS multivibrator has occurred, whereby the bit counter has sufficient time to be reset to 0 and becomes stabilized before sending of the data from the register MCR commences. Once the latch ACK G is set, the signal ACK G is supplied to the gate 2707 of FIG. 27 and is the last signal to enable the gate 2707 for supplying in turn clock pulses to the shift register of the register CCR. Thereafter, the gate 2814 resets the latch ACK G in response to the signal RCV CLK generated by the gate 2707 and the signal CLK IN.

Figures 29, 30:
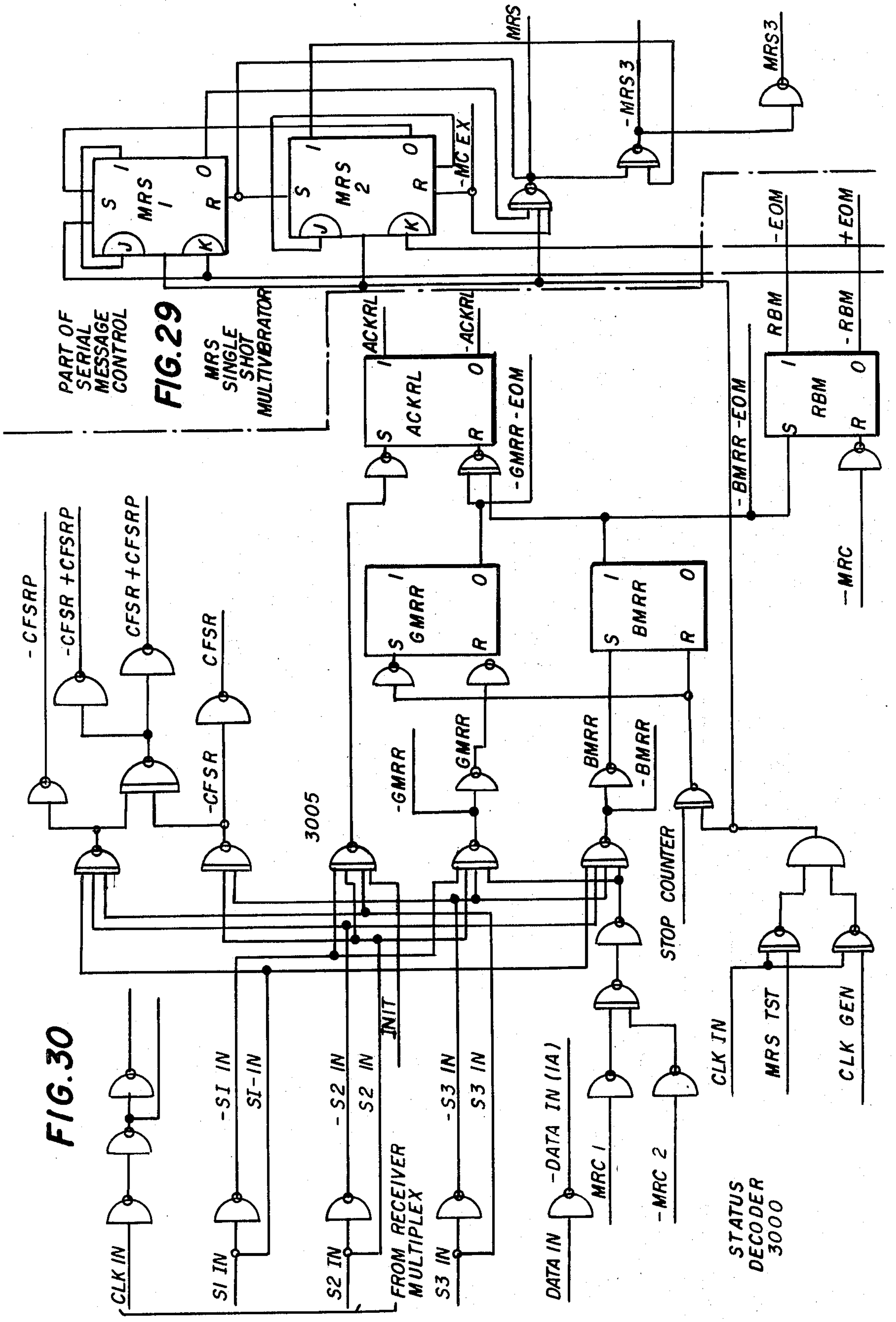

During a sending mode of operation, the address of the marker to which information is to be sent is supplied to the register CCR via the computer processor CCP. Thereafter, a call for service indication is sent to the receiving register MCR of the designated marker transceiver. Upon receiving the call for service indication, the marker transceiver resets its serial transmission apparatus and then returns an acknowledge signal, which is received over the input status heads S1 IN through S3 IN of the status decoder 3000 (FIG. 30). As a result, the NAND gate 3005 causes an acknowledge receive latch ACK RL to be set.

In order to supply clock pulses to the shift register of the register CCR, the gate 2709 is enabled by the signal ACK RL and the signal CFS SEND when the signal STOP COUNTER is true to gate the generated clock signal to the gate 2705 of the serial message control shown in FIG. 27. The signal CFS SEND is a call for service signal which is generated by a latch CFS of FIG. 28. An AND gate 2818 enables the latch CFS when the count 0 test latch CT O TST is set indicating that the bit counter has been reset after the last operation. In order to insure that the bit counter is completely reset and stabilized, the signals −MRC and MRC 3 provide the necessary delay. The signal MRC 3 is generated at the end of a single shot pulse signal MRC, which is generated by the MRC single shot multivibrator of FIG. 28, the multivibrator being triggered by a signal SEND generated by an OR gate 3107 of FIG. 31. The gate 3107 is enabled by the signal BSY·SNDG GATED or the one output of a latch MRC TST. The call for service receive signal RCFS+RCFSP is not true during a sending mode of operation. The latch CFS SEND is reset by an OR gate 2821 which is energized when the signal BSY·SNDG GATED goes false or the gate 2823 is enabled by the signal ACK RL and the OR gate 2825 is enabled by either the good message or the bad message received signals are generated.

Computer Processor Scan Control

When the computer processor CCP accesses the register CCR during a "connnect" operation, the register CCR stops its marker link scanning operation to insure that the status of the register CCR remains constant while the processor CCP samples its current status. Also, in accordance with the present invention, the marker link scanning operation commences thereafter by "disconnecting" the register CCR from the multiplexor CCX of the processor CCP, and the register CCR automatically increments its scanner to the next marker link before a test for a "call for service" is made to insure that the last marker serviced is not again accessed in case its call for service signal is still present. For this purpose, as shown in FIG. 17, the output of the 250 KHZ clock 1700 enables the gate 1707 when the register CCR-A is on line to generate the clock signal CLK GEN, which via a pair of series-connected inverter gates 1712 and 1709 enable an AND gate 1714 when the register CCR is not connected to the processor CCP. This setting operation is illustrated in the wave forms of FIG. 17A. When the latch SCAN EN is set, the gate 1605 of the scanner and decode 1600 of FIG. 16 is not enabled, because the signal −CLK GEN is not true at that time. However, when the signal −CLK GEN becomes true, subsequent thereto, the gate 1605 is enabled to advance the scanner to its next count as indicated in the graph wave form of FIG. 17A. Moreover, an AND gate 1716 is enabled when the latch SCAN EN is set and the signal −CLK GEN becomes true when the register CCR is not connected. Therefore, the latch TEST EN does not initiate a test for a call for service until the scanner is advanced to the next link. As shown in FIG. 33, the flip-flop REC GATED has its J input enabled by the signal EN TST, however, the flip-flop is not set unless and until the call-for-service signal CFSR+CFSRP becomes true when the marker associated with the accessed link generates a call-for-service signal.

Figure 35:
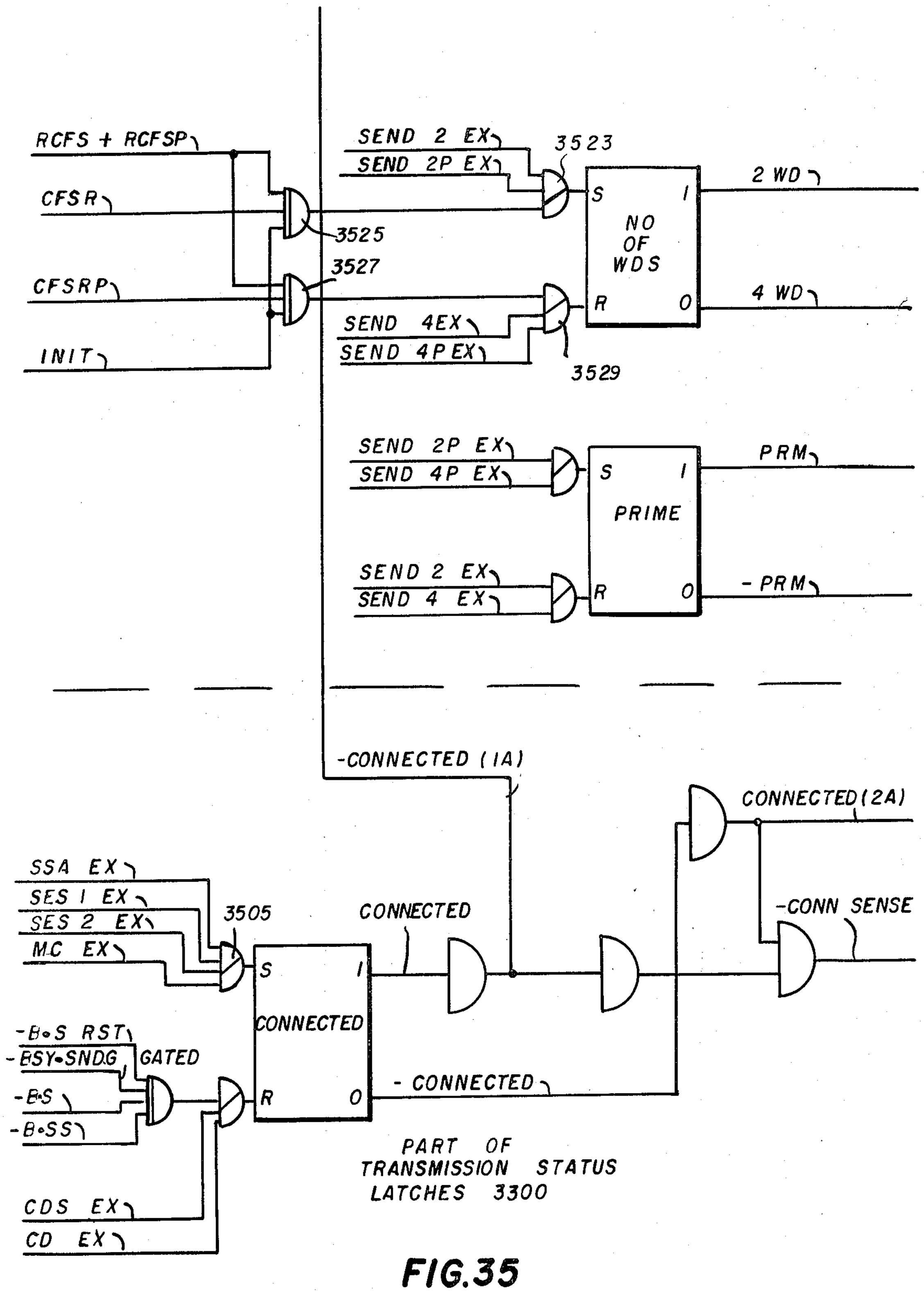
Figures 36, 37:
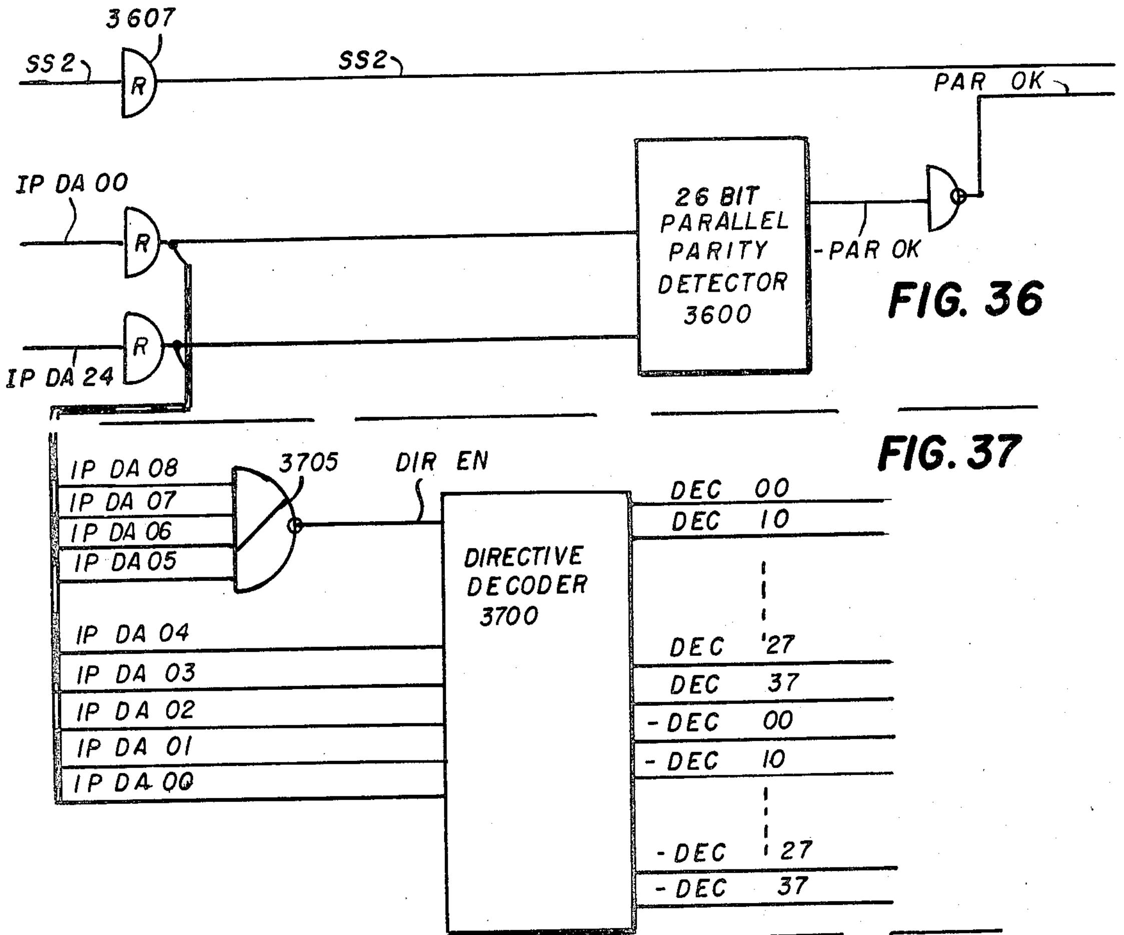

The signal CONNECTED, when true, inhibits the gates 1714 and 1716 so that the latches SCAN EN and TEST EN cannot be set and at the same time are reset, whereby when the register CCR is communicating with the data processor unit DPU, the register CCR is unable to scan the marker links for a call for service. In this same regard, the flip-flop REC GATED of FIG. 33 may not be set when the register CCR is connected to the data processor unit since the signal connected, when true, inhibits an AND gate 3305 which serves to generate clock pulses to control the latch REC GATED in response to the clock in signal received from the markers. Also, in accordance with the present invention, the scanning of the marker links does not commence until the signal CONNECTED becomes false when the multiplexor CCX of the data processor unit DPU disconnects from the register CCR and increments the CCR scanner to the next marker link before a test for a call for service indication is made. Additionally, when the data processor unit DPU via its multiplexor CCX is connected to the register CCR, the current status of the register CCR is prevented from changing until it is instructed to do so by the unit DPU. In this regard, when the unit DPU accesses the register CCR, it requests the standard status word by interrogating the register CCR with the computer selective directive SSA EX, which as shown in FIG. 35 enables an OR gate 3505 to set the latch CONNECTED for generating the signal CONNECTED. The select standard status address enable signal SSA EX is generated by an AND gate 3805 of the directive execute control 3800 shown in FIG. 38, the gate 3805 being enabled by the decoded output signal DEC 00 from the directive decoder 3700 of FIG. 37 when the strobe select signal SS2 is generated by the data processor unit DPU as received therefrom via the cable receiver gate 3607 of FIG. 36. The decoder 3700 decodes directives received from the data processor unit DPU via its multiplexor CCX which transmits data input signal IP DA 00 through IP DA 24 as indicated in FIG. 36. The directive decoder 3700 being enabled by an AND gate 3705 in response to certain input data signals to generate a directive enable signal DIR EN as shown in FIG. 37. It should be understood that the strobe signal SS2 is a short duration pulse received from the data processor unit to strobe the decoded output signal DEC 00 at the gate 3805 of FIG. 38 to insure that the data information is stable.

Figure 18:
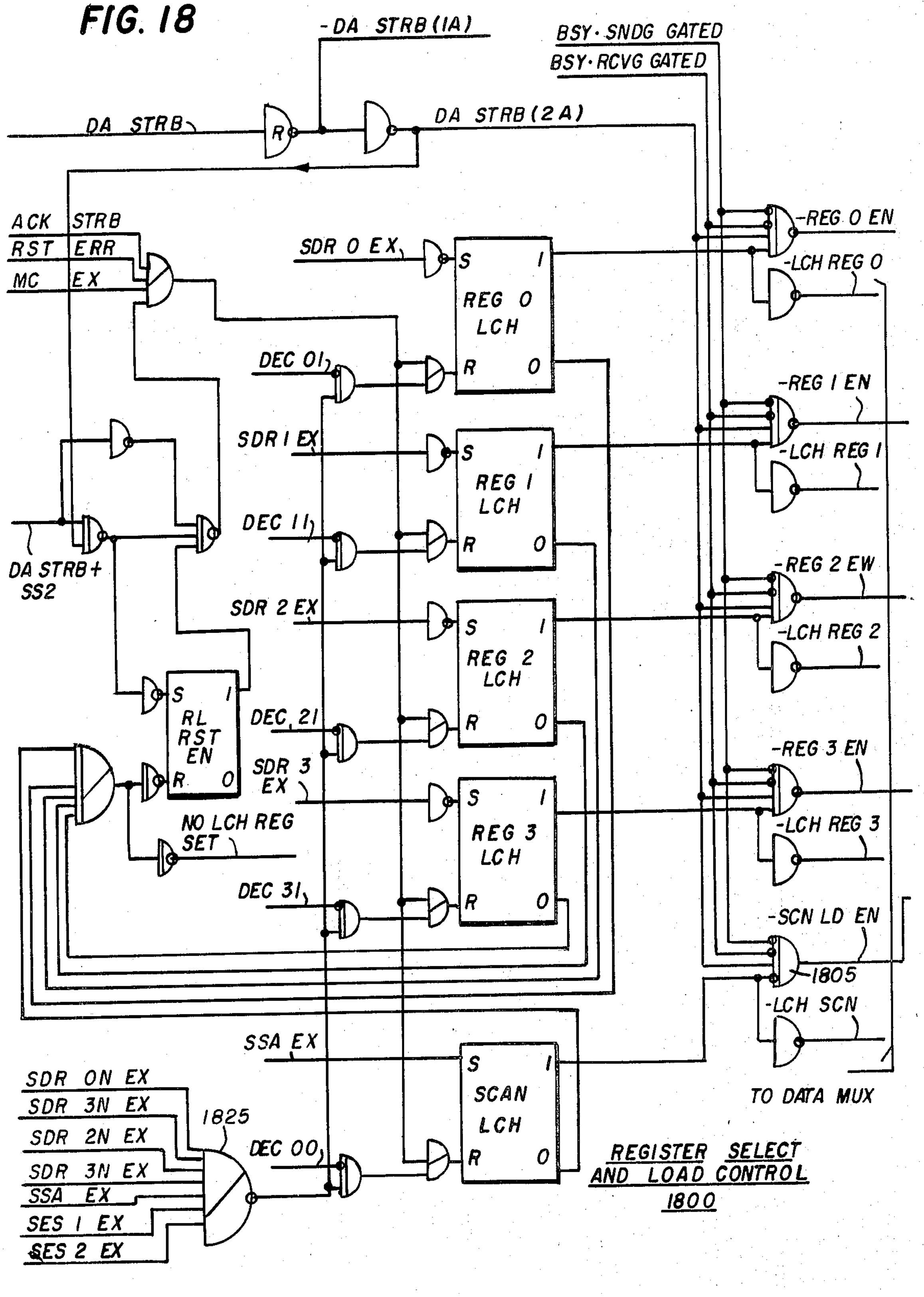

In order to maintain the status of the register CCR constant during a connect mode and to allow for the presetting of the scanner address, the select standard status and address enable signal SSA EX generated by means of the gate 3805 sets a scan control latch SCAN LCH of the register select and load control circuit 1800 of FIG. 18. The register select and load control circuit 1800 includes four register latches REG O LCH through REG 3 LCH and the scan latch SCAN LCH for controlling the loading of the shift register in response to the decoded output signals from the directive decoder 3700 of FIG. 37. The setting of the latch SCAN LCH causes the generation of a signal LCH SCN for inhibiting an AND gate 1805 to enable subsequent loading of the scanner and for enabling the output data multiplex 4100 of FIG. 41.

Figure 41:
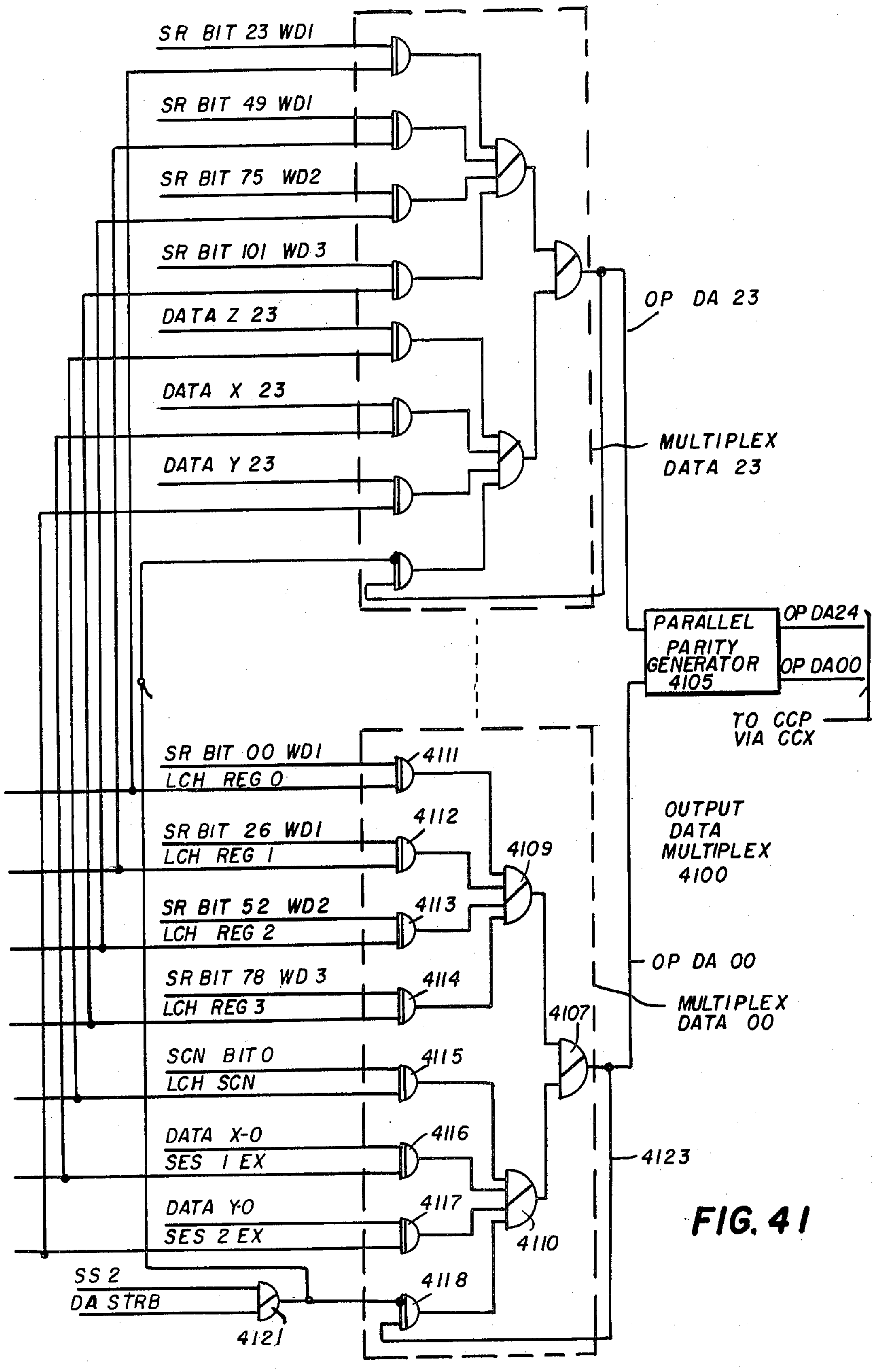

The output data multiplex 4100 of FIG. 41 multiplexes data signals from the register CCR, and in so doing supplies 24 output data bits OP DA 00 through OP DA 23 to a parallel parity generator 4105 which adds a 25th parallel parity bit OP DA 24 to provide an odd parity indication for the 25 data bits supplied to the processor CCP via the multiplexor CCX. The output data multiplex 4100 comprises 24 similar multiplexing circuits designated MULTIPLEX DATA 00 through MULTIPLEX DATA 23. Since each one of the multiplex data units is similar to one another, only the data multiplex 00 will now be described. The data multiplex 00 includes an OR gate 4107 which generates the signal OP DA 00 and is enabled by either one of a pair of OR gates 4109 and 4110. Each one of the pair of OR gates 4109 and 4110 are energized by four AND gates, the outputs of the AND gates 4111 through 4114 being connected to the four inputs of the gate 4109 and similarly the outputs of the four gates 4115 through 4118 being connected to the four inputs of the gate 4110. The AND gates 4111 through 4114 are enabled by the register select latches REG O LCH through REG 3 LCH of FIG. 18, and similarly the latch 4115 is enabled by the latch SCAN LCH of the register select and load control 1800 of FIG. 18. The gates 4116 and 4117 are enabled by the error status select signals SES 1 EX and SES 2 EX, respectively, which originate from the processor CCP via the respective latches SES 1 and SES 2 of the directive execute control 3800 of FIG. 38. The AND gate 4118 is enabled by the output of an OR gate 4121, which is in turn enabled by the select signal SS2 from the processor CCP or the data strobe signal DA STRB from the processor. The latter gates 4118 and 4121 are employed to latch the output of the gate 4107 to insure that the output signal OP DA 00 remains stable when the data is presented to the processor CCP and to insure that the status of the register CCR remains constant during a connect operation when the computer processor CCP requests the standard status word by causing the generation of the signal SSA EX via the gate 3805 of FIG. 38 as mentioned previously. For this purpose, a lead 4123 connects the output of the gate 4107 to the input of the AND gate 4118. In operation, when the standard status word is requested during a connect mode of operation, and thus when the latch SCAN LCH is set to generate the signal LCH SCN, the gate 4115 is enabled together with the corresponding AND gates of the other 23 multiplex data units of the output data multiplex 4100 to gate various different bits of current status information, such as bits 0–4 of the scanner, from the register CCR to the outputs of the data multiplex 4100. In this regard, in the multiplex data unit 00, the gate 4107 is enabled and thus the signal is propagated via the lead 4123 to the gate 4118 to prepare it to be enabled by the gate 4121 which in turn is enabled directly via the signals from the processor CCP. Once the gate 4118 is enabled, the output of the gate 4107 is then latched to insure that the data bit remains stale when it is supplied to the processor CCP via the multiplexor CCX. It should be understood that if the data signal SCN BIT 0 is a false signal, and thus the output of the gate 4115 is false, the gate 4107 remains unenergized and therefore remains stable. The register latches of the register select and load control 1800 of FIG. 18 also control the register data loader so that if after the data processor unit DPU interrogates the latched output data multiplex 4100, it can supply new information to the shift register and the register select and load control 1800 remains set to permit the shift register words to be accessed accordingly. It should also be understood that the output data multiplex 4100 latches itself and the data signals OP DA 00 through OP DA 23 become stable during the time when the SSA EX signal (when the directive signal DEC 00 is true) is present so that when the processor CCP senses the output data signals from the multiplex 4100, after the occurrence of the signal SSA EX, the output data information is stable.

Marker Link Addressing Test

Under the control of the processor CCP the CCR registers CCR-A and CCR-B are able to test the driver distributor 1400 and the receiver multiplex 1500 of FIG. 15 to insure that the addressing of the marker links is functioning properly. For the purpose of describing the marker link addressing test, it will now be assumed that the register CCR-B is the active register. The register CCR-B via its driver distributor (not shown) supplies its clock signal (signal CLK GEN for the register CCR-B) to each one of the 14 marker transceivers sequentially. At the same time, the register CCR-A has its receiver multiplex 1500 connected sequentially to the same marker links to receive the signal CLK IN from the markers to sequentially energize the OR gate 1522, whereby the clock input signal CLK IN is generated sequentially if the marker links are functioning properly.

As shown in FIG. 17, in order to detect the presence of the clock signals received from the marker transceivers, the circuit CLOCK DETECTOR 1705 (shown as a part of the 250 KHZ clock circuit 1700) has its input connected to the signal lead CLK IN from the receiver multiplex to determine the presence of the clock signals from the marker transceivers. The clock detector circuit 1705 is a pulse absence detector, and it has its output, designated CLOCK IN TEST connected to one of the data bit inputs to the output data multiplex 4100 of FIG. 41 so that the results of the marker link addressing test may be returned to the processor CCP for diagnostic purposes. The clock detector circuit 1705 generates a 0 indication at its output when it detects a train of clock pulses, and it generates a logic 1 when a pulse train is not detected.

Register Status Display

Figure 38:
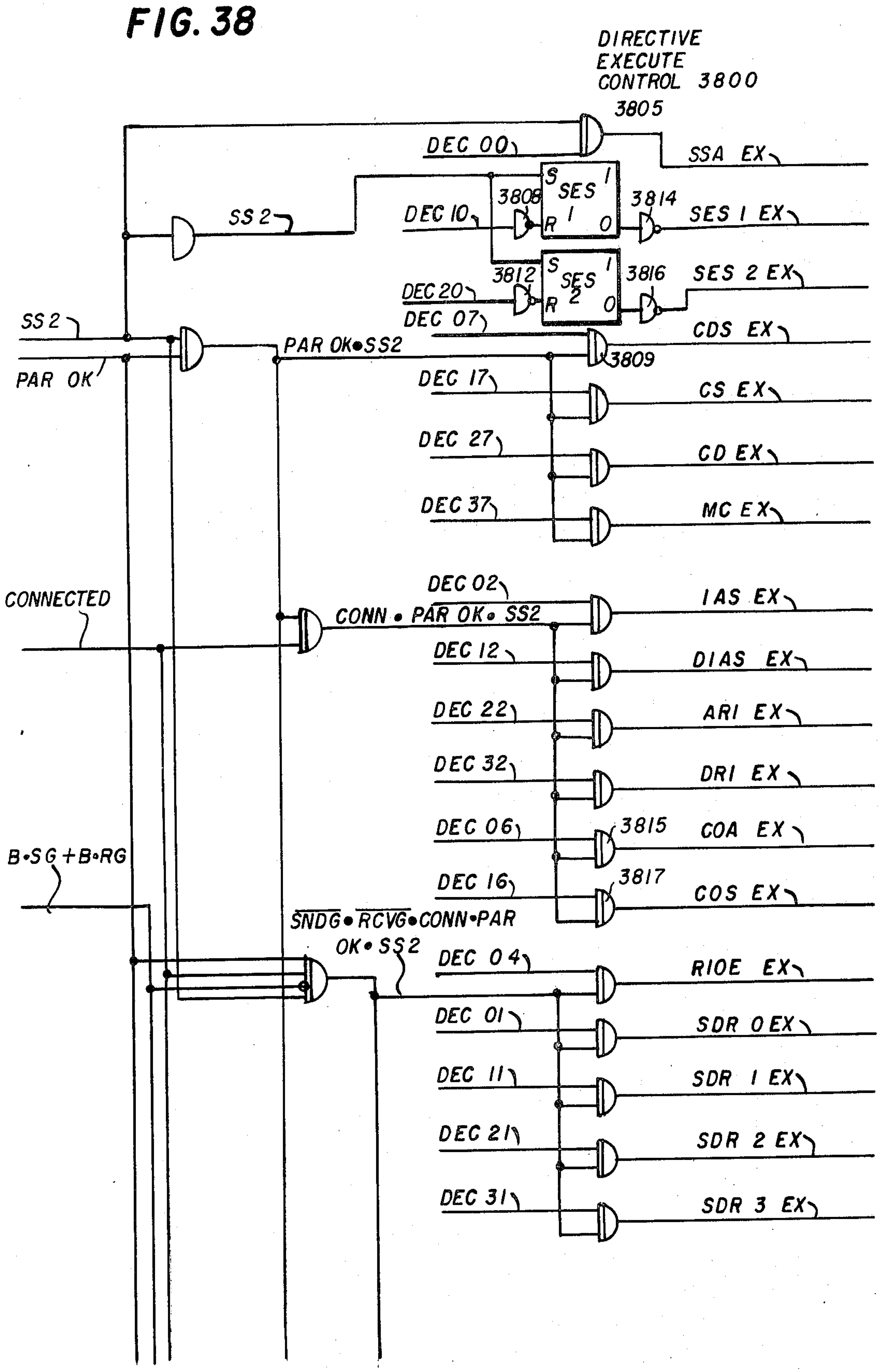

By causing the error status latches SES1 and SES2 of the directive execute control 3800 of FIG. 38 to be set by means of the error status words selected by the processor CCP and transmitted to the register CCR via the input data signals to the directive decoder 3700 of FIG. 37 to generate the respective decoded signals DEC 10 and DEC 20. The error status latches in turn generate the signal SES 1 EX and SES 2 EX for enabling the output data multiplex 4100 of FIG. 41 by enabling the AND gates 4116 and 4117, as well as the other corresponding AND gates of the other multiplex data units 01 through 23 for generating the output data sigals OP DA 00 through OP DA 23 to convey certain status information generally designated as DATA X-0 through DATA-X-23 for the error word 1 and DATA Y-1 through DATA Y-23 for the error status word 2, it being understood that the last-mentioned signals are merely general designations for any desired selected signals of the register CCR to be monitored by the processor CCP.

Considering now the error status latches SES1 and SES2 in greater detail with reference to FIG. 38 of the drawings, the strobe signal SS2 from the processor CCP is connected to the set inputs of the latches SES 1 and SES 2, and the decoded signal DEC 10 is connected through an inverter 3808 to the reset input of the latch SES 1 with the decoded signal DEC 20 connected through an inverter 3812 to the reset input of the latch SES 2. The signal SES 1 EX is generated via an inverter gate 3814 having its input connected to the 0 output of the latch SES 1, and similarly the signal SES 2 EX is generated by an inverter 3816 which has its input connected to the 0 output of the latch SES 2. Thus, the longer duration decoded signals are inverted to reset the error status latches, and when the strobe signal SS2, which is a shorter duration pulse, occurs during the decoded signal, the latches are simultaneously attempted to be set and reset. Due to the design of the latches, as mentioned previously, both the 1 and 0 outputs of the latches are driven to a logic level 1. Therefore, the inverter gates connected to the 0 outputs of the latches detect the presence of both the decoded signals and the strobe pulse SS2, whereby the decoded signals are determined to be stable.

When the signals SES 1 EX and SES 2 EX are generated, either one of the two signals, when generated, enable the gate 1825 of the register select and load control 1800 of FIG. 18 to reset any of the register latches REG 0 LCH through REG 3 LCH and the latch SCAN LCH. As a result, the processor CCP may then selectively set any one of the register latches for loading any one of the shift register words.

D7. On Line Active, On Line Standby and Off Line Operational Modes

Figure 40:
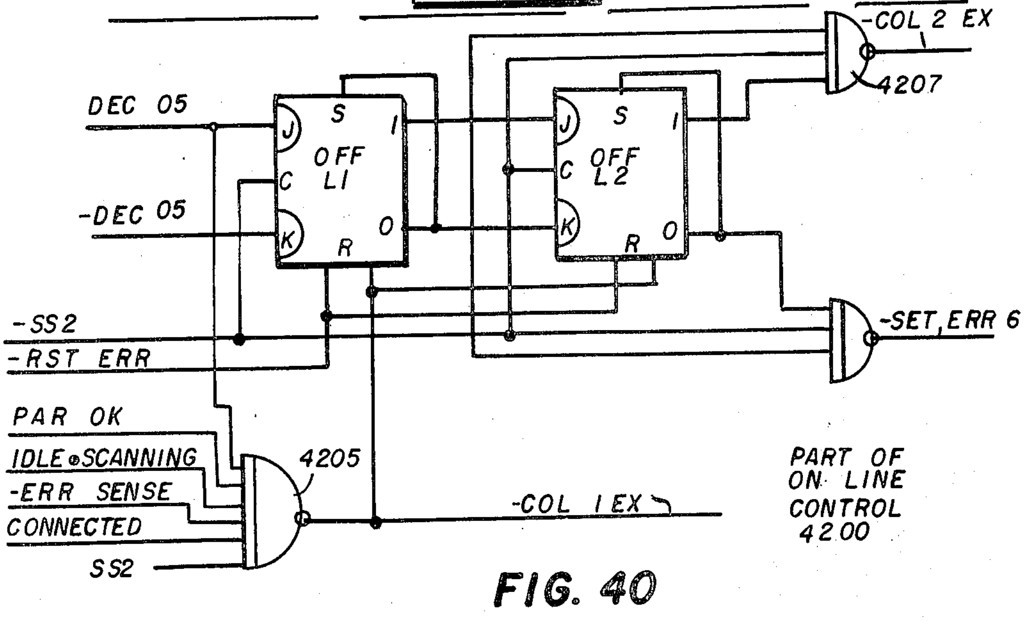
Figure 42:
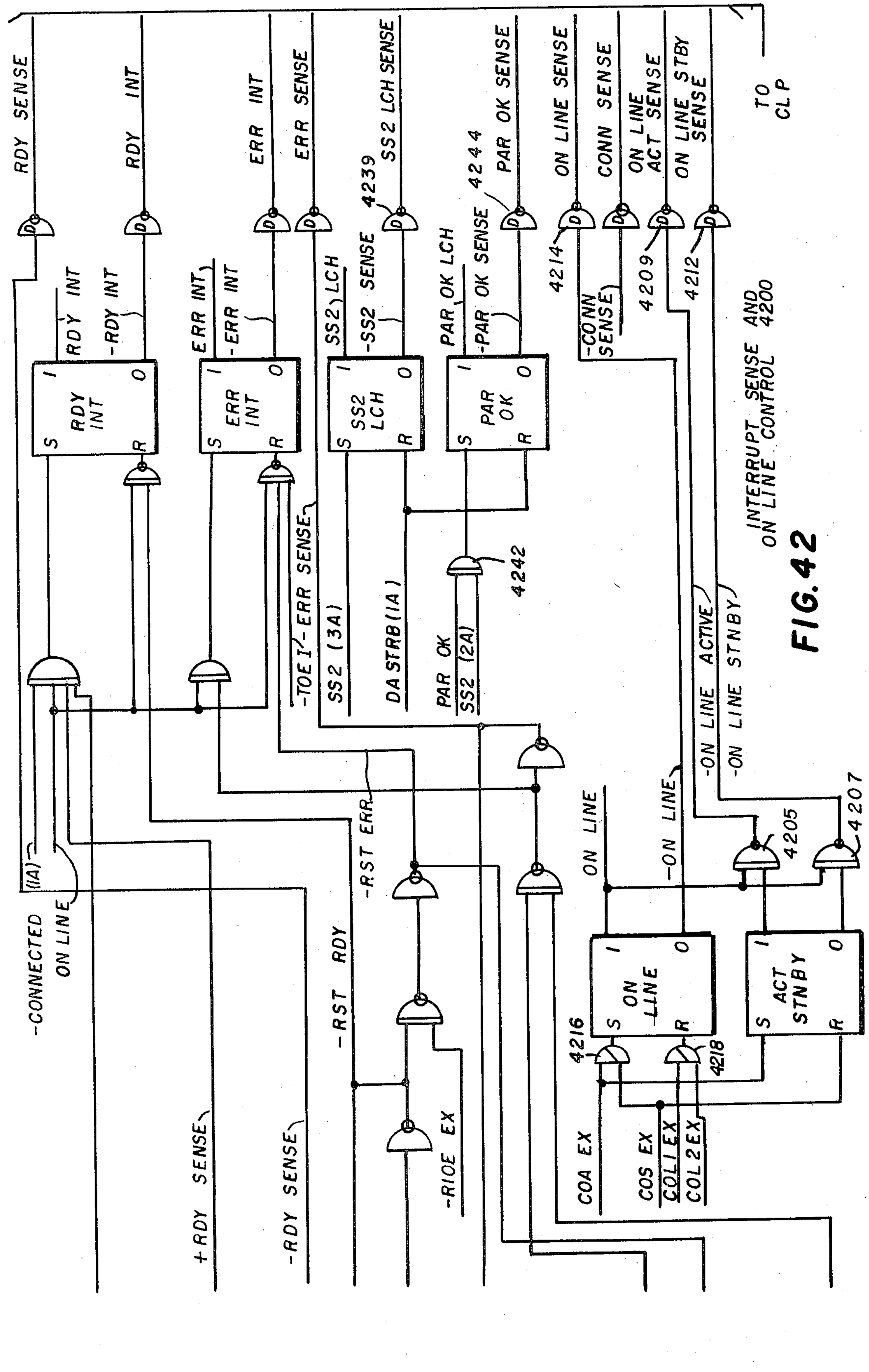
Figure 43:
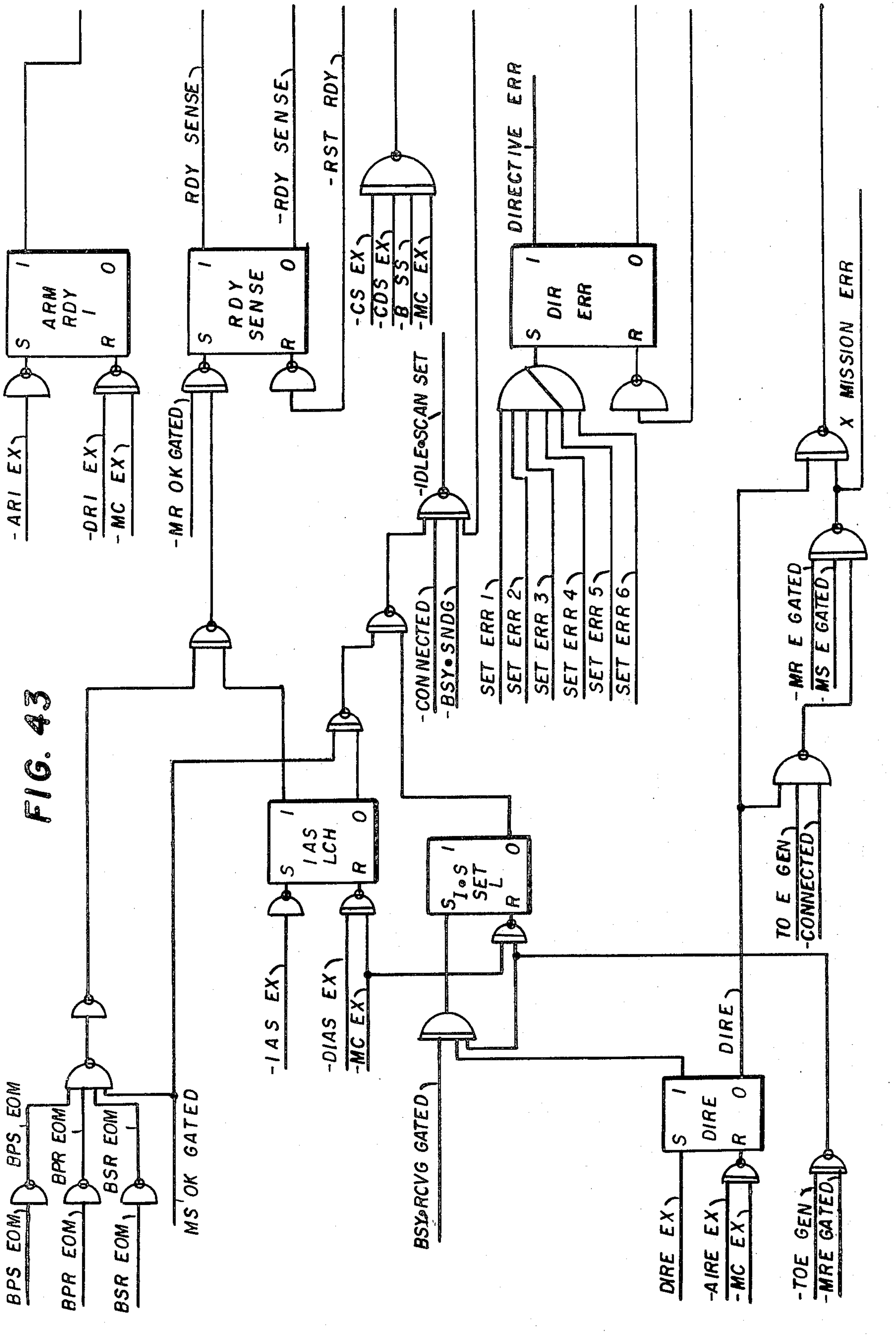
Figures 44, 45:
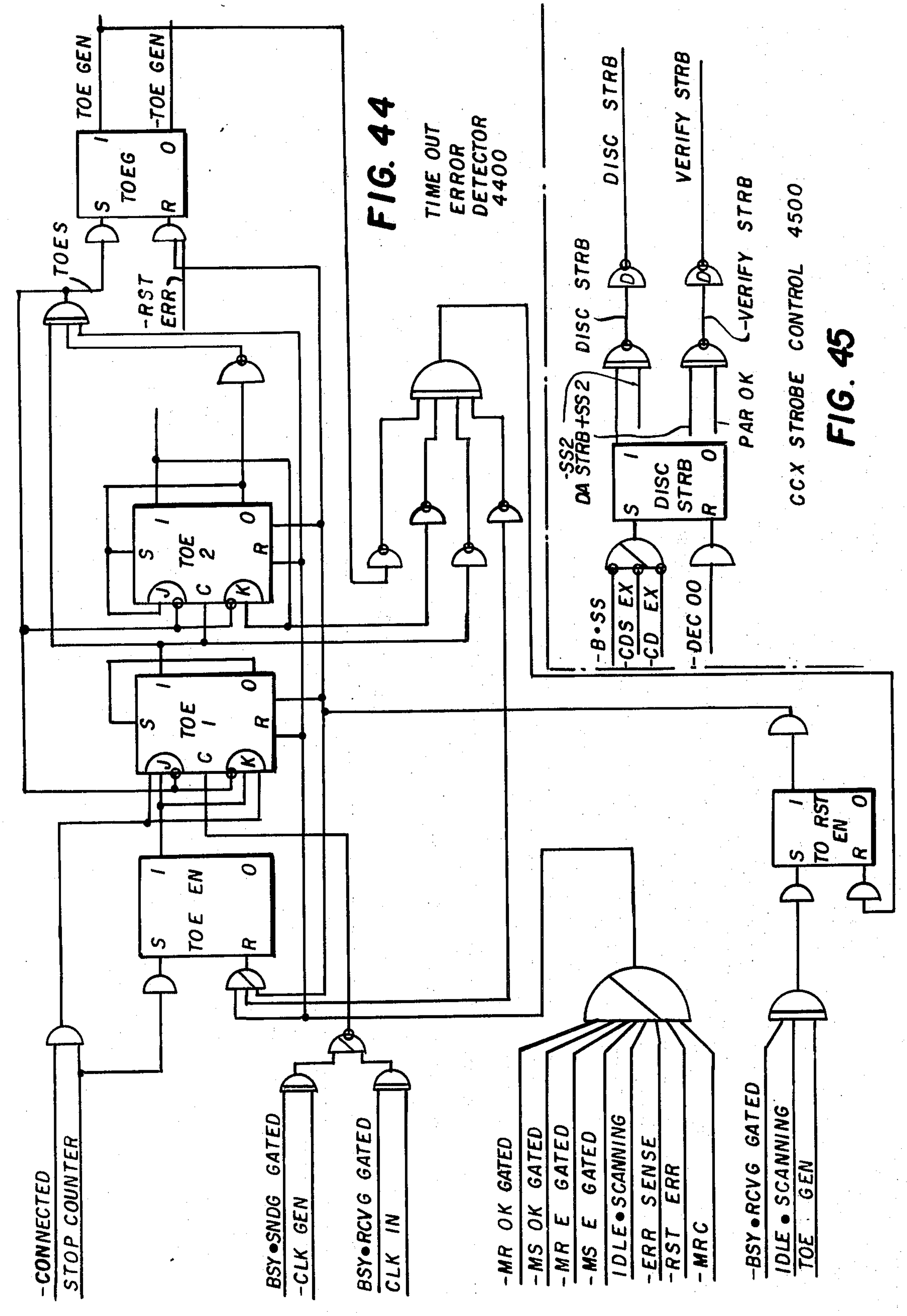

Referring now to FIGS. 40 and 42, the on line control of the register CCR will now be considered. The interrupt, sense and on line control 4200 enables the register CCR to assume any one of three possible modes of operation as follows:

1. On line active,
2. On line standby, and
3. Off line.

The not-on-line-active mode of operation of the register CCR permits routining of the register CCR by the other register which is then operating in an on-line-standby mode of operation. In this regard, the modes of operation of the register CCR are controlled by the processor CCP via the sense lines.

As shown in FIG. 42, the modes of operation of the register CCR are controlled by a pair of latches ON LINE and ACT STNBY. The on line latch generates the signal ON LINE, and the active standby latch enables an AND gate 4205 when the on line latch is set to generate a signal ON LINE ACTIVE, an AND gate 4207 being enabled by the reset output of the active standby latch when the on line latch is set to generate a signal ON LINE STNBY. The signals ON LINE ACTIVE and ON LINE STNBY are supplied via the respective cable driver gates 4209 and 4212 to the computer line processor CLP, and similarly the signal ON LINE is supplied to the computer line processor via the cable driver 4214.

An OR gate 4216 is enabled by either one of the signals COA EX or COS EX, and an OR gate 4218 is enabled by either one of the signals COL 1 EX or COL 2 EX to reset the on line latch. The signal COA EX sets the active standby latch and the signal COS EX resets the active standby latch. As shown in FIG. 38, in the directive execute control 3800 there is an AND gate 3185 which generates the select operate active execute signal COA EX in response to the decoded signal DEC 06 from the directive decoder 3700 in FIG. 37 when the signals CONN·PAR OK SS2 is generated indicating the connected parity OK during the strobe SS2. Similarly, an AND gate 3817 of the directive select operate standby execute signal COS EX in response to the decoded signal DEC 16 when the signal CONN·PAR OK·SS2 is generated. As shown in FIG. 40, the signal COL 1 EX and COL 2 EX determine the off line mode of operation, the former signal being generated during certain special conditions occurring as determined by the gate 4205 which generates the controller off line signal COL 1 EX, and the latter signal occurring when the decoded signal DEC 05 occurs twice. The occurrences of the signal DEC 05 are counted by the flip-flops OFF L1 and OFF L2 as detected by the gate 4207, which generates the signal COL 2 EX. In order to enable a register CCR to scan the marker links, the register must be in the on line active mode of operation, not connected to a processor CCP, and in the idle and scanning mode of operation.

Message Length Determination

The length of the message to be received by the register CCR is determined by the call-for-service signal from the marker before it sends its message so that the register CCR can prepare to receive the appropriate size message — either a two word message from the originating marker transceiver or a four word message from the terminating marker transceiver. In this regard, the signal CFSR indicates that a call for service has been received and that a two word message will be sent. The signal RCFS+RCFSP indicates that a call for service is being detected, the signal CFSR indicates that a two word message will be received, and the signal CFSRP indicates that a four word message will be received. Accordingly, as shown in FIG. 35, a latch NO OF WDS is set in response to an OR gate 3523, which has one of its inputs connected to the output of an AND gate 3525, which is enabled by the signals RCFS+RCFSP, CFSR and INIT. Thus, when the gate 3525 is enabled, a two word message will be sent to the register CCR and the latch NO OF WDS is set to generate the signal 2 WD. An AND gate 3527 enables an OR gate 3529 to reset the latch NO OF WDS to generate the four word signal 4 WD when the signals RCFS+RCFSP, CFSRP and INIT are all true. A pair of signals SEND 2 EX and SEND 2P EX also enable the OR gate 3523 to set the number of words latch when sending takes place from the register CCR, and also during sending the signals SEND 4 EX and SEND 4P EX enable the gate 3529 to reset the number of words latch. As mentioned previously, the P suffix on the end of the call for service designation indicates a "prime" for the four word transmission.

Error Messages

Error messages are sent from the receiving register to the sending register when the message was received in error. The error message is sent during the shift detection operation and at the end of the message to provide a double checking operation. As shown in FIG. 31, an inverter gate 3123 generates a signal —BMRG which indicates that a bad message was received, and a gate 3125 generates a signal —GMRG—EOM to indicate that a good message was received at the end of the message. Thus, the dual or double check facilitates the determination of an accurately received message. The gate 3123 is enabled by the gate 3127, which is enabled by a gate 3129 at the end of a message when the message was received in error, or the gate 3127 is enabled by either one of the signals RBP (received bad parity) or RBS (received bad shift) indicating that an error has been detected during the receipt of the message. At the end of the message, the gate 3130 is enabled by the bad message flip-flop BM, which is set by a gate 3132 which in turn is enabled by either one of the signals RBP or RBS. The other signals for enablig the gate 3129 occur at the end of a message being received at the beginning of an interlock operation. The flip-flop BM is set by the clock signal SR CLK. The good message receive gate 3125 is enabled by the 0 output side of the flip-flop BM. The remaining signals which energize the gate 3125 indicate that the end of message has occurred at the beginning of the interlock operation.

Serial Message Parity Detection and Generation

Figures 23, 23A, 23B:
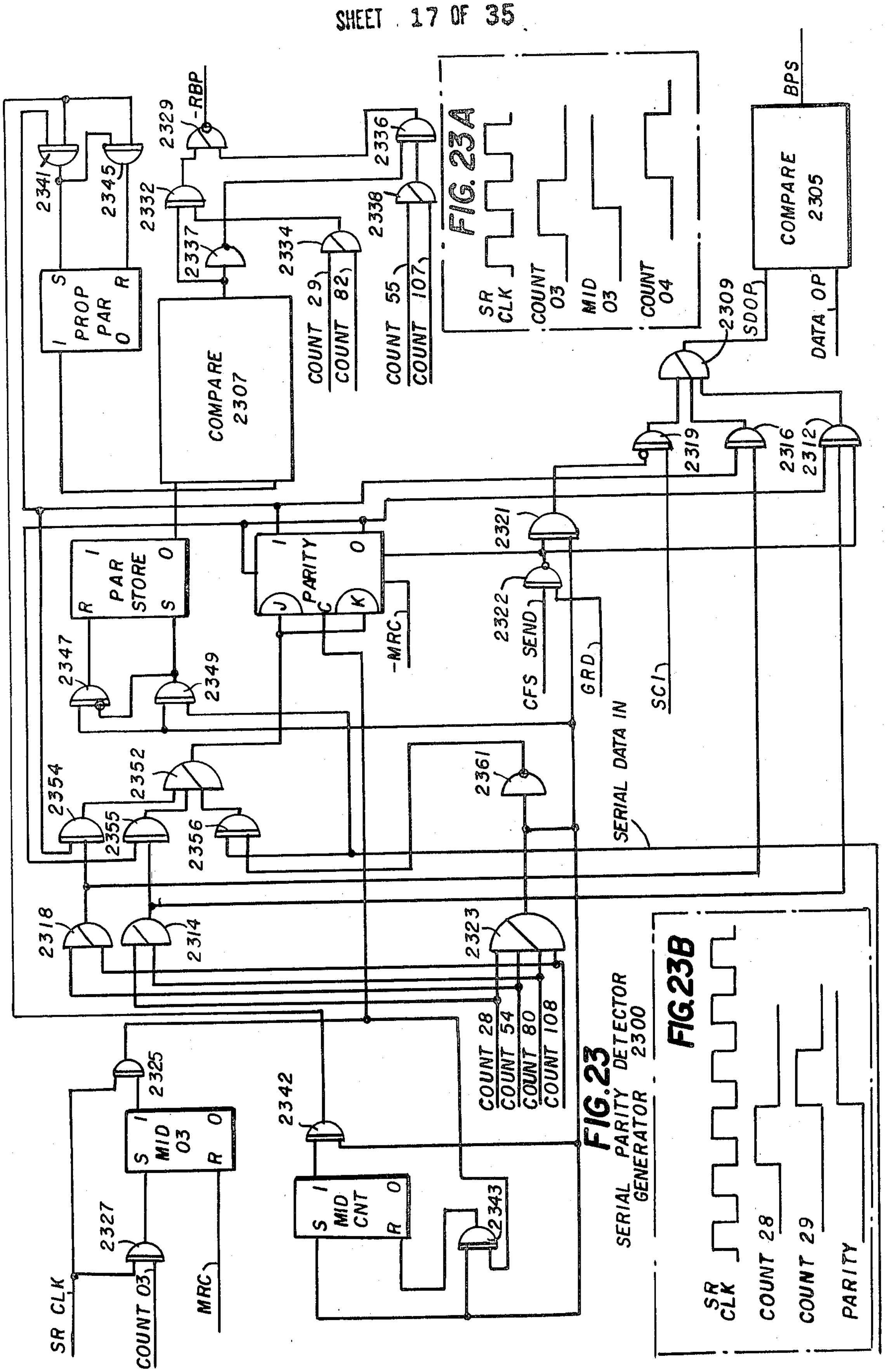

The register CCR verifies proper parity of a message as it is being sent from the register CCR, and the marker communication transceiver verifies the proper parity of the message received by it so that a dual or double check is made on every serial transmission to provide a high degree of accuracy. As shown in FIG. 23, a comparison circuit 2305 generates a bad parity sent signal BPS during the sending mode of operation from the register CCR to the register MCR of a marker transceiver, and the comparison circuit 2305 generates its output signal BPS when a mismatch occurs between the serial data output signal DATA OP from the output of the shift register at the SC 1 flip-flop of the header bit shift control portion therof and a signal SDOP which indicates proper parity. In this regard, the processor CCP loads the shift register in parallel, and each shift register word includes a parity bit at its 26th bit (the bit designated 25 of the bits 0 through 25) as loaded by the processor CCP. Therefore, in order to check the parity bit loaded into the shift register by the processor CCP, each one of the data bits is detected as they are being shifted from the shift register to the marker so that the signal SDOP is generated to indicate the proper state of the parity bit and the comparison circuit 2305 compares the signal SDOP as representing what the state of the parity bit should be with the actual parity bit loaded into the shift register by the processor CCP. Thus, in a two word message, both parity bits are checked and the signal BPS is generated as the parity bit is shifted from the shift register for either one or both of the parity bits. Similarly, for a four word message all four bits indicating are checked as they are shifted from the register, and if any one of them is inconsistent with the actual parity of the data bits of the word associated therewith, the signal BPS is generated at the time the parity bit is shifted from the shift register.

During a sending mode of operation, the flip-flop PARITY follows the data signals on each word as they are shifted from the shift register and sent to the selected marker. For this purpose, the signal SERIAL DATA IN is gated to the J input of the parity flip-flop and also to its K input, the serial data in signal being generated in the input pulse control circuit 2005 of FIG. 20 to follow the signals being shifted into the shift register from the output of the output flip-flop SC1, since as the data words are shifted from the shift register to the marker transceiver, the same information is also shifted back into the shift register. The MID 03 latch is provided to inhibit the parity flip-flop during the shifting of the header bits so that only the data words are monitored.

During a receiving mode of operation of the register CCR, the parity flip-flop also follows the information being received serially into the shift register to cause a latch PROP PAR to be set to the proper state to indicate proper parity for the data bits being received, and a latch PAR STORE stores the state of the parity bit received. A comparison circuit 2307 compares the outputs of the parity store latch and the proper parity latch so that if a mismatch occurs between the states of those two latches, a signal RBP is generated to indicate that a bad parity condition has occurred during a receiving mode of operation. The signal RBP is generated for each parity bit as it is received when it is inconsistent with the proper parity for the given data word.

Considering now the serial parity detector-generator 2300 in greater detail with reference to FIG. 23 of the drawings, the parity of the data bits being transmitted for each data word is detected and the proper parity is indicated when the total number of logic level 1's for both the data bits and the parity bits is an odd number. Odd parity is used in the present system, because if an even parity design were employed, such a design would not detect a failure where the 25 data bits are all logic level 0 or all logic level 1. Since the serial parity detector-generator 2300 detects the parity of the data bits being sent as they are being transmitted from the shift register, and since the parity flip-flop follows each bit, the parity flip-flop following the data bits start and end in different states (either reset or set) as a result of the odd number of 1's being generated for 26 bits of each register word. Therefore, since there is no time to reset the parity flip-flops before the next word is transmitted, the set or 1 and reset or 0 outputs of the parity counter are employed to generate the signal SDOP indicating serial data out with proper parity, the zero output of the parity flip-flop is detected for the word 0 and word 2, and the one output of the parity flip-flop is detected for the word 1 and word 3. In this regard, the proper parity is determined at the time when the 25th bit of a message word is being sent by determining the state of the parity flip-flop. However, for the first shift register word 0 and the third shift register word 3, the 0 output of the parity flip-flop is utilized to generate the proper parity state due to the odd number of 1's being shifted during those words so that the signal SDOP is generated. In this regard, an OR gate 2309 has its output connected to the comparison circuit 2305 to generate the signal SDOP and has its input connected to an AND gate 2312, which in turn is enabled by the 0 output of the parity flip-flop when an OR gate 2314 is enabled during either count 23 or count 80. Gate 2312 is also enabled by gate 2322 which is enabled by the signal CFS SEND and GRD in the register CCR. In the register MCR the signal GRD is replaced by the signal PRIME. In this regard, state 2322 functions to inhibit generation of parity on returning messages to the register CCR which were received with a prime call for service. Therefore, the counts 28 and 80 corresponding to the 25th bits of the respective shift register words 0 and 2 enable the gate 2312 to respond to the 0 output of the parity flip-flop. Similarly, an AND gate 2316 has its output connected to another input to the gate 2309 and is enabled by the one output of the parity flip-flop and the output of an AND gate 2318 which in turn is enabled by either the COUNT 54 or the COUNT 108 corresponding to the 25th bits of shift register words 1 and 3, respectively.

A circuit identical to the serial parity detector-generator 2300 for the register CCR is employed in each one of the registers MCR of the marker transceiver to perform a similar function therewithin. However, the comparison circuit 2305 is not provided in the register MCR, but instead the signal SDOP serves as the output of the shift register, and thus an AND gate 2319 having its input connected to the output of the shift control flip-flop SC1 for the marker MCR to follow the data being shifted from the MCR shift register. The gate 2319 is inhibited during the 25th bit of each shift register word to permit the gates 2316 and 2312 to generate the 26th bit for parity purposes, whereby the parity bits are interjected into the data bit stream automatically when this circuit is employed in the register MCR. In order to inhibit the gate 2319, an AND gate 2321 is enabled by gate 2322, which is enabled by the signal GRD in the register CCR and the signal —PRIME in the MCR, and the output of an OR gate 2323, which is enabled by any one of the 26th bit counts.

In order for the serial parity detector-generator 2300 to ignoe the first three shift control header bits during the sending mode of operation of the register CCR, an AND gate 2325 is enabled by the shift register clock signal SR CLK and the one output of the middle of count 03 latch MID 03 to drive the clock input to the parity flip-flop. The latch MID 03 is set by an AND gate 2327 which is enabled by the signal SR CLK. As indicated by the wave forms of FIG. 23A, the COUNT 03 signal generated at the end of the previous count determined by the signal SR CLK, and the middle 03 latch is set by the leading edge of a shift register clock pulse during the middle portion of the signal COUNT 03; whereby the parity flip-flop is not clocked until the next trailing edge of the shift register clock at the beginning of count 04. Thus, the first three bits are ignored during the first three counts.

During the receiving mode of operation of the register CCR, an OR gate 2329 generates the signal RBP when an AND gate 2332 is enabled by a mismatch detected by the comparison circuit 2307 when the OR gate 2334 is enabled during either count 29 or count 82 corresponding to the 26th bit of shift register word 0 and shift register word 2, respectively. Similarly, an AND gate 2336 enables the gate 2329 when an inverter gate 2337 is energized. An OR gate 2338 enabled by either one of the signals COUNT 55 or COUNT 107 enables the gate 2336 during the 25th bit of the shift register word 1 and shift register word 3 when the gate 2337 indicates that a mismatch has not occurred.

An AND gate 2341 sets the proper parity flip-flop in response to the one output of the parity flip-flop and the output of an AND gate 2341, which is enabled by the one output of a middle count latch MID CNT and the output of the OR gate 2323. The middle count latch is set by the gate 2323 during the four counts as indicated in the drawings associated with the four shift register words so that the gate 2341 is not enabled until the middle portion of the count signals enabling the gate 2323 to provide a necessary time delay. The middle count latch is reset by an AND gate 2343 which is enabled by the gate 2325 associated with the middle count 03 latch and by the output of the gate 2323. The proper parity latch is reset by means of an AND gate 2345 which is enabled via its inhibit input by the output of the gate 2341 and the output of the gate 2342.

The parity store latch is set by an AND gate 2349 which is enabled by the signal SERIAL DATA IN to follow the data signals being shifted by the shift register when an AND gate 2349 is enabled. The gate 2349 is enabled by the count signals associated with the gate 2323 for each shift register word and by the serial data in signal, to cause the parity store latch to follow the serial data input signals. The parity store latch is reset by the gate 2347.

The parity flip-flop is set at its J input by an OR gate 2352 which is enabled by a series of three AND gates 2354, 2355 and 2356. The AND gate 2354 is enabled by the output of the gate 2318 and the one output of the parity flip-flop, and similarly the gate 2355 is enabled by the output of the gate 2314 and the 0 output of the parity flip-flop. The gate 2356 is enabled by the serial data input from the shift register and by the output of the gate 2323. Thus, after the initial three shift control header bits are either sent or received, for both the sending and receiving modes of operation for the register CCR the parity flip-flop follows the serial data input to the shift register since the gate 2356 is enabled to prepare both the J and K inputs to the parity flip-flop and since the clock input to the parity flip-flop is responsive to the shift register clock signals SR CLK. However, during counts 28, 54, 80 and 108, the gate 2356 is not enabled due to the inverter gate 2361 interposed between the gates 2323 and 2356, but either the gate 2354 or the gate 2355 is enabled to either set or reset the parity flip-flop depending upon its previous state. The parity flip-flop is set at the end of the counts which enable the gate 2323. For example, considering now the count 28 as shown in FIG. 23B, the J and K inputs to the parity flip-flop are enabled at the beginning of count 28, but the flip-flop PARITY is not caused to change its state until the end of the signal COUNT 28 when a trailing edge of the shift register clock pulse occurs. Thus, at the end of the count 28, which is the beginning of count 29, the parity flip-flop changes state. This is the reason why the gate 2334 is enabled by the signal COUNT 29, and the other signals associated with gates 2334 and 2338 are one greater than the corresponding signals for enabling the gate 2323.

Directive Error Detector

Figure 39:
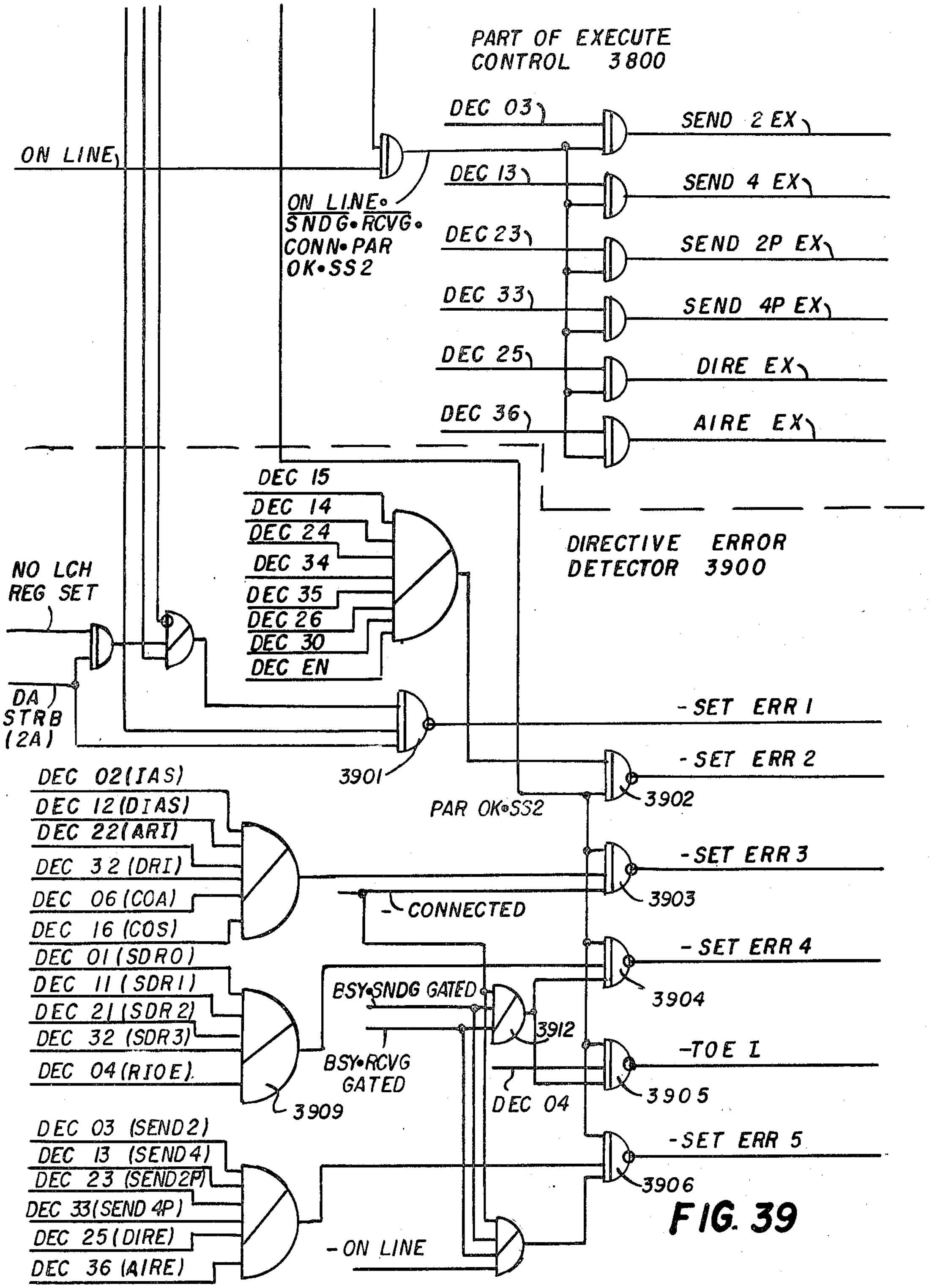

Referring now to FIG. 39, there is shown the directive error detector 3900 which checks for proper directive execution sequences and for insuring proper hardware status prior to directive execution. Thus, the detector 3900 insures that improper executions by the processor CCP when it directs the register CCR are detected so that the erroneous operations may be corrected. When the detector 3900 indicates erroneous operation has occurred, it returns an error indication to the processor CCP.

A series of six gates 3901 through 3906 generate six different error indication signals SET ERR 1 through SET ERR 4 TOE 1 and SET ERR 5. When a certain combination of conditions occur which are not proper. For example, the signal − SET ERR 4 is generated by the gate 3904 the register CCR is in its sending mode of operation and a decoded signal DEC 01 is generated by the directive decoder 3700 of FIG. 37 when a directive is received from the processor CCP indicating and directing the register CCR to load shift register word 0. Obviously, such an instruction from the processor CCP is improper since the register CCR may not be loaded when it is in the process of sending a message to a marker transceiver. In this regard, the signal DEC 01 enables a gate 3909 and the signal BSY·SNDG GATED enables a gate 3912 so that the gate 3904 is thus enabled.

Select Strobe, Data Strobe and Parity Detector Maintenance Operations

Referring now to the interrupt, sense and on line control circuit 4200 of FIG. 42, during normal operating conditions further diagnostic detections are provided by the latches SS2 LCH and PAR OK to indicate the proper receipt of the select strobe SS2, the data strobe DA STRB and the parity detection signal PAR OK. In this regard, the latch SS2 LCH has the signal SS2 connected to its set input and the signal DA STRB connected to its reset input, whereby the state of the latch SS LCH determines the presence of the last signal received. The cable driver 4239 connected to the 0 output of the latch SS2 LCH represents the latch status and thereby proper functioning of the strobe signals. The output of the cable driver 4239 is connected to the computer line processor CLP.

Similarly, an AND gate 4242 has its output connected to the set input of the latch PAR OK and is enabled by the signal PAR OK and the select strobe signal SS 2. The reset input to the latch PAR OK is enabled by the data strobe signal DA STRB. Thus, during normal operation of the parity detection signal, the parity OK latch is set so that the output of the cable driver 4244 is at a 1 logic level condition to indicate proper functioning of the parity detection to the computer line processor CLP. The output of cable driver 4244 will be at a "0" logic level if the last signal received was a data strobe.

Marker Transceiver Automatic Message Resending

Figure 46:
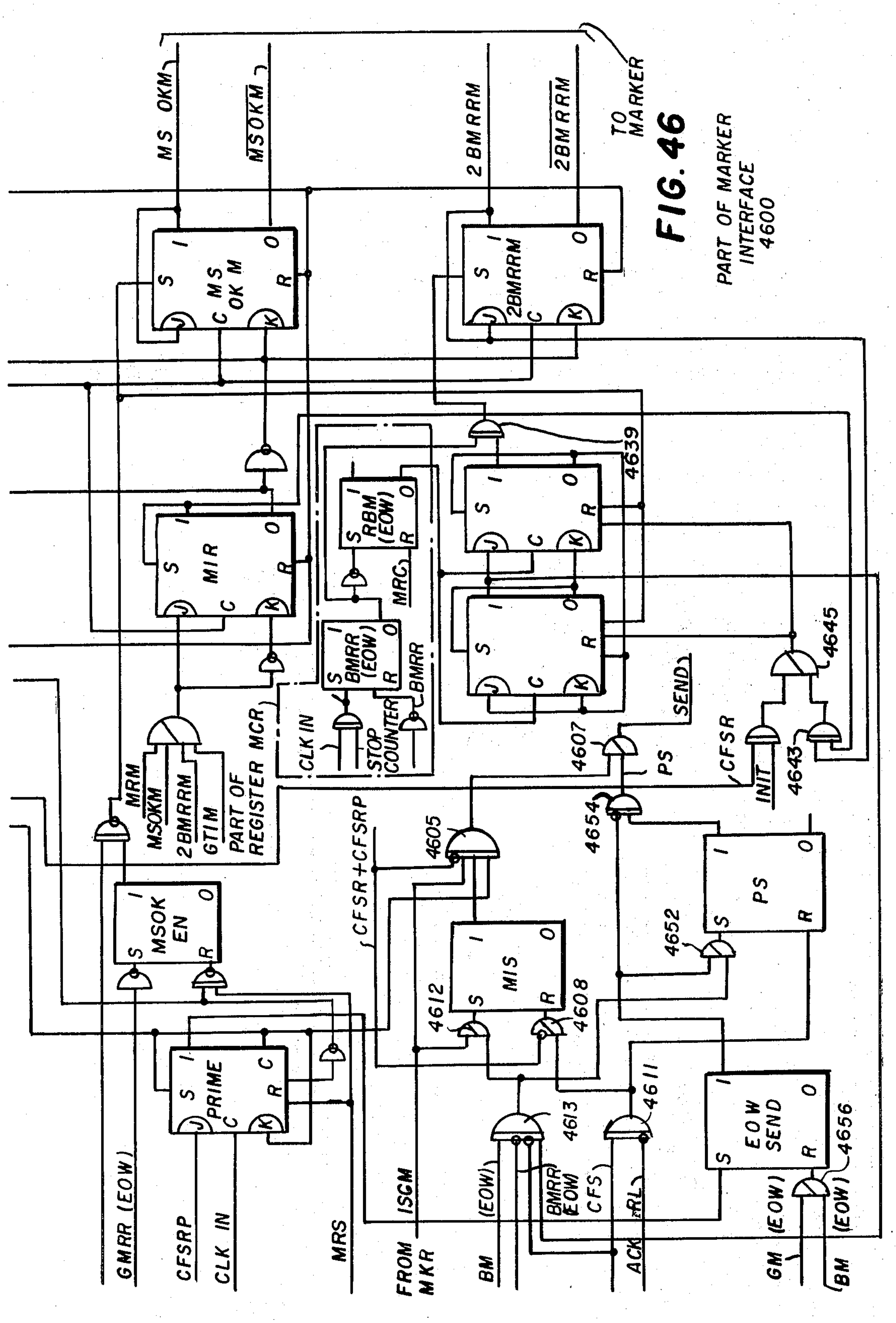
FIGS. 46 and 47, when arranged as shown in FIG. 55, illustrate the marker interface portion of the marker transceiver.
Figure 47:
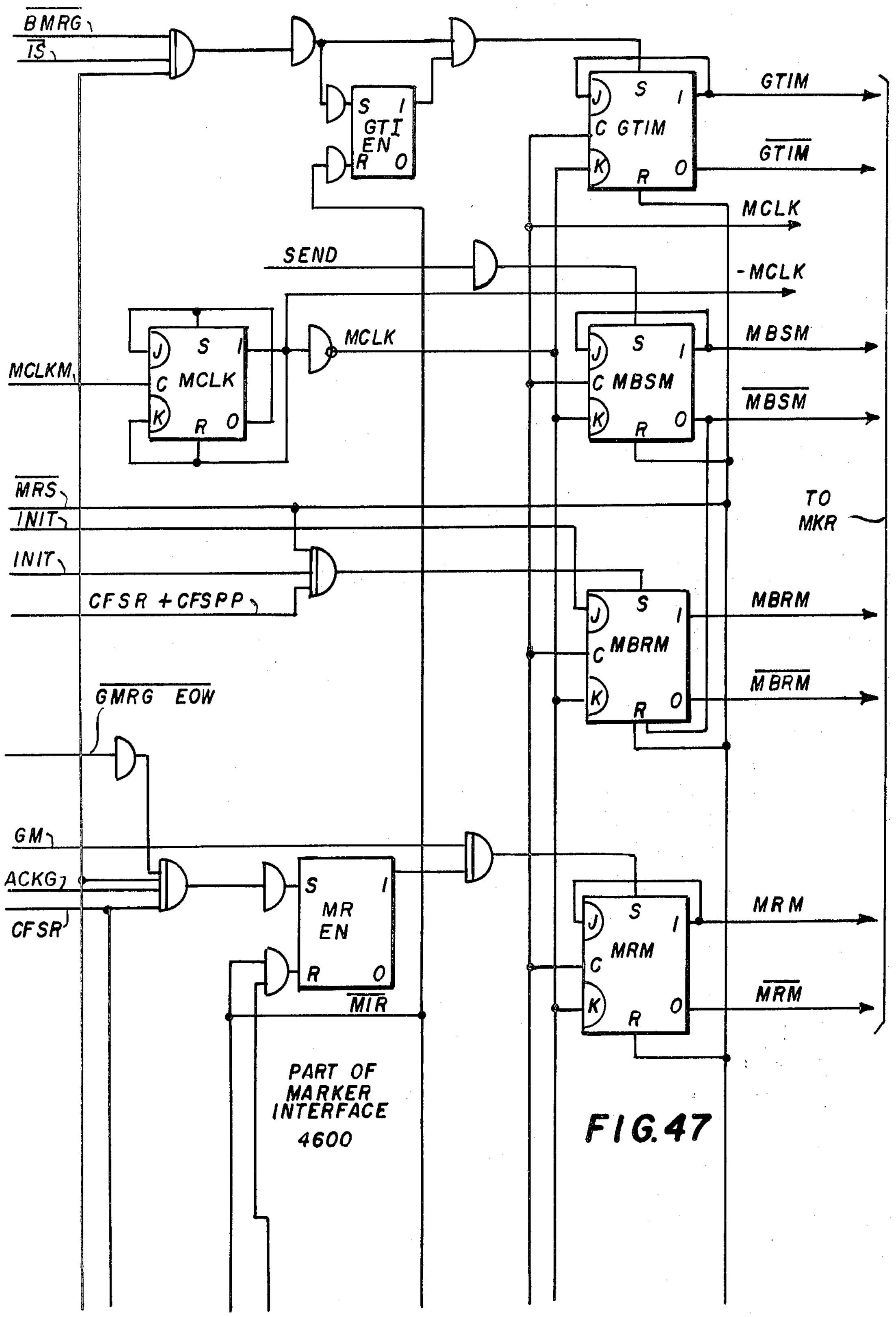

Referring now to FIGS. 46 and 47, the marker transceiver is adapted to resend a message from the marker to the register CCR in the event of an error. If a parity error occurs, or a shift check error occurs, the marker transceiver sends a request automatically to send the message again. As noted previously, the marker transceiver shown in FIG. 10 is identical to the corresponding units of the register CCR, except for the marker interface. The marker interface 4600 shown in FIGS. 46 and 47 is unique to the marker transceiver, since no such corresponding circuit is employed in the register CCR.

When a marker transceiver desires to send a message to the register CCR, a signal ISCM of FIG. 46 is generated and designates an initiate send during a call processing mode from the marker. The signal ISCM becomes false when either a message is sent successfully or is sent twice and received improperly both times. Assuming now that the marker transceiver wishes to send a message to the register CCR, the signal ISCM becomes true and enables an AND gate 4605 which has its other inputs connected to a normally-set latch MIS (marker initiate send) and the 0 output of a latch PRIME indicating that the call is not a prime call for service received from the register CCR. The remaining input to the gate 4605 is the signal CFSR+CRSRP indicating that the register CCR has not requested an ordinary or primed call for service since the last-mentioned signal is connected to an inhibit input to the gate 4605. An OR gate 4607 is enabled by the gate 4605 to generate a signal SEND for initiating the sending of the message to the register CCR in a manner as previously described for sending a message from the register CCR to the marker transceivers. In this regard, the enabling of the gate 4607 to generate the signal SEND causes the generation of the master reset signal MRC for the register MCR portion of the marker transceiver to initialize or reset its serial transmission in preparation for sending a message. The MRC signal generated by the marker transceiver causes at the end thereof the setting of the call for service latch CFS (not shown) for the register MCR of the marker transceiver, and thus the call for service is generated and transmitted to the register CCR. When the register CCR is ready to receive the serial message from the marker, it returns an acknowledge signal to set an acknowledged receive latch ACK RL (not shown) of the marker transceiver corresponding to the similar-named latch of the register CCR. Thus, the serial transmission then takes place.

At the completion of the serial transmission, the bad message received latch BMRR (EOW) of the register MCR (not the marker interface portion of the marker transceiver) is set. In this regard, the signal BMRR is received from the register CCR via the status leads which are decoded, whereby the latch BMRR (EOW) is allowed to set to indicate a bad message received at the end of the shift register word. Thus, the 0 condition at the 0 output of the bad message received latch causes the latch RBM (EOW) of the register MCR (not a part of the marker interface) to set. The receipt of the BMRR signal at the end of the transmission causes the resetting of the acknowledge received latch which causes the call for service latch of the register MCR to remove the call for service indication for requesting same from the register CCR. Removing of the call for service causes the register CCR to cause the bad message received signal BMRR to become false forcing a 1—1 condition on the outputs of the BMRR (EOW) latch. The setting of the latch RBM (EOW) causes a counter comprising a pair of flip-flops 1BMR and 2BMR to be advanced from a 0 state to a 1 state. In its 1 state, the flip-flop 1BMR is set and the other flip-flop 2BMR is reset. Thus, the complete condition for resetting the call for service latch of the register MCR is the setting of the latch BMRR (EOW) and the resetting of the acknowledge receive latch.

Before the first transmission commenced, the MIS latch was reset by an gate 4608. In this regard, the gate 4608 enabled by an AND gate 4611 since a call for service from the register CCR has not been received to enable the other input to the gate 4608. The register CCR call-for-service signals CFSR + CFSRP are provided to inhibit sending and enable receiving in the register MCR upon receipt of the aforementioned signal. In this regard, message reception from the register CCR is given priority over message sending from the register MCR. The gate 4611 is enabled when the call for service latch generates the signal CFS for the register MCR and prior to the receipt of the acknowledge signal from the register CCR the acknowledge receive latch generates the signal-ACK RL. Thus, at that time, the gates 4605 and 4607 are de-energized to cause the send signal to become false. After the transmission has been completed, and a bad message received signal is received by the register MCR, an gate 4612 enables the latch MIS for the second time since the signal RBM (EOW) is true and likewise the signal and 1BMR is true in the present example, the call for service CFS and BMRR (EOW) signals being false at the end of the transmission. As a result, the latch MIS sets to enable the gates 4605 and 4607 to generate the send signal for a second time. Moreover, when the signal SEND is generated, the signal MRC is generated in response thereto to initialize the serial transmission for the resending of the same message. At the end of the master reset control pulse MRC, the call for service latch is set. As a result, the marker transceiver sends a call for service indication to the register CCR, which after preparing for the receipt of the second transmission, sends an acknowledge signal which sets the latch ACK RL of the register MCR of the marker transceiver. However, just prior to the receiving of the acknowledge signal, the setting of the call for service latch causes the latch MIS to be reset. The resetting of the latch MIS causes the gates 4605 and 4607 to deactivate the send signal. Therefore, the second transmission of the message occurs upon receipt of the acknowledge signal from the register CCR.

The stop counter signal having gone false at the beginning of the last MRC signal, is again activated at the end of the second transmission. Therefore, the signal STOP COUNTER and the clock input signal CLK IN sets the latch BMRR (EOW) and the signal BMRR also allows the same latch to set, assuming that the second sending was completed improperly and the signal BMRR is received from the register CCR via the status leads to the register MCR. As a result, the 0 condition at the "0" output of the latch BMRR (EOW) causes the setting of the latch RBM (EOW) which in turn causes the flip-flop 2BMR to be set and the flip-flop 1BMR to be reset. The receipt of the BMRR signal at the end of the transmission causes the resetting of the acknowledge received latch which cause the call for service latch of the register MCR to remove the call-for-service indication for requesting same from the register CCR. Removing of the call for service causes the register CCR to cause the bad message received signal BMRR to become false forcing a 1—1 condition on the outputs of the BMRR (EOW) latch. An AND gate 4639 is enabled by the 0 output of the latch BMRR (EOW) and the one output of the flip-flop 2BMR for the purpose of setting the flip-flop 2BMRRM which provides an indication to the marker of the occurrence of two improperly sent messages so that the marker can deactivate the signal ISCM. Furthermore, the setting of the flip-flop 2BMRRM causes the setting of the flip-flop MIR, whereby an AND gate 4643 is enabled to in turn enable an OR gate 4645 for resetting the flip-flop 2BMR. The flip-flop 2BMRRM is reset by its K input which is enabled by an inverter gate connected to the zero output of the flip-flop MIR when a clock pulse occurs to trigger it. The normally reset flip-flop MIR is reset once again when the flip-flop 2BMRRM is reset.

Considering now the automatic return of a received maintenance message by the marker transceiver from the register CCR, the register CCR can transmit a serial message to a selected marker transceiver for maintenance purposes and instructs the receiving marker transceiver to return the message unchanged. The instruction for causing the marker transceiver to return the maintenance message unchanged is the prime call for service signal CFSGP.

D14. Maintenance Message

Referring now to FIG. 46, when the prime call for service is received from the register CCR, the reset signal MRS resets the prime flip-flop, and the resetting of the prime flip-flop causes the setting of a latch EOW SEND. As a result, an gate 4652 sets a prime send latch PS in response to the one output of the latch EOW SEND the output of gate 4613 being deactivated at this time. Thereafter, an AND gate 4654 is prepared to be enabled by the one output of the latch PS, but the one output of the latch EOW SEND inhibits the gate 4654 and thus prevents the enabling of the gate 4607 from generating the send signal. When the signal CFSRP is received from the register CCR to indicate a prime maintenance message, the prime flip-flop is set. Thereafter, the register CCR transmits the maintenance message to the shift register of the register MCR.

After the maintenance message is received in the register MCR, a good message received latch GM (EOW), (not shown), is set in the register MCR. As a result, an OR gate 4656 is enabled by the signal GM (EOW) to reset the latch EOW SEND. The resetting of the latch EOW SEND causes the gate 4654 to be enabled, since the one output of the latch EOW SEND is connected to an inhibit input to that gate. As a result, the gate 4654 enables the gate 4607 to cause the generation of the signal SEND, whereby transmission commences of the message previously received in the MCR shift register to the register CCR in a manner similar to the sending mode of operation of the register CCR. During this entire operation, the generation of the parity bit by the register MCR is inhibited to prevent the alteration of the message being sent from the register MCR to the register CCR.

What is claimed is:

1. A communication arrangement for a communication switching system having a plurality of sub-system units and having a common data processor unit, said arrangement comprising:

a first communication register associated with said processor unit;

a second communicaton register associated with said processor unit;

said first and second communication registers being duplicates for reliability;

a plurality of transceiver registers individually associated with each one of said sub-system units;

a plurality of communication two-way links interconnecting each one of said transceiver registers and said first and second communication registers for serial transmission of data;

an intercommunication two-way link interconnecting said first and second communication registers;

each of said links having an individual address, including an address for the intercommunication link;

scanning means in each communication register for addressing said links;

switching means in each communication register for stopping its scanning means in response to said processor unit accessing it;

each communication register being adapted to communicate with a transceiver of a subsystem when addressing its link via that link, and the communication registers being adapted to communicate with each other for diagnostic or maintenance purposes when both address said intercommunication link via that link.

2. A communication arrangement according to claim 1, wherein each of said communication registers includes mode control means having three states which are on-line active, on-line standby, and off line;

directive means from the processor unit to the communication registers to set the mode control means selectively in each to one of said three states;

the scanning means of a communication register in the on-line standby state being inactive and fixed at the address of the intercommunication link.

3. A communication arrangement according to claim 2, wherein said links each includes an outgoing data conductor and an incoming data conductor, said scanning means of each communication register including a driver distributor for connecting selectively to the outgoing data conductors of the addressed link, a receiver multiplexing circuit for connecting selectively the incoming data conductor of the addressed link.

4. A communication arrangement according to claim 3, wherein a first group of said links are connected to said first communication register and a second group of the remaining ones of said links are connected to said second communication register, further including means connecting individually said first group of links to said second communication register, means connecting individually said second group of links to said first communication register, whereby each one of said first and second communication registers can access each one of said links while the other one is operating in an on-line standby mode of operation and should one of said communication registers fail to operate properly, the other one of said communication registers can communicate via its group of links with said transceiver registers associated therewith.

5. A communication arrangement according to claim 4, wherein said scanning means includes means to advance to the next one of said links in response to said processor unit disconnecting from said communication register.

6. A communication arrangement according to claim 5, wherein when said processor unit accesses said communication register to request its status, means to generate a status presentation signal, further including output multiplexing means for transferring selected status information to said processor unit in response to said status presentation signal.

7. A communication arrangement according to claim 6, wherein said multiplexing means includes first coincidence gating means enabled by a first one of said addressing signals and by one of said data signals; second coincidence gating means enabled by a second one of said addressing signals and by another one of said data signals; output alternative gating means enabled by the output of said first coincidence gating means and by the output of said second coincidence gating means; latching coincidence gating means responsive to a latching signal; and means coupling the output of said alternative gating means to an input to said latching gating means to cause said data signals to be latched when said latching signal de-activates and then activates said latching means.

8. A communication arrangement according to claim 1, wherein each of said communication registers and each of said transceiver registers includes a shift register;

wherein each of said links includes in each direction a data lead, a clock lead, and status lead means;

a clock source supplying recurring clock pulses in each communication register via the scanning means to the clock lead of the link for transmission from the communication register to the transceiver register;

communication register to transceiver register means responsive to the leading edge of the clock pulses for causing data signals to be transferred from the shift register of the communication register via the data lead of the link to the transceiver register, and to be shifted into the shift register thereof with means responsive to the trailing edge of the clock pulses received on the clock lead.

9. A communication arrangement according to claim 8, wherein said transceiver registers each include means coupling the clock leads for the two directions of the link so that clock pulses received from the communication register are returned thereto, and means to send messages from the transceiver register to the communication register, including means responsive to the leading edge of the clock pulses at the transceiver register for causing data signals to be transferred from the shift register therein via the data lead of the link to the communication register, and to be shifted into the shift register thereof with means responsive to the trailing edge of the clock pulses received on the clock lead.

10. A communication arrangement according to claim 9, wherein each communication register includes means to set the scanning means to a selected address, means to send a call-for-service signal condition via the status lead means of the link for that address to the transceiver connected thereto, means in the transceiver to prepare to receive and return an acknowledge signal condition via the status lead means to actuate said communication register to transceiver register means;

and means in each transceiver register to place a call for service signal condition on the status lead means, the scanning means in the communication register being operative to detect the call for service while scanning and stop at that address, means in the communication register to prepare to receive and return an acknowledge signal on the status lead means to actuate the means to send messages from the transceiver register to the communication register.

11. A communication arrangement according to claim 1, a first shift register in each said communication register;

a second shift register in each said transceiver register;

checking means in each said communication register to detect a plurality of bits arranged in a predetermined order in a header bit pattern leading a message and received with each message from said second shift register into said shift register;

means coupling said checking means to a plurality of stages of said first shift register to detect the presence of said bits as they are shifted through said first shift register.

12. A communication arrangement according to claim 11, wherein said bit pattern comprises a series of logic bit signals arranged with the leading bit signal being true, said leading bit being followed by an intermediate bit signal being true, said intermediate bit being followed by a trailing bit being false;

further including eans coupling said checking means to said first shift register at a plurality of pairs of stages thereof to detect said bits repeatedly as said message is shifted in said first shift register.

13. A communication arrangement according to claim 1, error detecting means in each said communication register for transmitting to a sending one of said transceiver registers an error message in response to a portion of a data message being received therefrom improperly immediately upon detecting it;

wherein said error detecting means also sends an error message at the end of the transmission of the data message;

and wherein said transceiver registers send status messages indicating a call for service request, said status message including length-of-message coded information.

14. A communication arrangement according to claim 1, each communication register associated with said processor unit having a first shift register;

each transceiver register associated with said subsystem unit and having a second shift register;

a parity bi-stable device associated with said second shift register and responsive to its output for changing states in response to true data output signals; and switching means for inhibiting the output of said second shift register at the end of a predetermined number of said data signals and for connecting the reset output of said parity bi-stable device to said link for generating a parity signal;

wherein said switching means inhibits the output of said second shift register at the end of a second predetermined number of said data signals and for connecting the set output of said parity bi-stable device to said link for generating a second parity signal.

15. A communication arrangement according to claim 14, wherein each said communication register further includes a second parity bi-stable device responsive to the output of said first shift register for changing states in response to true data output signals from said first shift register, said processor unit being adapted to load said first shift register with its said data signals and parity signals corresponding to groups of said processor data signals, comparing means being responsive to the output of said first shift register and said second parity device, switching means inhibiting said comparing means until said processor parity signals are transferred from said first shift register to said link, said switching means for connecting the reset output of said second parity device to said comparing means after odd numbered groups of said processor data signals and for connecting the set output of said second parity device to said comparing means after even numbered groups of said processor data signals;

wherein said communication register includes a proper parity bi-stable device and a parity store bistable device, said proper parity device for storing the condition of said second parity device and said parity store device for storing a parity signal received from said second shift register, second comparing means for generating a mismatch signal when the parity of the data signals received is different from the state of the received parity signal;

wherein said second shift register sends a plurality of predetermined shift-checking signals with its said data signals, a middle bi-stable device for inhibiting said second parity device while said shift-checking signals are being received by said first shift register.

16. A communication arrangement according to claim 1, resending means in each said transceiver register for causing a message to be sent a second time in response to an error message received from said communication register after it receives the message for the first time;

wherein said transceiver register further includes a prime message-returning means responsive to a specially-coded call for service signal received from said communication transceiver for causing said second shift register to return unchanged a maintenance message previously received from said communication register to said communication register.

17. A communication arrangement according to claim 16, further including another transceiver register associated with another sub-system unit, said another register having a third shift register, said second shift register having N number of stages and said third shift register having M number of stages, said first shift register being arranged and including input gating means for receiving messages from either said second or said third shift registers with the signals of one of said messages being received in the same location of said first shift register;

wherein said data processor unit sends select strobe signals, data strobe signals and parity detection signals to said communication register for the purpose of sending information from the data processor unit to said communication register, said communication register including an SS2 bi-stable device and a parity OK bi-stable device for sensing the proper execution of said strobe signals and said parity detection signals, respectively;

wherein said data processor unit sends directive execution signals to said communication register in certain sequences, said communication register including logic gating means for detecting an improper sequence of said directive execution signals and in response thereto, for generating an error indicating signal to transfer it to said data processor unit.

18. A communication arrangement comprising a sending unit with a shift register, a receiving unit with a shift register, and a link having a data lead, a clock lead and status lead means connected from the sending unit to the receiving unit, each shift register having a plurality of stages with a bi-stable device at each stage;

means to send a call for service signal condition from the sending unit via the status lead means, means in the receiving unit responsive thereto to prepare to receive and return an acknowledge signal via the status lead means, a source of clock pulses coupled to the sending unit, means in the sending unit using the clock pulses to shift data from its shift register to the data lead of the link while supplying clock pulses from the source to the clock lead, means in the receive unit using clock pulses received via the clock lead to shift data from the data lead into its shift register;

checking means using a given bit pattern shifted through the shift register of the receive unit to check the ability of the bi-stable device of each stage to remain at "0" after a preceding "0," to change from "0" to "1", to remain at "1" after a preceding "1," and to change from "1" to "0," said checking means including comparison means to compare the bits as they appear at given stages of the shift register with said given bit pattern and to indicate an error condition responsive to any difference.

19. A communication arrangement according to claim 18, wherein the sending unit and receiving unit each include a bit counter for counting clock pulses, wherein the acknowledge signal in both the sending unit and the receiving unit enables gate means to supply clock pulses to the shift register and the bit counter of that unit, so that as data is shifted in the shift register of each unit the clock pulses are counted by the bit counter and therefore the count in the bit counter indicates the position of the data in the shift register;

wherein in preparing to receive the shift register of the receive unit is reset to all "0's," wherein the sending unit includes means to prefix header data comprising a "110" pattern at the beginning of each message, and the receive unit uses the "0's" in its shift register in two positions preceding the received header data to form a pattern "00110" which is shifted at the beginning of the message;

wherein said comparison means includes gate means having inputs from two given adjacent stages of the shift register, with inverters included to distinguish between "0's" and "1's", and also including inputs from the bit counter of the receive unit, to provide a comparison of the bits in said two given adjacent stages with the expected values at four successive values of the count from the bit counter during which said pattern is passing through those stages with bits of the pattern in both stages.

20. A communication arrangement according to claim 19, wherein said comparison means includes inputs from a plurality of sets of two given adjacent stages so that the checking means is effective to repeat the check for different sections of the shift register, the checking means including a bi-stable device for each section, each being set by a count value from the bit counter before said pattern enters the two given adjacent stages for checking that section, and the comparison means has inputs from the last said bi-stable devices to enable selecting inputs from the two given adjacent stages of the section when said pattern is passing through those stages, and inputs from the bit counter enables the comparison means at four successive values of the count for each section.

21. A communication arrangement comprising a sending unit with a shift register, a receiving unit with a shift register, and a link having a data lead, a clock lead and status lead means connected from the sending unit to the receiving unit, each shift register having a plurality of stages with a bi-stable device at each stage;

means to send a call for service signal condition from the sending unit via the status lead means, means in the receiving unit responsive thereto to prepare to receive and return an acknowledge signal via the status lead means, a source of clock pulses coupled to the sending unit, means in the sending unit using the leading edge of the clock pulses to shift data from its shift register to the data lead of the link while supplying clock pulses from the source to the clock lead, means in the receive unit using the trailing edge of the clock pulses received via the clock lead to shift data from the data lead into its shift register;

said clock pulses having approximately a 50 percent duty cycle, whereby the data is shifted into the shift register of the receive unit near the center of each data bit as it is received from the data lead of the link.

* * * * *